(12) United States Patent
Ellice-Flint et al.

(10) Patent No.: US 10,901,445 B2
(45) Date of Patent: Jan. 26, 2021

(54) ENERGY CONTROL AND GENERATION METHOD AND SYSTEM

(71) Applicant: Applied Hybrid Energy Pty Ltd, Sydney (AU)

(72) Inventors: John Charles Ellice-Flint, Sydney (AU); Petar Branko Atanackovic, Sydney (AU)

(73) Assignee: Applied Hybrid Energy Pty Ltd, Sydney (AU)

( * ) Notice: Subject to any disclaimer, the term of this patent is extended or adjusted under 35 U.S.C. 154(b) by 239 days.

(21) Appl. No.: 14/914,734

(22) PCT Filed: Aug. 29, 2014

(86) PCT No.: PCT/AU2014/000856
§ 371 (c)(1),
(2) Date: Feb. 26, 2016

(87) PCT Pub. No.: WO2015/027281
PCT Pub. Date: Mar. 5, 2015

(65) Prior Publication Data
US 2016/0209858 A1    Jul. 21, 2016

(30) Foreign Application Priority Data
Aug. 29, 2013  (AU) ................................ 2013903300

(51) Int. Cl.
*G05F 1/66* (2006.01)
*H02J 3/38* (2006.01)
(Continued)

(52) U.S. Cl.
CPC .............. *G05F 1/66* (2013.01); *G05B 15/02* (2013.01); *G06Q 40/12* (2013.12); *G06Q 50/06* (2013.01); *H02J 3/381* (2013.01); *H02J 3/003* (2020.01)

(58) Field of Classification Search
CPC ......................................................... G05F 1/66
(Continued)

(56) References Cited

U.S. PATENT DOCUMENTS 6,697,951 B1    2/2004  Sinha et al.
6,745,105 B1 *  6/2004  Fairlie ................. B60L 11/1881
                                        205/343
(Continued)

OTHER PUBLICATIONS

IEEE Standards Coordinating Committee 21 (IEEE); IEEE Standard for Interconnecting Distributed Resources with Electric Power Systems 2003 (IEEE 1547-2003); Rev. 2008; IEEE. (Year: 2008).*
(Continued)

*Primary Examiner* — Mohammad Ali
*Assistant Examiner* — Joshua T Sanders
(74) *Attorney, Agent, or Firm* — The Webb Law Firm

(57) ABSTRACT

A method and system of controlling the time dependent transfer of electrical power between a first electrical network and a second electrical network is disclosed. The first electrical network is operable to provide instantaneous electrical power to the second electrical network located at a location, the second electrical network includes electrical generating capacity at the location based on stored energy accessible at die location. The method and system involves receiving at the second electrical network pricing information from the first electrical network, the pricing information associated with the future supply of electrical power by the first electrical network to the second electrical network and then modifying substantially in real time the transfer of electrical power between the first and second electrical networks in accordance with the pricing information and the electricity demand characteristics of the location.

28 Claims, 22 Drawing Sheets

(51) Int. Cl.
*G06Q 50/06* (2012.01)
*G06Q 40/00* (2012.01)
*G05B 15/02* (2006.01)
*H02J 3/00* (2006.01)

(58) Field of Classification Search
USPC ........................................................ 700/291
See application file for complete search history.

(56) References Cited

U.S. PATENT DOCUMENTS

| | | | | |
|---|---|---|---|---|
| 9,048,684 | B2* | 6/2015 | Larson | H02J 9/06 |
| 2002/0091626 | A1 | 7/2002 | Johnson et al. | |
| 2004/0094963 | A1* | 5/2004 | Johnson | H02J 9/06 |
| | | | | 290/2 |
| 2004/0215529 | A1 | 10/2004 | Foster et al. | |
| 2004/0220869 | A1* | 11/2004 | Perera | G06Q 10/06 |
| | | | | 705/37 |
| 2008/0046387 | A1 | 2/2008 | Gopal et al. | |
| 2008/0262857 | A1* | 10/2008 | Perera | G06Q 30/00 |
| | | | | 705/1.1 |
| 2010/0179704 | A1 | 7/2010 | Ozog | |
| 2010/0207452 | A1 | 8/2010 | Saab | |
| 2011/0204720 | A1 | 8/2011 | Ruiz et al. | |
| 2012/0116847 | A1 | 5/2012 | Martorella | |
| 2013/0082529 | A1* | 4/2013 | Wolter | H02J 3/005 |
| | | | | 307/46 |
| 2014/0018969 | A1 | 1/2014 | Forbes, Jr. | |

OTHER PUBLICATIONS

Eaton, Cutler-Hammer ATC-800 "Closed/Open Transition Transfer Switch Controller", Eaton, Mar. 2001. Retrieved from https://www.eaton.com/content/dam/eaton/products/low-voltage-power-distribution-controls-systems/ats/resources/atsc8-ibats-c103.pdf on Mar. 27, 2020 (Year: 2001).*

Office Action dated Mar. 21, 2019 in U.S. Appl. No. 14/897,945.

* cited by examiner

ENERGY CONTROL AND GENERATION METHOD AND SYSTEM

PRIORITY DOCUMENTS

Cross-Reference to Related Applications

This application is the United States national phase of International Application No. PCT/AU2014/000856 filed Aug. 29, 2014, and claims priority to Australian Patent Application No. 2013903300 filed Aug. 29, 2013, the disclosures of which are hereby incorporated in their entirety by reference.

INCORPORATION BY REFERENCE

The following co-pending patent application is referred to in the following description:
PCT Application No PCT/AU2014/00060S titled "ELECTRICAL POWER CONTROL METHOD AND SYSTEM" and filed on 12 Jun. 2014 claiming priority from Australian Provisional Application No 2013902126.
The content of this application is hereby incorporated by reference in its entirety. The United States national stage of this application issued as U.S. Pat. No. 10,566,792 on Feb. 18, 2020, the content of which is hereby incorporated by reference in its entirety.

TECHNICAL FIELD

The present invention relates to the supply of electrical power by an electrical power network. In a particular form, the present invention relates to the methods and systems that may be adopted by an end-user of an electrical power network to manage the cost of electrical power to the end-user.

BACKGROUND

Electricity supply and pricing in a utility scale "smart grid" offers significant improvements in energy security, reliability, efficiency and lower cost to end-users. Unfortunately, grid generated supply of electrical power must equal demand instantaneously, as large scale storage and buffering of electricity is not economically feasible. In general, there are a large number of utility scale generation plants interconnected via complex wired distribution networks for transportation of electricity to spatially diverse end-users. For a smart grid spanning several distinct demand regions there exists the opportunity to trade surplus generated capacity or acquire additional capacity that had not been accounted for in a region's forecasted demand profile and resulting scheduled generation. This is seen as a prime advantage of the network based energy supply model.

Referring now to FIG. 1, there is shown a schematic representation of a smart grid 100 of the type described above. Physical electrical power is generated and transported to the end-user 130 by transmission and distribution networks 115, 120 with monies exchanged between the generator 110 and retailer 105 via a central clearing entity being the market operator 150. The end-user 130 interacts only with the retailer 105 for cost recovery as indicated. The end-user 130 consumption is monitored via a measuring device MD which is used by the retailer 105 to invoice the end-user 130. Even with the electricity market structured as described, the actual temporal wholesale spot price varies considerably and is typically not visible to the end-user 130.

A given retailer 105 participating in the smart grid and representing a group of end-users, must therefore develop a risk based tariff schedule to reflect the cost of supplying electricity to a captive group of end-users. The tariff is generally calculated to be of acceptable risk over a time period of months. The final retail cost (RC) presented to the end-user by the retailer comprises: the anticipated purchase cost of electricity directly from the smart grid market operator (WC), transmission network cost (TNC), distribution network cost (DNC) from the grid to the physical region of the end-user, end-user metering costs (MRC), retail operating (ROPC) costs (including, hedging future funds, market participation costs, credit notes for market purchases, customer billing and marketing) and retailer profit margin (RPM). Other costs such as government levies (GL) and environmental schemes (ESC) and feed-in tariff costs (FITC) are also passed through to the end-user.

That is, the total retail cost RC presented to the end-user is thus:

$$RC=WC+TNC+DNC+MRC+ROPC+RPM+FITC+ESC+GL$$

Approximate proportions of the components comprising the RC are: WC=25%, TNC=26%. DNC=31%, (ROPC+RPM)=12%, FITC<0.5%, CL=1.5%, ESC=3%. This data is representative of the Australian 2012/2013 electricity cost and is not expected to vary substantially from other smart grid type networks in developed markets. Clearly, the total network costs constitute a major share (57%).

The only time varying costs exposed to the retailer are the WC and ROPC due to direct exposure to the real-time electricity market. Network access costs are in general fixed over a period of several years due to return on investment of huge capital infrastructure. However, future market innovation is likely to augment transmission network costs to be reflective of the actual power transferred between nodes comprising the transmission network.

Referring now to FIG. 2, there is shown a pie chart of the decomposition of end-user costs for in this case a typical Australian end-user participating in the smart grid as referred to above. As can be seen, the majority of the final end-user cost remitted to the retailer goes to the electrical transmission 235 and distribution networks 205 as compared to government levies 210, retailer operating costs and profit margin 215, environment costs 220, feed in tariff costs 225 and electricity wholesale costs 230. All present day electricity cost forecasts as of 2013 indicate that the future trend in price escalations is likely to be primarily driven by increasing network costs.

As would be appreciated, the smart grid electrical network of the type depicted in FIG. 1 provides a means for matching supply to forecasted demand. Referring now to FIG. 3, there is shown actual forecast, dispatched and settled spot pricing data from the Australia national smart grid. The upper chart of FIG. 3 shows the day-ahead forecast spot price 305 (circles) ahead of present time 315 broadcast to the smart grid participants and updated every 30 mins and where the black square data points 325 show the actual 5 min settled spot price. The lower chart shows the actual dispatched generation power 330. Clearly, in this example the forecasted 310 and dispatched 330 generated power supplied to the regional network are well matched. However, as can be seen from the upper chart, significant price volatility is observed even within a 48 hour period. That is, even though the smart grid forecasting enables accurate tracking of supply to demand, the actual settled spot price that is cleared by the market operator is open to considerable price fluctuations beyond those forecasted.

In some instances, such as where there are extreme weather conditions, the spot price exceeds limits placed by the market operator and presents considerable exposure to the retailer. This considerable risk can be partially mitigated by the use of hedging contracts by retailers with generators and/or the use of futures contracts. Even so, the retailer must provide a competitive tariff rate to an end-user otherwise retailer switching will occur by an end-user in a deregulated retail market. Increased retailer competition is seen as a market response for improving market operation. However, every retailer is still exposed to the time varying nature of the wholesale market. It is anticipated that increased integration of renewable resources within the smart grid will further increase wholesale market volatility for the reasons outlined below.

Generally, it is the primary goal of an electrical power supply network to match supply to demand. This is a challenging task because demand may be highly time varying. The utility company or generators therefore needs to provision enough generation, transmission and distribution capacities for peak demand rather than for simply the average demand. As a result, the power network has a low load factor and is underutilised most of the time, this resulting in a disproportionately high cost to the end-user. For example, in Australia and the United States, the national load factors are approximately 55% with 10% of the generation capacity and 25% of the distribution facilities being used less than 100-400 hours per year. That is, peak demand capacity is used less than 2-5% of the time.

Shaping the demand to reduce the peak and to smooth any variations can potentially greatly improve the electrical power supply network's efficiency and provide enormous savings. An alternative strategy to improve efficiency and reduce cost is to conversely match demand to the supply. As the proportion of renewable sources (eg, solar and wind power) steadily rises, the electrical power supply will also become even more highly time varying. As a result, matching demand to the available supply may therefore become a more effective way to improve the overall efficiency of the electrical power supply network and reduce cost.

As referred to previously, large scale renewable energy electricity generation integrated into the smart grid creates new challenges. Taking the Australian national smart grid as an example, despite the relatively low running average regional wholesale electricity prices as can be seen in FIG. 3, there has been significant increase in the spot price market volatility as a result of the introduction of electricity generation based on renewable energy, especially in those regional zones within the smart grid that physically host the large scale renewable energy plants. Interconnection of networks and renewables must be scheduled and accordingly there exists further demands placed on network capacity to provide for opportunistic access of renewable generation once it comes on line. As an example, South Australia has the highest penetration of wind generation (>2.5 $GW_e$ name-plate capacity) in the Australian smart grid. Correspondingly, the electricity market has observed rising incidence of negative pool prices in South Australia.

Australia, like many developed electricity markets is increasing its adoption of wind generation based on environmental concerns. FIG. 4 shows actual (but typical) data of the regional pool price correlated to the instances of dispatched wind generation in South Australia over a 24-hour period. Wind generators bid low and also bid often at slightly negative prices to ensure dispatch of the generated electrical power. As renewables in Australia receive the value of renewable energy certificates (RECs) in addition to spot market returns, they are able to afford to bid preferentially low on the basis of this cost advantage.

As a result of analysis carried out by the Applicant, it has been found that all instances of South Australian prices that were significantly below zero in 2011-12 (including prices around the −$1000 market floor) were associated with the strategic bidding or rebidding of wind generated power where the market is essentially compelled to accept the wind generated power. Taking South Australia as an example, it has been observed on several occasions that a particular renewable energy generation participant's bidding strategy in South Australia has effectively shut down other generators (including other wind generator farms and open cycle gas turbine (OCGT) gas-peakers and combined cycle gas turbine (CCGT) plants).

Negative pricing events have the effect of collapsing the electricity market price as wind energy is dispatched in the electricity supply network. Wind energy electricity generation also requires regional gas-peaker plants to buffer the wind supply when dispatched. As such, there is an increasing requirement for gas-peaker plants to be scheduled in parallel with semi-dispatchable wind farm generation. However, the market risk for longer term supply is the uneconomic operation of gas-fired peakers due to the low pool prices generated and associated with the supply of electricity by wind energy. This represents a large risk to both the retailer and end-user for future price stability as traditional gas fired base load plants that are unconnected to wind farm generation will become uneconomic.

Spot price volatility therefore causes market uncertainty and can affect the efficient dispatch of generation within the smart grid. The incidence of counter-price export flows where every generator in a regional pool is not compensated also poses difficulties for retailers and smaller generators seeking to hedge against volatility, especially across regions through inter-regional settlement residue auctions attempting to settle on payments between regions. The conditions outlined above therefore create high risk for generators and reduce competition among generators in adjoining regions. The additional risks can deter new entry and investment in both generation and retail, leading ultimately to higher costs that consumers ultimately bear.

There is therefore a need to provide end-users of the electrical supply market with options to interact with the smart grid or electrical supply network to reduce their exposure to price increases and volatility.

SUMMARY

In a first aspect the present invention accordingly provides a method for controlling the time dependent transfer of electrical power between a first electrical network and a second electrical network, the first electrical network operable to provide instantaneous electrical power to the second electrical network located at a location, the second electrical network including electrical generating capacity at the location based on stored energy accessible at the location, the method comprising:

receiving at the second electrical network pricing information from the first electrical network, the pricing information associated with the future supply of electrical power by the first electrical network to the second electrical network; and modifying substantially in real time the transfer of electrical power between the first and second electrical networks in accordance with the pricing information and electricity demand characteristics of the location.

In another form, modifying substantially in real time the transfer of electrical power between the first and second electrical network includes the second electrical network generating electricity on-site to satisfy the electricity demand characteristics of the second electrical network where a cost of generating electricity on-site is less than or equal to a cost of electricity supplied by the first electrical network.

In another form, modifying substantially in real time the transfer of electrical power between the first and second electrical network includes the second electrical network supplying at least a portion of the on-site generated electricity to the first electrical network at a reimbursement price greater than or equal to a cost of generating electricity on-site.

In another form, modifying substantially in real time the transfer of electrical power between the first and second electrical network includes storing by the second electrical network electricity supplied by the first electrical network or generated by the second electrical network to be either employed by the second electrical network or supplied back to the first electrical network at a later time.

In another form, the stored energy is in the form of combustible gas.

In another form, the combustible gas is stored at the location and is comprised of any one of:
 compressed natural gas (CNG);
 liquefied propane gas (LPG);
 liquefied natural gas (LNG); or
 any combination of the above.

In another form, the combustible gas is supplied by a gas supply network.

In another form, modifying substantially in real time the transfer of electrical power between the first and second electrical network includes receiving pricing information from the gas supply network and including this information in present and future calculation of generating electricity on-site.

In another form, the method further includes supplying a forecast of gas fuel consumption by the second electrical network to the gas supply network.

In another form, the electrical generating capacity at the location based on stored energy is an on-site gas-to-electricity converter.

In another form, the on-site gas-to-electricity converter comprises a gas-to-rotational energy converter and a rotational energy-to-electricity converter.

In another form, the gas-to-rotational energy converter is an internal combustion reciprocating engine (ICRE).

In another form, the first electrical network is an electrically interconnected utility-scale grid under the control of a market operator comprising at least one power generation source and a transmission and/or distribution interconnection network operable to supply power.

In a second aspect the present invention accordingly provides an electrical power control system comprising:
 a first electrical network configured to supply instantaneous electrical power to a second electrical network located at a location, wherein the first electrical network further provides pricing information associated with the future supply of electricity;
 a power measuring device for measuring the demand characteristics of the second electrical network;
 an on-site stored energy-to-electricity converter for converting stored energy at the location to electricity; and
 a controller for receiving the demand characteristics of the second electrical network and the pricing information from the first electrical network and determining a power transfer schedule for the second electrical network controlling whether electricity is to be sourced from the first electricity network or from the on-site stored energy-to-electricity converter.

In another form, the power transfer schedule further controls whether electricity is to be stored on-site by the second electrical network.

In another form, the power transfer schedule further controls whether electricity from the on-site energy-to-electricity converter is supplied to the first electrical network.

In another form, the on-site stored energy-to-electricity converter is a gas-to-electricity converter based on combustible gas.

In another form, the combustible gas is supplied by a gas supply network.

In another form, the combustible gas is stored at the location and is comprised of any one of:
 compressed natural gas (CNG);
 liquefied propane gas (LPG);
 liquefied natural gas (LNG); or
 any combination of the above.

In a third aspect the present invention accordingly provides a method of controlling the interaction between first and second power supply systems at an end-user site, the first power supply system operable to provide electrical power that matches the instantaneous demand of a plurality of end-users including the end-user site, and where the second power supply system is based on stored energy where the end-user is able to generate electrical power at the end-user site from the stored energy at a predetermined time and for a predetermined duration, the method comprising:
 dynamically switching by the end-user between the first and second power supply systems in accordance with a cost benefit analysis based on pricing information provided substantially in real time to the end-user by the first power supply system.

In another form, the stored energy is based on combustible gas.

In another form, the combustible gas is supplied by a gas supply network.

In another form, combustible gas is stored at the location and is comprised of any one of:
 compressed natural gas (CNG);
 liquefied propane gas (LPG);
 liquefied natural gas (LNG); or
 any combination of the above.

In a fourth aspect the present invention accordingly provides an electricity market system comprising:
 a plurality of electricity generators;
 a distribution network for distributing electricity generated by the plurality of electricity generators to a plurality of end-users or customers of the electricity market;
 at least one retailer for receiving monies from the plurality of end-users in satisfaction for the electricity supplied to an end-user, and
 a market operator for determining a forecast demand and a settled price for the wholesale cost of electricity as supplied by the plurality of generators, wherein the market includes a plurality of end-users each enabled with on-site electrical generating capacity based on stored energy and who determine whether to receive electricity from the electricity market or supply electricity to the electricity market based on a cost benefit analysis carried out by the end-user.

In another form, the electrical generating capacity based on stored energy is a gas-to-electricity converter based on the supply of combustible gas to the individual end-user.

In another form, the combustible gas is supplied by a gas supply network.

In another form, the combustible gas includes combustible gas stored at an individual user's location, the stored combustible gas comprised of any one of:

compressed natural gas (CNG):
liquefied propane gas (LPG);
liquefied natural gas (LNG); or
any combination of the above.

In another form, the electricity market system further includes an ensemble of end-users having an aggregated on-site generating capacity who are treated as part of the electricity generating capacity of the electricity market to manage demand volatility.

In a fifth aspect the present invention accordingly provides an energy supply system comprising:

a stored energy network comprising combustible gas supplied to an end-user by a gas distribution network for supplying combustible gas, the combustible gas metered by a gas provider and supplied at an agreed gas consumption tariff structure; and an instantaneous energy network comprising an electrical distribution network that supplies electricity to the end-user site that is metered by an energy provider at an agreed electricity consumption tariff structure, wherein the end-user switches between electricity generated on-site from the combustible gas and electricity supplied by the electrical distribution network to minimise the end-user costs.

In another form, the combustible gas is gas supplied by a gas supply network to individual end-users.

In another form, the end-user provides forecast gas consumption demand information to the gas distribution network to negotiate a future gas consumption tariff structure.

In another form, the future gas consumption tariff structure is time and volume dependent.

In another form, the end-user provides forecast electricity consumption information to the electrical distribution network to negotiate a future electricity consumption tariff structure.

In another form, the future electricity consumption tariff structure is time and amount dependent.

BRIEF DESCRIPTION OF DRAWINGS

Embodiments of the present invention will be discussed with reference to the accompanying drawings wherein:

FIG. 23c is a schematic circuit diagram of the transfer switch illustrated in FIG. 23a;

In the following description, like reference characters designate like or corresponding parts throughout the figures.

DESCRIPTION OF EMBODIMENTS

Figure 5:
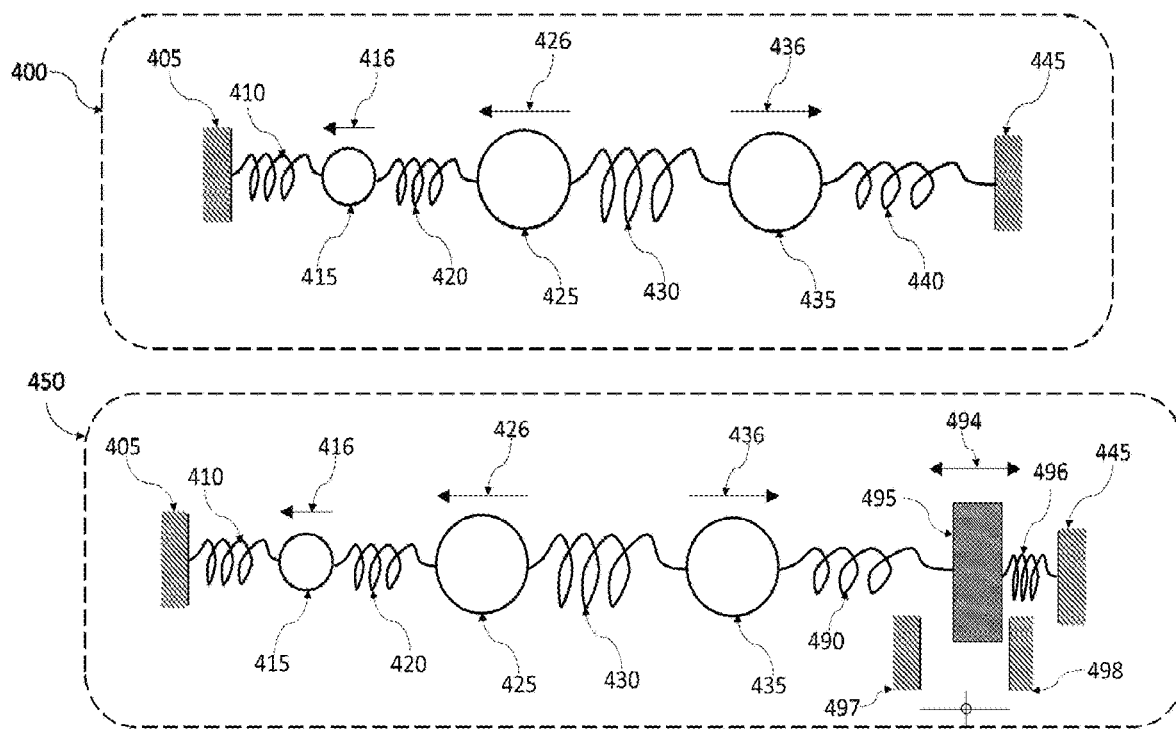
FIG. 5 is a schematic representation of an analogous dynamic response model of a smart grid using a ball-spring model. Upper model includes a smart grid having generation, network distribution and retailing with the lower model further including a constrained cost of response of an end-user.

Referring now to FIG. 5, there is shown a simplified analogous dynamic model of the smart grid 400 represented as a one-dimensional (ID) ball & spring structure. The system is constrained by rigid endpoints 405 & 445. The centre-of-mass positions and velocities ($x_j$, $v_i$) represent particular smart grid parameters (viz., price and demand) and the masses 415, 425 and 435 represent the magnitude of generators, networks and retailers forming the smart grid. Forcing functions 416 (generation), 426 (network distribution) and 436 (retailing) drive the masses of the system and the coupling constants are represented by elastic spring constants 410, 420, 430 and 440. The spring constants and mass inertia therefore represent the time constants of the system. Analysis of actual historical data for demand and settled cost time-sequences can be provided by applying a Fourier transform in order to understand underlying frequency modes of the smart grid 400.

A 3-body system as shown in the model 400 of FIG. 5 can be used to understand gross behaviour of the smart grid. In general, modelling of an electrical supply network assumes an end-user as an unsophisticated price taker and is not included in any system response modelling. As will become apparent in the various illustrative embodiments described below, these embodiments include yet another component in the dynamic response representing an end-user 495 which interacts and provides feedback to the smart grid or first electrical network. As an example, consider the 4-body model 450 depicted in the lower model of FIG. 5 where the end-user is coupled to the smart grid system (ie the left hand side of lower model which is analogous to upper model 400) and is represented as a further mass 495 having associated spring constants 496 & 490. The additional feature is a physical constraint representing limits to price taking or demand. The positions of the end-user limits 497 and 498 are determined by the end-user network, for example, the on-site generation cost decision points which will be described below. This end-user demand response translates to a participative forcing function 494 which will affect the overall behaviour of the smart grid network 450 as will be discussed below.

In accordance with an illustrative embodiment, an end-user may couple advantageously to a dynamic smart grid. In accordance with this embodiment, an end-user may advantageously price-take from a smart grid if there exists means to modify energy consumption by one or more of the following strategies including.
  a) utilising an alternative energy source of known cost structure; or
  b) shifting a time-dependent energy consumption of the end-user to lower time-of-use cost; or
  c) shifting a time dependent energy injection from the end-user to the smart grid to achieve a higher time-of-use feed-in tariff.

Throughout the specification a "smart grid" is defined to include an integrated electrical power generation and electrical power transport network having a market operator that provides time-dependent pricing information presented in one embodiment as a forecast to the primary smart grid participants. Upon this forecast, market forces interact via retailers to produce an outcome of providing end-users with high reliability energy with time-dependent supply substantially matching instantaneous demand.

Figure 6:
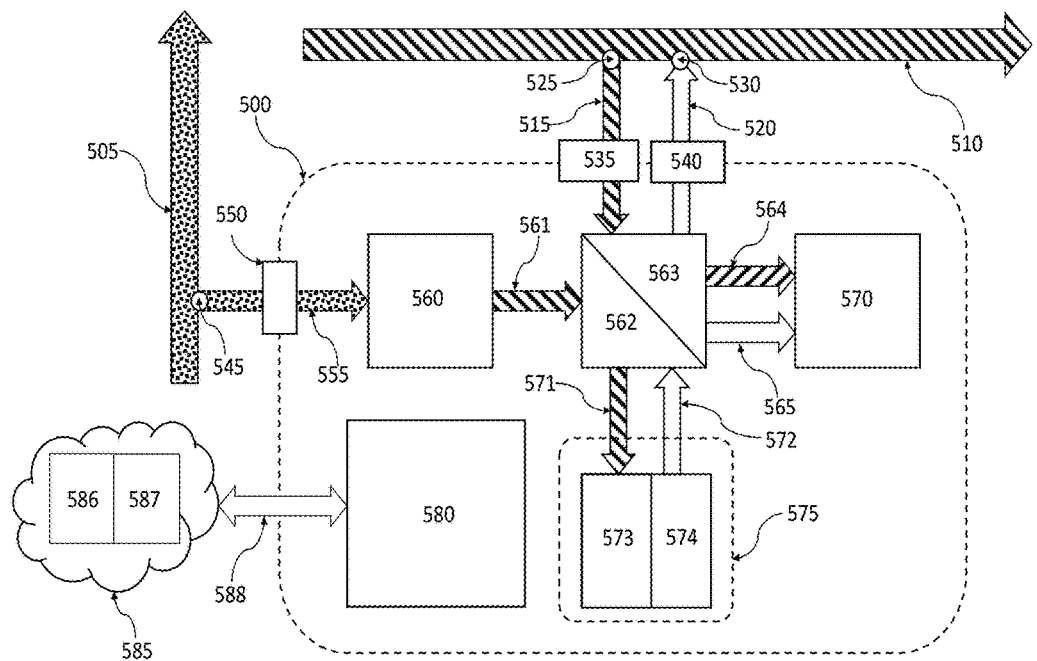
FIG. 6 is a schematic functional diagram of the components of a smart grid in accordance with an illustrative embodiment including a second electrical or end-user network having access to a combustible gas supply.

Referring now to FIG. 6, there is shown a functional diagram of the components of a power transfer system in accordance with an illustrative embodiment. In this example, the smart grid comprises a first electrical network 510 that is physically connected at 525 and 530, distributed to the end-user site by links 515 and 520 which may the same physical connection. Electricity consumed and delivered from first electrical network 510 is metered by power measuring devices 535 and 540 (which may also be physically contained within the same device) for consumption or feed-in by the second or end-user electrical network 500, respectively. Metered electrical power is delivered to a second electrical network power transfer system 563 which can switch power from the first electrical network to the second electrical network load 570. Alternatively, metered power 515 from the first network can be delivered via power transfer module 562 to an energy storage device 573.

The end-user or second electrical network 500 is further connected to a hydrocarbon gas-grid or combustible gas network 505 via physical connection 545 which provides combustible gas feedstock 555 via a gas metering device 550 recording consumption of gas. In another embodiment, gas feedstock may be containerised in the form of bottled gas or similar. Second or end-user electrical network 500 further includes a gas-to-electricity converter 560 which generates on-demand electrical power 561 that is connected to power transfer devices 562 and 563. Electrical power sourced from at least one of the first electrical network 510 or on-demand on-site generator 560 or on-demand on-site stored power sources 575 can be provided to the end-user load 570 or fed back into the first electrical network 510.

In this illustrative embodiment power source 575 is comprised of an electricity-to-energy storage module 573, and a stored energy-to-electricity conversion module 574. In one example, storage module 573 could be a water electrolysis plant generating separate $H_2$ and $O_2$ gases as stored energy, and then conversion module 574 then converts the $H_2$ and $O_2$ in a fuel cell to make electricity with further conversion from DC to AC. In another embodiment, air compression or flywheel storage can be employed in storage module 573 and then energy released and converted into electrical power via a rotational to electrical alternator in conversion module 574. Instantaneous power transferred from the second electrical network 500 power sources into the first electrical network 500 is metered by power measuring device 540.

The smart grid or first electrical network in accordance with this illustrative embodiment includes at least one remotely accessible database 586 providing real-time pricing information relating to the first electrical network 510 including regional time-of-use electricity pricing and regional demand forecast information for electrical power supplied by the first electrical network 510. In this embodiment, pricing information is provided by a communication link 588 from the first electrical network 510 to the second electrical network 500. Bidirectional data may be exchanged between the first electrical network provider and the second electrical network with databases 585 comprising a plurality of distinct databases and information centres 586 and 587 utilised for storing and periodic update of information for the purpose of consumption and remuneration. Communication link 588 may be via internet network, wireless link or any other suitable data communications link. In another embodiment, the first electrical network 510 is able to access and store in database 587 via communications link 588 usage data relating to the consumption or supply of electrical power by the second electrical network, these data being provided by power measuring devices 535 and 540.

As would be appreciated, power measuring devices 535 and 540 may be distinct or part of the same device. Furthermore, power measuring devices may be of accumulation type or capable of time stamping substantially instantaneous power flow and providing commercially acceptable time-of-use (TOU) function.

Second or end-user electrical network 500 further includes a controller 580 having access by communications link 588 to pricing information data 586 as it relates to the first electrical network 510 and electrical power consumption and supply information relating to the second electrical network 500 which may be stored in external database 587 or locally as required. In this illustrative embodiment, controller 580 provides intelligent control and assessment of the various system data as will be described to provide a power transfer schedule for operation of the second electrical network 500. In one example, controller 580 is operable to provide an end-user with the lowest time-of-use cost of electricity for consumption based on time dependent load 570. In another example, controller 580 is operable to provide the highest time-of-use provision cost for injection of electrical power from the second electrical network 500 into the first electrical network 510.

Figure 7:
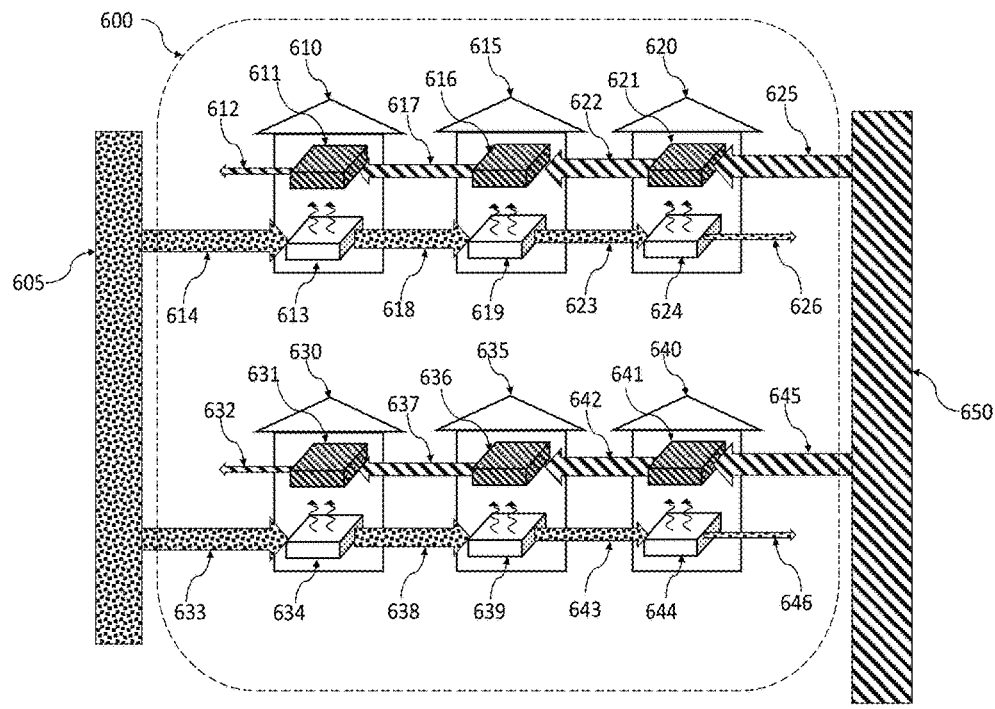
FIG. 7 is a schematic representation of standard electrical and gas supply networks for energy supply to an end-user.

Referring now to FIG. 7, there is shown a schematic representation of standard electrical and gas supply networks 600 as is known in the prior art. An electrical smart grid provides a first electrical network 650 via distribution networks 625 and 645 and a hydrocarbon fuel network provides distribution network 614 and 633. End-users generalised as 610, 615, 620, 630, 635 and 640 each contain electrical consumption blocks 611, 616, 621, 631, 636 and 641, respectively. Furthermore, each end-user comprises gas-consumption blocks 613, 619, 624, 634, 639 and 644, which are decoupled in their primary function from the electrical consumption blocks. That is, gas consumption is typically used for thermal energy creation as exemplified by direct heating and or hot water generation. In other examples, the gas supply is provisioned by an end-user local gas-source located on site at the end-user location. FIG. 7 schematically depicts the first electrical network 650 spatially distributed by interconnections 625, 622, 617, and 612 and further by nodes 645, 642, 637 and 632. Similarly, the combustible gas network 605 is supplied to a plurality of end-users by distribution interconnections 614, 618, 623 and 626 and further by nodes 633, 638, 643 and 646.

The combustible gas supply includes, but is not limited to, methane, propane, coal-seam gas, natural gas, shale-gas, biogas or any combination or blend as appropriate.

Throughout the specification a "gas supply network" is defined to include a regional supply network based on pipeline infrastructure operable to provide combustible gas to a plurality of end-users within the region. A gas supply network will typically have associated with it a gas supply retailer responsible for cost recovery from end-users supplied by the gas supply network.

Figure 8:
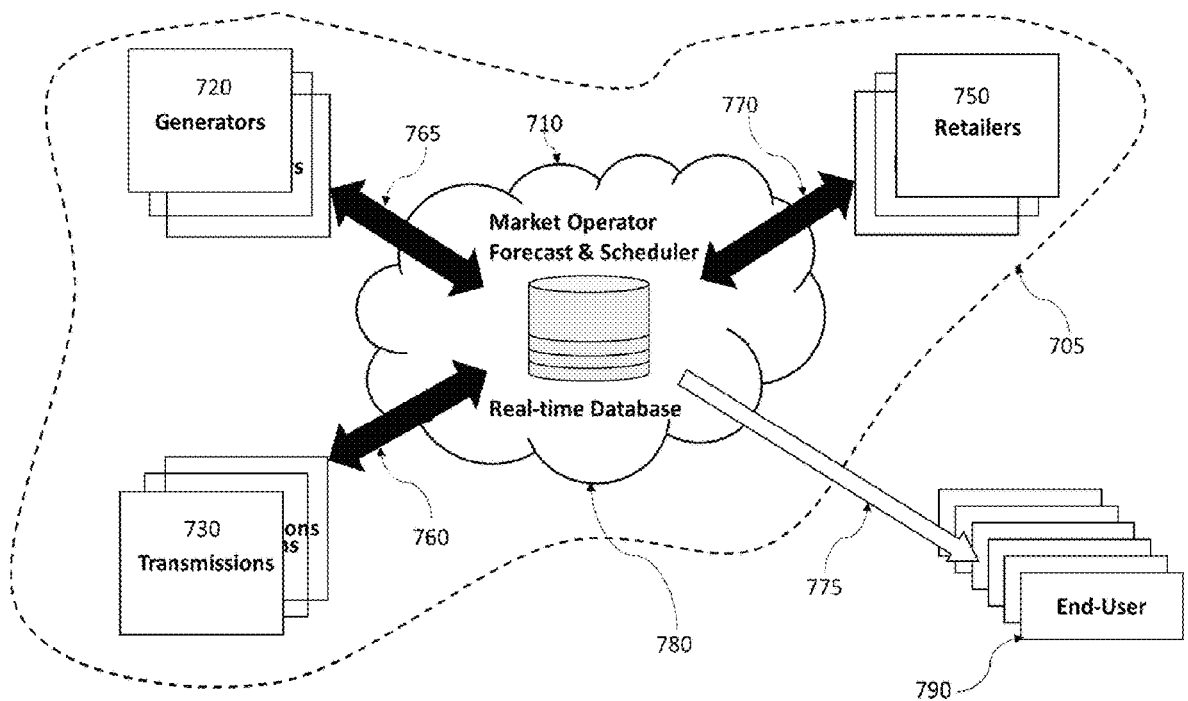
FIG. 8 is a schematic representation of a smart grid illustrating the bidirectional interchange between smart grid participants and the unidirectional information available to end-users.

Referring now to FIG. 8, there is shown a schematic representation of the information interchange between smart grid participants 705 and an end-user 790. The smart grid electrical first network generates and provides electricity by collective action of smart grid participants 705, namely, generators 720, electrical transmission networks 730 and retailers 750. As has been discussed previously, a centralised electricity market operator 710 schedules and dispatches an entire smart grid solution to provide electrical energy that substantially matches a forecasted aggregate end-user 790 demand. The forecasted time-dependent demand profiles and cost of generation profiles are calculated for each regional zone comprising the smart grid. Information is provided by the smart grid participants as shown by two way or bidirectional data exchanges 760, 765 and 770 between the generators 720, electrical transmission networks 730 and retailers 750 respectively and the market operator 710. These bidirectional data exchanges permit real-time feedback and control of the smart grid operation.

The smart grid 705 is able to provide end-users 790 with one-way observable data 775 directly from the market operator 710 in the form of pricing information as has been previously described. In accordance with illustrative embodiments which will be discussed below, this information enables end-users 790 to provide a modified demand response to the smart grid that provides cost advantages to the end-user as well as scheduling and demand management advantages to the smart grid.

Figure 9:
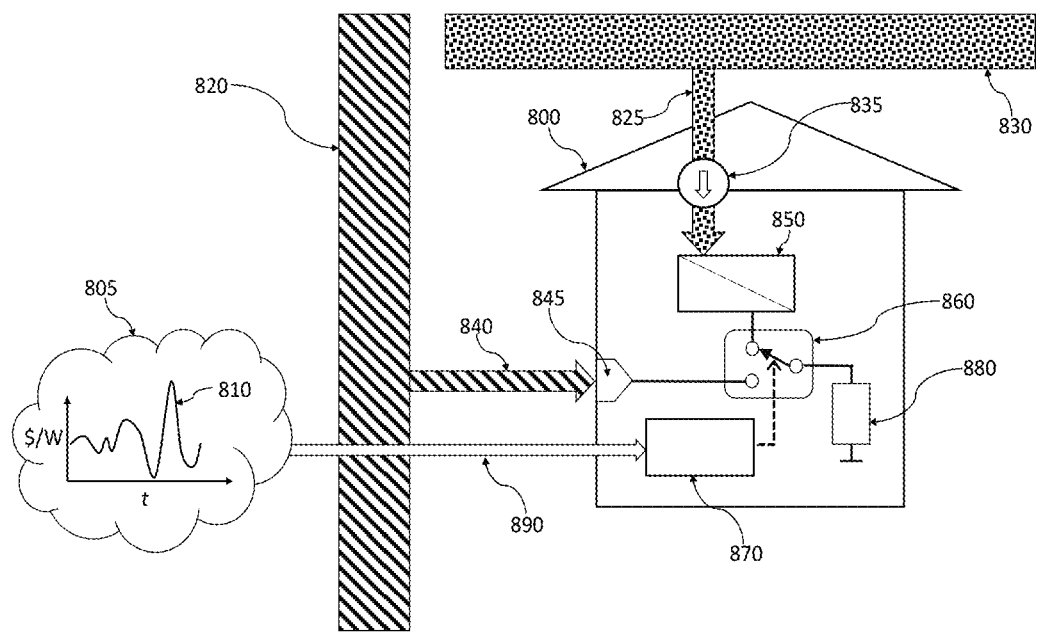
FIG. 9 is a schematic representation of a system for transferring electricity between a first electrical network and an end-user electrical network in accordance with an illustrative embodiment where the end-user electrical network is also connected to a pressurised gas network.

Referring now to FIG. 9, there is shown a system for the transfer of electrical power between a first electricity network 820 and a second or end-user electricity network 800 according to an illustrative embodiment. In this illustrative embodiment, first electricity network 820 is a smart grid which provides access to pricing information in the form of a regional time-of-use price and demand forecast information 810. The forecast look-ahead information 805 spans a useful time window and has sufficient resolution for an end-user to manage an advantageous and timely response. The first electrical network 820 is distributed 840 locally to the end-user electrical network 800. The electrical power transfer between the first electrical network 820 and the end-user electrical network 800 is metered with power measuring device 845.

The end-user is further supplied by gas-grid 830 as distributed via pressurised pipeline 825. In another example, the end-user may have access to biofuel gas production or alternatively or additionally to on-site containerised gas stores. The gas-fuel is metered by flow measuring device 835 supplied by gas grid 830 interconnector 825. Measuring devices 845 and 835 provide secure metering of consumption and may provide time-of-use logging of the respective electricity and gas consumed. In this embodiment, electrical power measuring device 845 is capable of TOU logging and integrated with an electricity retailer for TOU tariff pricing. The measuring devices 835 and 845 may also be enabled with communication to the relevant retailer for the supply of gas and electricity respectively for account transaction settlement.

The end-user electrical network 800 is further enabled with a gas-to-electricity on-site power generator 850 that can be used to supply energy to an end-user electrical load 880. In accordance with this illustrative embodiment, a controller 870 acquires the first electrical network forecast 810 via data communications link 890 and instructs the end-user system to source switch between the first electrical 820 network and on-site power generation 850. Selection of the electrical power source in this embodiment is achieved via a controllable transfer switch 860. Optionally, the controller 870 may supply on-site electrical power to the first electrical network 820 which is similarly metered via power measuring device 845 for a commercial transaction benefiting the end-user. Also, the controller may simultaneous connect the end-user load 880 to both the first electrical network 820 and the on-site power generator 850.

As noted previously, the end-user site may not have access to piped gas network distribution and rely on refillable bottled gas fuels including, but not limited to: compressed natural gas (CNG) or liquefied gas-storage including liquefied propane gas (LPG) or liquefied natural gas (LNG).

Figure 10:
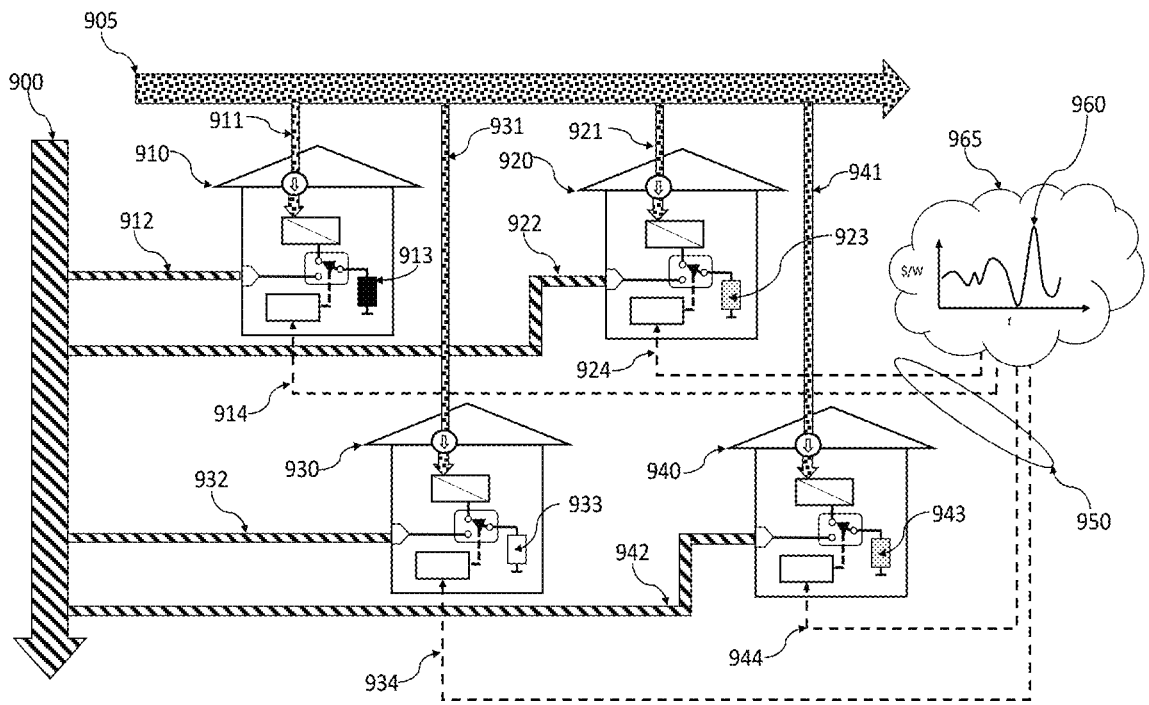
FIG. 10 is a schematic representation of an ensemble or collection of end-users each having a respective end-user electrical network interacting with a first electrical network.

Referring now to FIG. 10, there is shown a schematic representation of an ensemble or collection of end-users 910, 920, 930 and 940 each having an end-user electrical network interacting with a first electrical network 900. The electrical distribution network of the first electrical network 900 for each end-user is shown as 912, 922, 932 and 942, with each end-user metered via TOU power measuring devices. Similarly, the pressurised gas-grid 905 is distributed to the end-users via gas pipelines 911, 921, 931 and 941 each metered by the appropriate retailer.

The first electrical network time-dependent forecast 960 for the relevant regional zone comprising the smart grid is made available by a remote and real-time access database 965 and accessed or broadcast to the end-users by an information network 950 comprising data connections 914, 924, 934, and 944. The forecast is processed by each end-users controller for scheduling an appropriate demand response and selection of electrical source to service the specific end-user demand. Each end-user, in general, has differing time-dependent load requirements 913, 923, 933 and 943. In this embodiment, the forecast look ahead information 964 is the first electrical network forecast 960 which may be provided either by the market operator or the specific retailer supplying each end-user. The instantaneous end-user load profiles 913, 923, 933 and 943 reflect the individual time dependent end-user loads which are not accounted for via an estimated aggregate load profile by the first electrical network forecaster.

Figure 11:
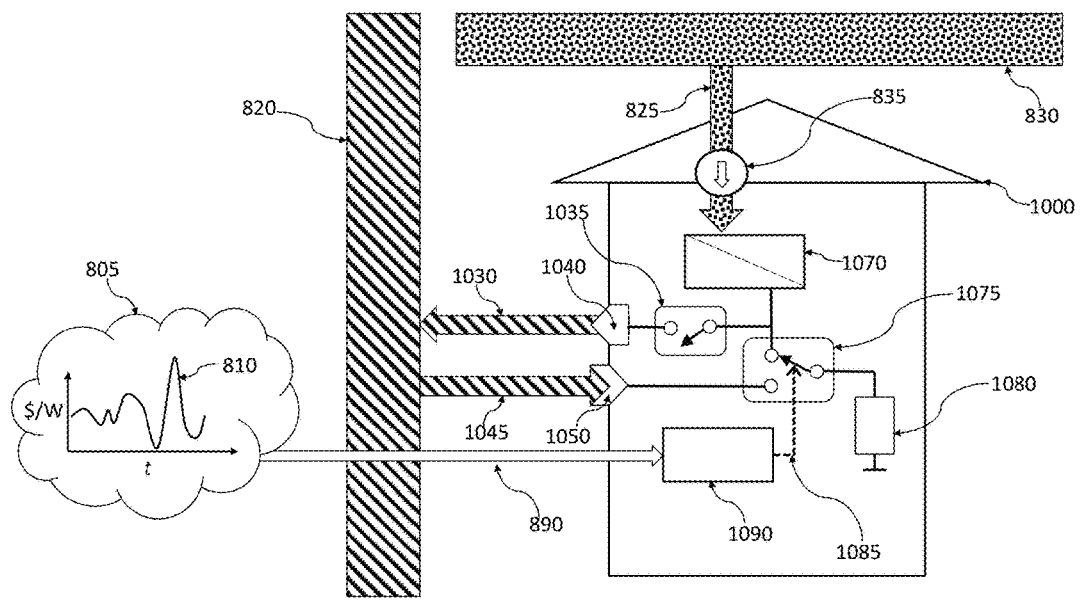
FIG. 11 is a schematic representation of a system for the transfer of electrical power between a first electricity network and a second or end-user electricity network according to another illustrative embodiment.

Referring now to FIG. 11, there is shown a system for the transfer of electrical power between a first electrical network 820 and a second or end-user electrical network 1000 according to another illustrative embodiment. In this example, end-user electrical network 1000 explicitly supplies on-site generated electrical power 1070 by transfer switch matrix formed by transfer switches 1075 and 1035 to the first electrical network 820. Metered electric power consumed from the first electrical network 820 is metered via measuring device 1050, while power supplied or delivered to the first electrical network is metered via measuring device 1040 and is connected via distribution network 1030. It is possible measuring devices 1040 and 1050 are time-of-use tariff enabled.

The load 1080 can consume electrical power from at least one of the first electrical network 1045 or the on-site gas-to-electricity converter 1070. The end-user controller 1090 controls 1080 the second or end-user electrical network system 1000 to advantage the end-user as a strategic price taker as will be described more fully below. Controller 1090 further supplies and receives signals via control lines 1085, for example signals for controlling the state of power flow for switches 1075 and on-site generator 1070 set point.

Figure 12:
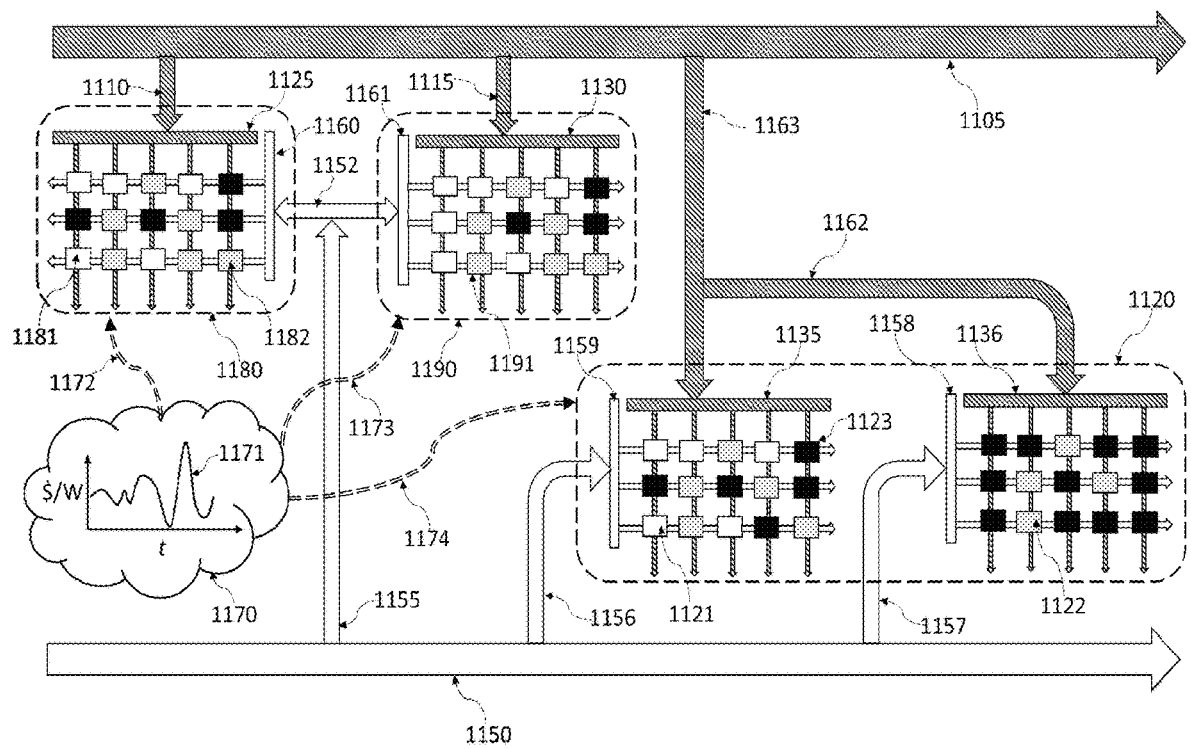
FIG. 12 is a schematic representation of a system for transfer of electrical power between a first electrical network and multiple end-user electrical networks organised in districts according to an illustrative embodiment.

Referring now to FIG. 12, there is shown a schematic representation of a system for transfer of electrical power between a first electrical network and multiple end-user electrical networks organised in districts according to an illustrative embodiment. This embodiment illustrates the large scale adoption of individual systems for the transfer of electrical power as discussed previously.

In this illustrative embodiment, the first electrical network 1105 is distributed by branch networks 1110, 1115, 1162 and 1163 and then further locally distributed by local networks 1125, 1130, 1135 and 1136. The local districts 1180, 1190 and 1120 are part of a regional zone of a smart grid having access to a first electrical network database 1170 providing publically accessible pricing information in the form of a forecast time-of-use price 1171 by telecommunications or data links 1172, 1173 and 1174. This information is then accessed by each unique end-user and relied on to control the transfer of electrical power between the first electrical network 1105 and each individual end-user network. In another embodiment, districts 1180, 1190 and 1120 may belong to different regional zones within a smart grid and would therefore access the appropriate pricing information relevant to that zone. The gas-grid 1150 is similarly distributed into the districts via pressurised pipelines 1155, 1152, 1156 and 1157, feeding local networks 1160, 1161, 1159 and 1158.

Each district 1180, 1190 and 1120 has a collection of end-users with instantaneous time-dependent loads, for example, 1181, 1182, 1191, 1121, 1122 and 1123. The estimated demand forecasted and then dispatched by the market operator does not include any awareness of the instantaneous detailed local load densities of each end-user. The variance in end-user loads is represented by the grey-scale indexing of FIG. 12.

The first electrical network 1105 is optimised for the specific mean demand averaged over the entire regional zone in accordance with the demand forecast. As is apparent from FIG. 12, each individual end-user's demand will likely differ from the mean demand. However, in accordance with this illustrative embodiment, individual end-users are able to match their first electrical network time-of-use consumption to the available first electrical network supply with the difference in each end-user's required demand being supplemented or exclusively switched to a lower cost on-site electricity generation as the case may be.

Figure 13:
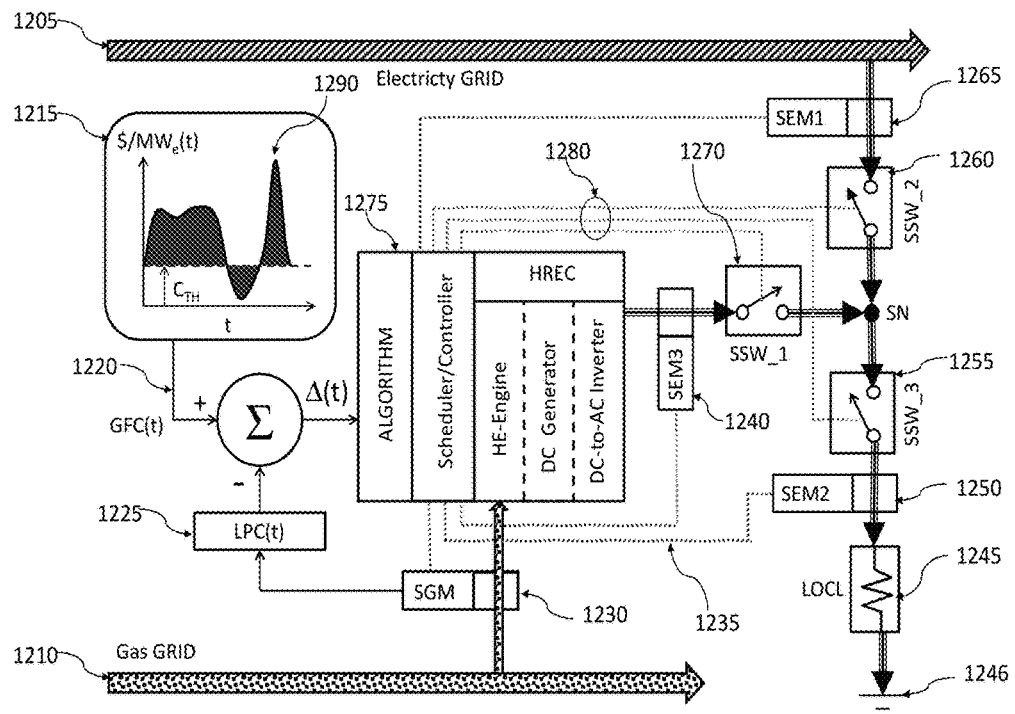
FIG. 13 is a detailed schematic representation of a system for transferring electrical power between a first electrical network and an end-user network coupled to both the first electrical network and a combustible gas supply grid according to an illustrative embodiment.

Referring now to FIG. 13, there is shown a detailed schematic representation of a system for transferring electrical power between a first electrical network 1205 and an end-user network coupled to both the first electrical network 1205 and a combustible gas supply grid 1210.

The first electrical network pricing information or forecast 1290 is acquired by data acquisition module 1215 which provides the forecasted time-of-use pricing for off-take from the first electrical network 1205. The cost of the metered gas 1230 provided by gas grid 1210 may be calculated in accordance with the gas-retailer tariff and provides a local power generation cost 1225 based on the achievable load and efficiency of the on-site power generation plant. The time dependent cost difference schedule Δ(t) (calculated as the time dependent price difference between 1220 and 1225) is input into the controller 1275 which includes a data processor for generating control signals for controlling the second or end-user electrical network's demand response. In this illustrative embodiment, the controller is configured to provide the local load (ie LOCL) 1245 with the lowest cost of on-demand electrical power.

By providing a cost based decision for time dependent events, the local load 1245 will always be supplied with the lesser cost of electricity supplied by the first electrical network 1205 or generated on-demand by the high efficiency gas-to-electrical power generation plant, comprising the high efficiency ICRE Engine (HE-Engine), AC-DC Generator/Alternator and DC-AC converter. The gas meter 1230 may be a smart meter enabling retailer remote access for on-site time logged consumption. The electricity consumption meter 1265 may also be a smart meter enabled for retailer access of time-of-use consumption. Second network instantaneous power measuring devices 1240 and 1250 provide signals 1235 for closed loop control of the end-user electrical network by the controller 1275.

Transfer switches 1260, 1270 and 1255 may be controlled by either wired signals or wireless communication links 1280. For example, if the end-user load at a time t demands $P_e$ kW of power, then the demand or power transfer schedule generated by the controller 1275 will configure the second electrical network's configuration to supply the lowest cost source of electricity to the load 1245. For example, the first electrical network's time-of-use price 1290 may exceed that of the on-site generation cost which as a result initiates the on-site power generation plant and supplies the generated power to the load 1245 by closed transfer switches 1270 and 1255.

The first electrical network 1205 may remain connected to the load 1245 by closed transfer switch 1260. In order for minimal or no disruption, the on-site generator may be configured to match the active line frequency and phase of the first electrical network 1205, which is achieved by at least one fast transfer switch or a phase matching inverter. The on-site power generation plant may optionally seek to operate at a higher load and inject the surplus power not consumed by the load 1245 into the first electrical network 1205. The surplus power is then metered for reimbursement to the end-user by the electricity retailer by use of the secure metering device 1265. An optional heat recovery electricity converter (HREC) may be used to improve the on-site generation efficiency and thus lower the on-site generation cost.

In one embodiment, the controller as referred to previously implements a power transfer schedule which controls the switching between electrical power sources at the end-user and further is operative to supply electrical power from the end-user whether stored or generated by an on-site generator as will be described below.

Figure 14:
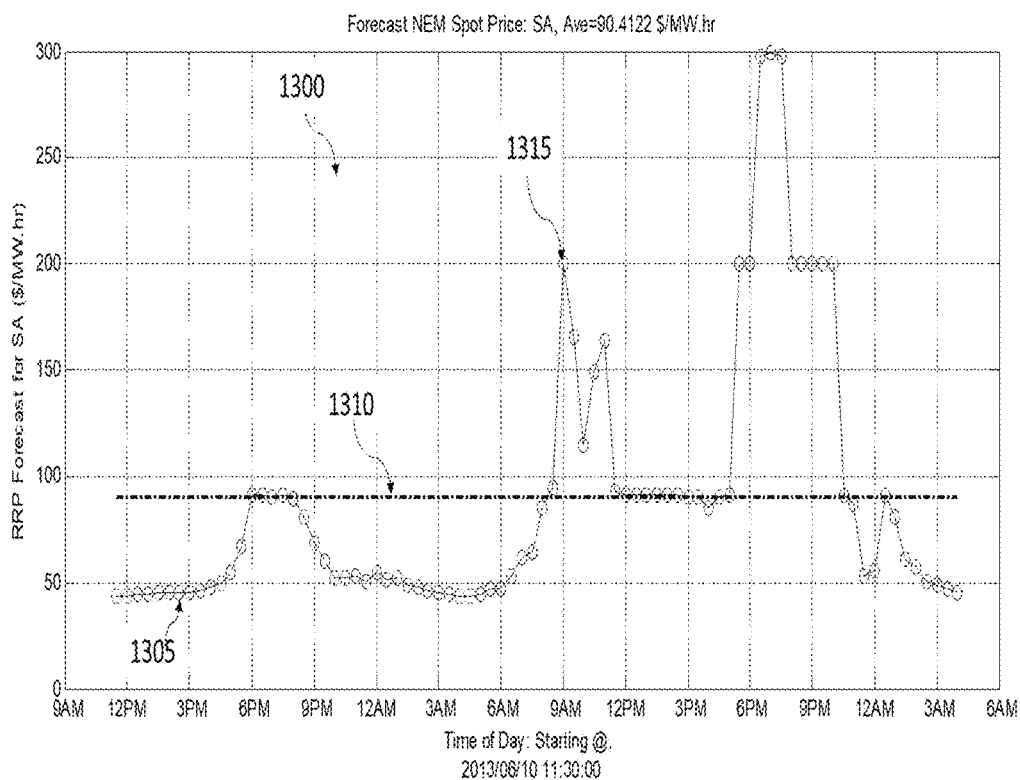
FIG. 14 is a graph of example pricing information in the form of forecast time dependent cost or pricing data for a demand region (ie South Australia) of a smart grid in Australia (ie the National Energy Market (NEM) managed by the Australian Energy Market Operator (AEMO))

Referring now to FIG. 14, there is shown a graph of pricing information 1300 in the form of forecast time dependent wholesale cost or pricing for a regional zone, namely South Australia, in a smart grid, namely the National Energy Market (NEM) of Australia, for in this case a 1-day look ahead. The running average price 1310 over the specified time forecast window is a regional wholesale cost of $90/MW$_e$h. This is the forecast pool price set by the market operator for the NEM smart grid which in this example is the Australian Energy Market Operator (AEMO). Retailers bid for purchase of power blocks against this incontestable pool price. As can be seen from an inspection of FIG. 14, peak demand times are generally between 6 pm-9 pm which in general coincides with peak time pool pricing. As can be seen by inspection of FIG. 14, pricing anomalies such as events 1315 also occur requiring the retailers to adopt hedging strategies to minimise their exposure to the market. In general, low regional electricity demand attracts low pool spot prices, as shown by event 1305.

Figure 1:
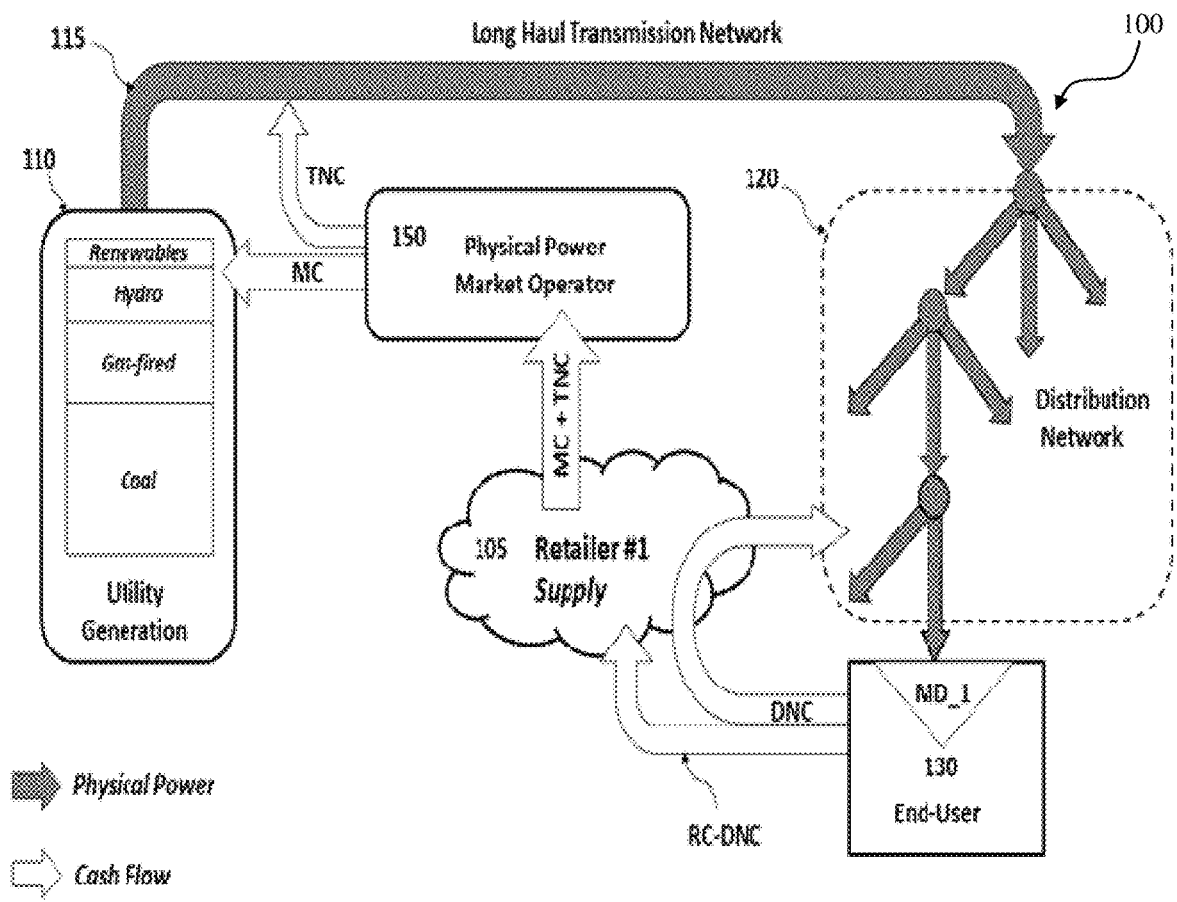
FIG. 1 is a schematic representation of a smart grid under the administration of a market operator comprising a first electrical network including electricity generation sources, transmission networks, a retailer and an end-user illustrating the physical electrical power flow and the transaction cost arrangements.
Figure 2:
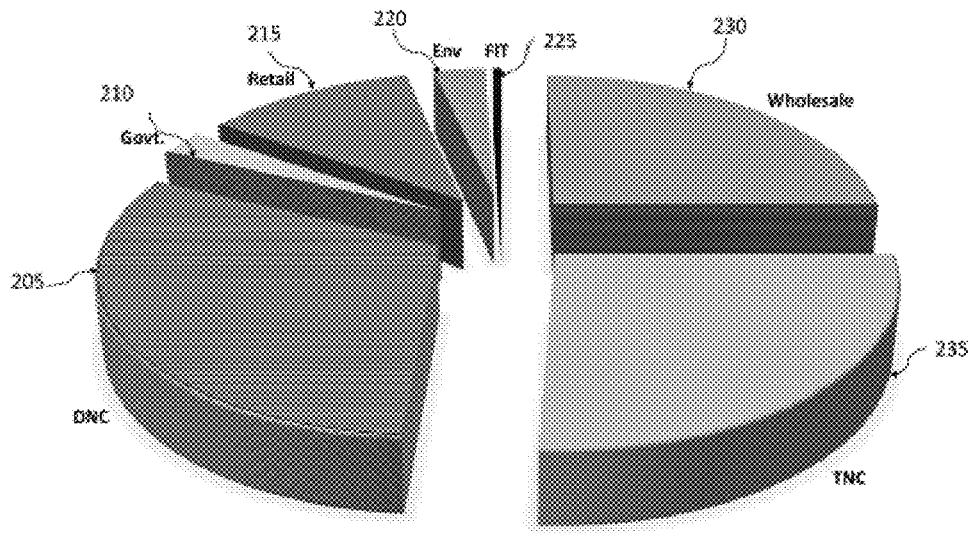
FIG. 2 is a pie chart of the representative component costs of the end-user cost based on the Australian electricity market over 2012/2013.
Figure 3:
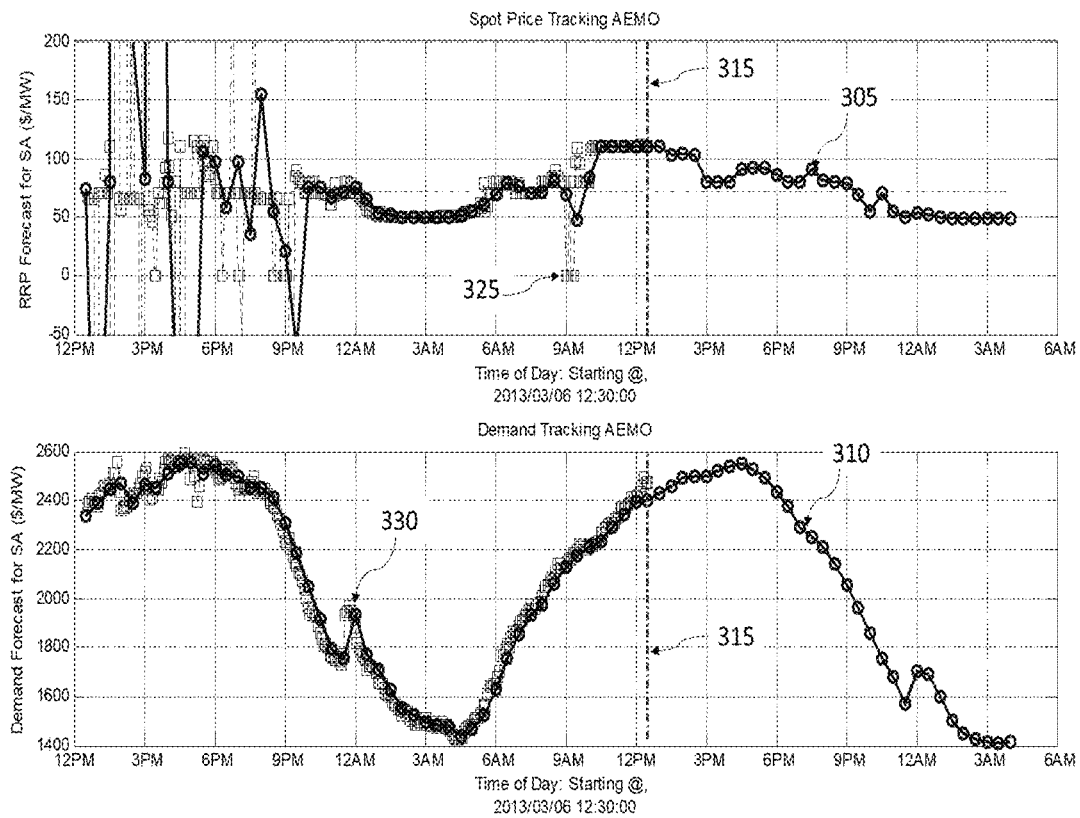
FIG. 3 depicts representative look-ahead forecast data for a regional zone of a smart grid. The upper chart shows the forecast pool price data at 30 min interval resolution (circles) and the actual settled spot prices every 5 mins (squares) over an extended period. The lower chart similarly shows the forecast and actual demand dispatched electricity over the same period (data taken from the Australian smart grid for South Australia region zone)
Figure 4:
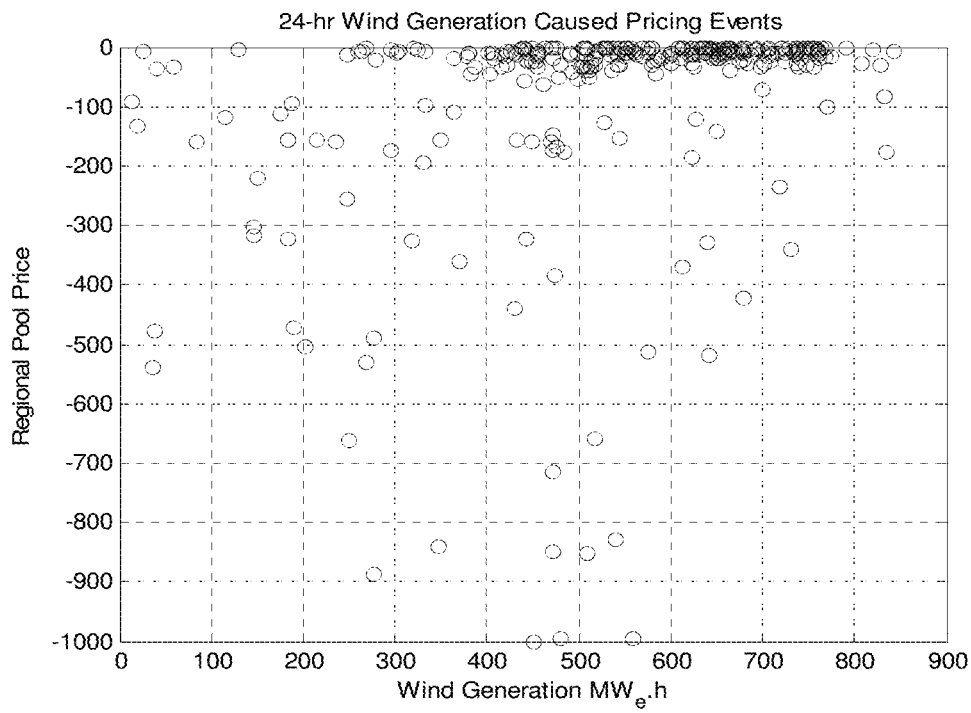
FIG. 4 is a representative actual Australian electricity market data for region pool price versus actual wind generation dispatched in South Australia to the smart grid over a 24-hour period.
Figure 15:
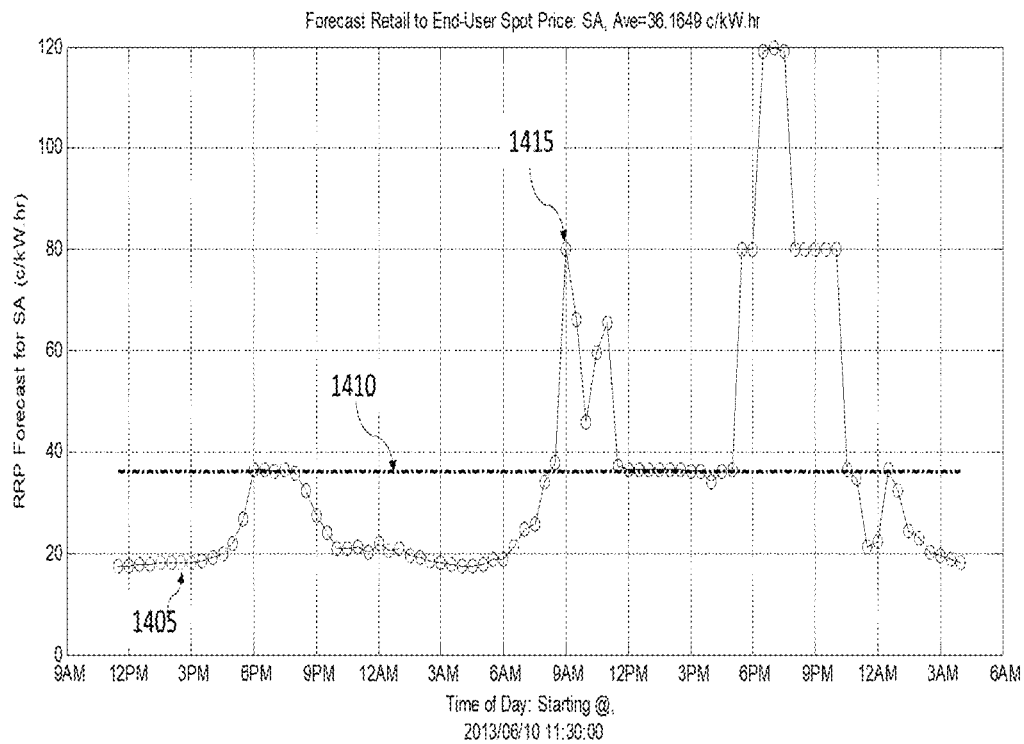
FIG. 15 is a graph of example pricing information in the form of end-user forecast time-of-use pricing as would be provided by the first electrical network retailer based on the regional wholesale forecast data illustrated in FIG. 14.

Referring now to FIG. 15, by decomposing the actual end-user costs toward the various market participants (eg as shown in FIG. 2), the percentage of wholesale regional cost can be used to determine or calculate pricing information in terms of a forecast end-user time-of-use price that will be applied by a retailer to an end-user. This is depicted in FIG. 15 which shows the calculated retail time-of-use price 1405 set by the retailer based on, or as converted from, the regional wholesale forecast pool price 1305 set out in FIG. 14. As such, an end-user would therefore calculate or receive directly from their electricity retailer the forecast time-of-use pricing as shown in FIG. 15 with, in this example, the average TOU price 1410 over the time period depicted of AU$0.3616/kWh. Relating the wholesale market regional spot price to the actual regional retail price provided to an end-user is shown by comparing pricing events 1305, 1310 and 1315 with simultaneous retail events 1405, 1410 and 1415, shown over an exemplary 3 day period in this case.

In view of known gas consumption pricing at the end-user site, a local electricity generation cost can be calculated using the known gas-to-electricity conversion efficiency $\eta_{gen}$. As before, if the gas pricing is stated in terms of the multiplier $M_{gas}$ above the wholesale regional gas price [$/Joule]$_{WS}$, where $$M_{gas} = \frac{[\$/\text{Joule}]_{LOC}}{[\$/\text{Joule}]_{WS}}$$

then FIGS. 16, 17, 18 and 19 show the possible demand responses possible over the forecasted window for various $M_{gas}$ and $\eta_{gen}$.

Referring now to FIGS. 16 to 19, there are shown graphs of the calculated forecast retail price as illustrated in FIG. 15 as compared to calculated thresholds for switching between the first electrical network (ie the smart grid) and on-site generation of power to supply or meet the on-site demand or load requirements for various assumed values for $M_{gas}$ and $\eta_{gen}$. These thresholds are then used by the controller to determine a power transfer schedule for operatively switching between the first electrical network and the on-site generation at the second or end-user electrical network over a forecast period.

Figure 16:
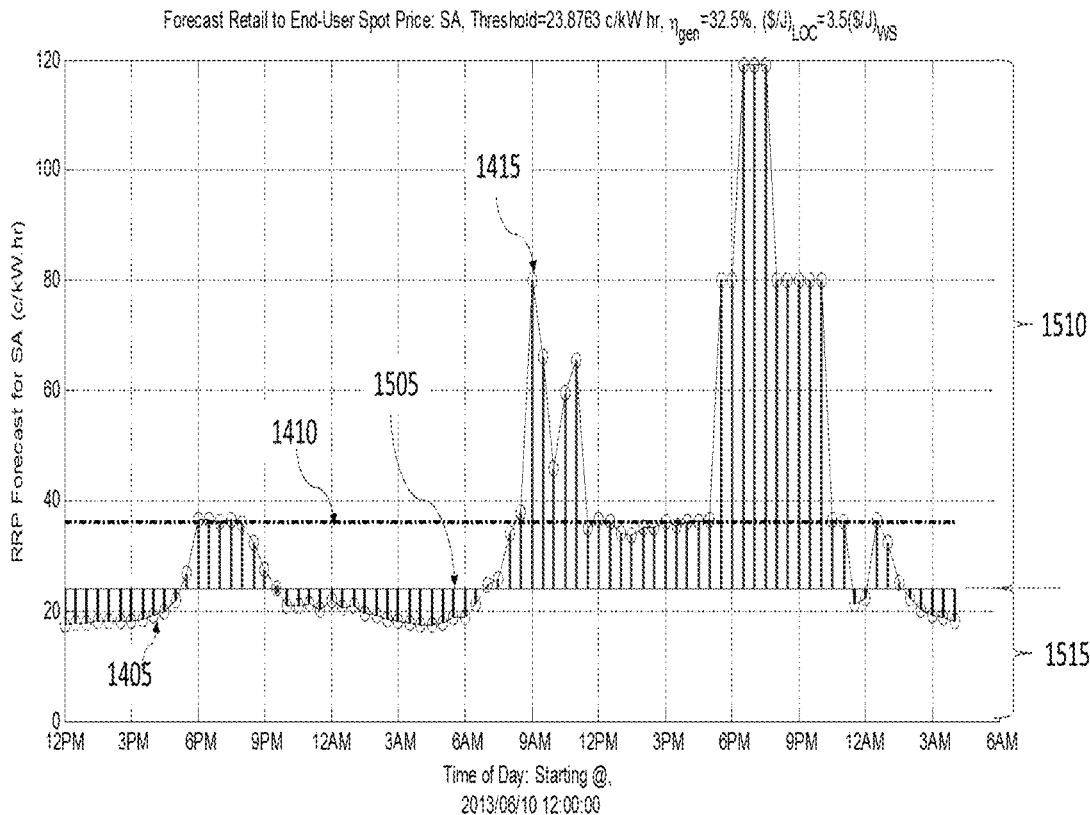
FIG. 16 is a graph of the forecast retail cost to an end-user for supply of electricity from the smart grid as a function of time of day depicting the threshold for switching between on-site generation and the first electrical network for $\eta_{gen}=32.5\%$ and $M_{gas}=3.5$.

FIG. 16 shows a threshold cost 1505 for on-site generation of [$/kW$_e$h]$_{LOC}$=AU$0.239/kW$_e$h for $\eta_{gen}$=32.5% and $M_{gas}$=3.5. In this example, for power consumption corresponding to pricing events 1510, the power transfer schedule would schedule the generation of power by the on-site generator whereas for power consumption corresponding to pricing events 1515 the power transfer schedule would supply from the first electrical network on the basis that the supply cost from the first electrical network falls below threshold cost 1505. As would be appreciated, the power transfer schedule consists of a timed sequence of switching events as implemented by the controller. As an example, at 12 am on day 2 the power transfer schedule would switch supply from the first electrical network to on-site power generation on the basis that the cost for on-site generation is now less than the now increased cost of supply from the first electrical network.

Figure 17:
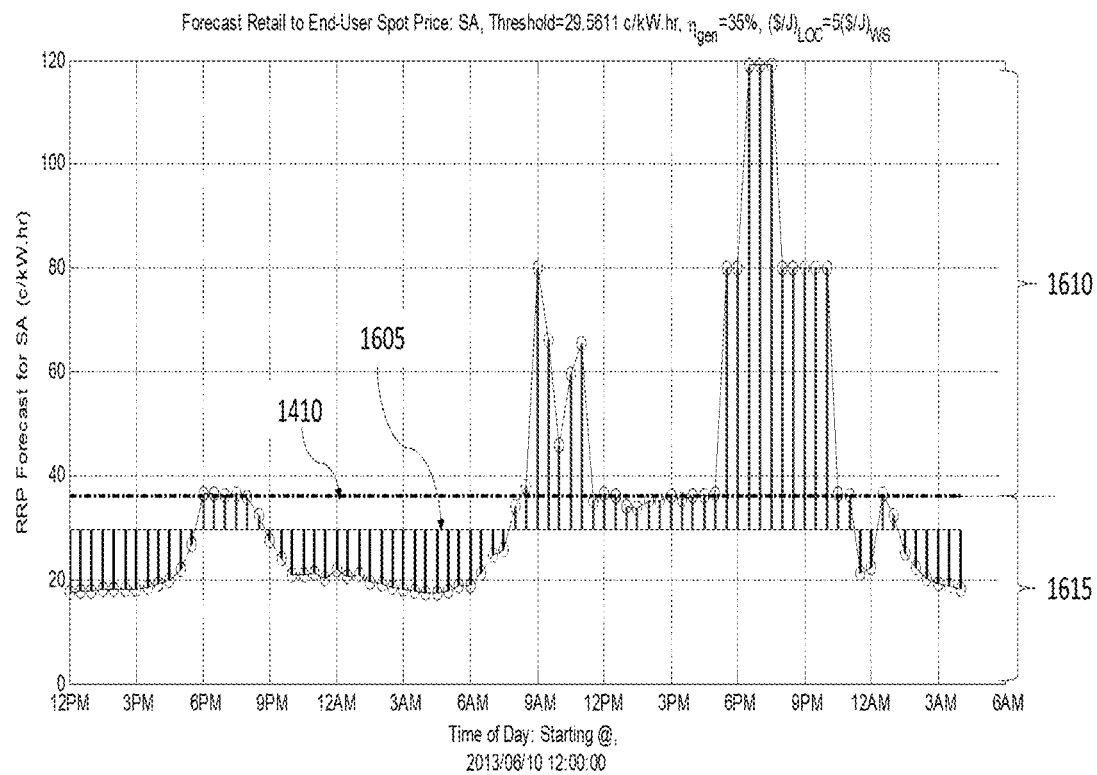
FIG. 17 is a graph of the forecast retail cost to an end-user for supply of electricity from the smart grid as a function of time of day depicting the threshold for switching between on-site generation and the first electrical network for $\eta_{gen}=35\%$ and $M_{gas}=5$.

FIG. 17 shows a threshold cost for on-site generation of [$/kW$_e$h]$_{LOC}$=AU$0.296/kW$_e$h for $\eta_{gen}$=35% and $M_{gas}$=5. In this example, for power consumption corresponding to pricing events 1610, the power transfer schedule would schedule the generation of power by the on-site generator whereas for power consumption corresponding to pricing events 1615 the power transfer schedule would supply from the first electrical network on the basis that the supply cost from the first electrical network falls below threshold cost 1605. As would be appreciated, the power transfer schedule consists of a timed sequence of switching events as implemented by the controller. As an example, at approximately 7.30 am on day 1 the power transfer schedule would switch supply from the first electrical network to on-site power generation on the basis that the cost for on-site generation is now less than the now increased cost of supply from the first electrical network.

Figure 18:
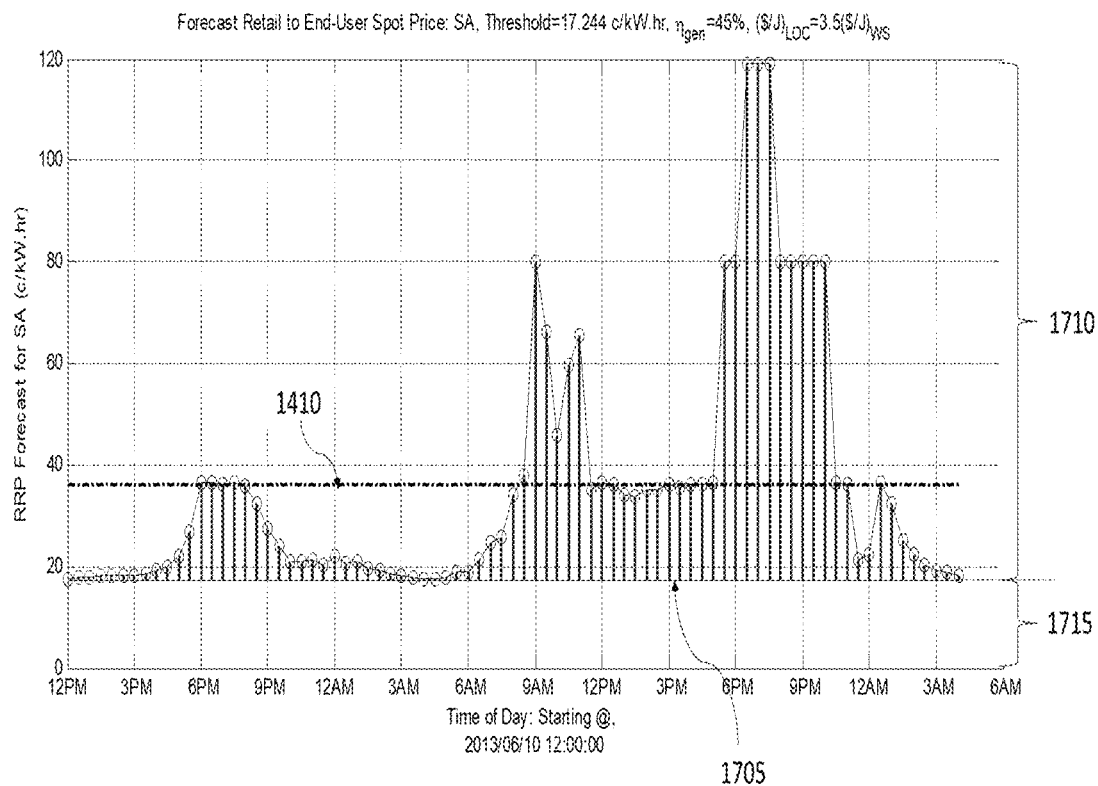
FIG. 18 is a graph of the forecast retail cost to an end-user for supply of electricity from the smart grid as a function of time of day depicting the threshold for switching between on-site generation and the first electrical network for $\eta_{gen}=45\%$ and $M_{gas}=3.5$.

FIG. 18 shows a threshold cost for on-site generation of [$/kW$_e$h]$_{LOC}$=AU$0.172/kW$_e$h for $\eta_{gen}$=45% and $M_{gas}$=3.5. In this example, for power consumption corresponding to pricing events 1710, the power transfer schedule would schedule the generation of power by the on-site generator whereas for power consumption corresponding to pricing events 1715 the power transfer schedule would supply from the first electrical network on the basis that the supply cost from the first electrical network falls below threshold cost 1705. As would be appreciated, the power transfer schedule consists of a timed sequence of switching events as implemented by the controller. In this example, where both $\eta_{gen}$ and $M_{gas}$ are favourable to the end-user, given the high gas-to-electricity conversion efficiency and price of gas, it can be seen that the power transfer schedule would leave the on-site power generation on during the entire time period depicted as the cost for on-site generation is always less than the cost of supply from the first electrical network.

Figure 19:
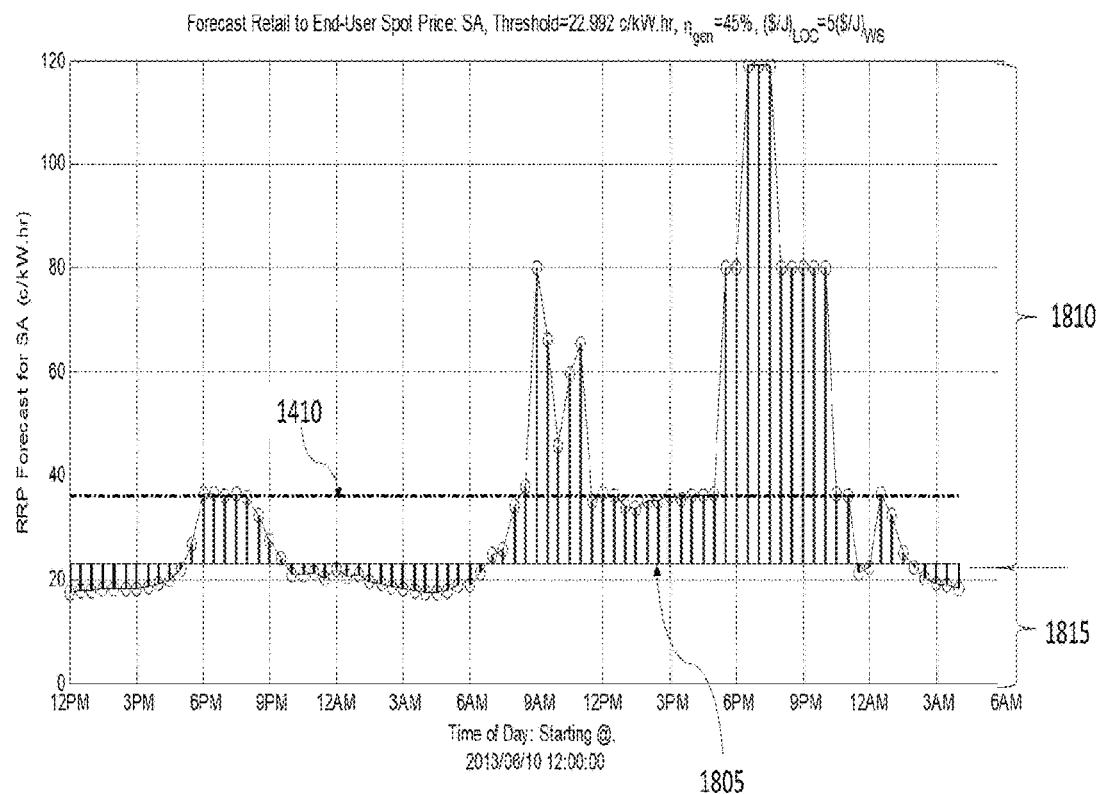
FIG. 19 is a graph of the forecast retail cost to an end-user for supply of electricity from the smart grid as a function of time of day depicting the threshold for switching between on-site generation and the first electrical network for $\eta_{gen}=45\%$ and $M_{gas}=5$.

FIG. 19 shows a threshold cost for on-site generation of [$/kW$_e$h]$_{LOC}$=AU$0.230/kW$_e$h for $\eta_{gen}$=45% and $M_{gas}$=5. In this example, for power consumption corresponding to pricing events 1810, the power transfer schedule would schedule the generation of power by the on-site generator whereas for power consumption corresponding to pricing events 1815 the power transfer schedule would supply from the first electrical network on the basis that the supply cost from the first electrical network falls below threshold cost 1805. As would be appreciated, the power transfer schedule consists of a timed sequence of switching events as implemented by the controller. As an example, between approximately 10.00 pm-6.00 am on day 1 the power transfer schedule would switch supply from the on-site power generation to the first electrical network given the low cost of supply from the first electrical network as compared to the cost of on-site power generation.

As would be appreciated by those of ordinary skill in the art, use of on-site electrical power generation when combined with pricing information provided by the first electrical network allows the end-user to advantageously minimise their power costs. As can be seen from the above examples, it is advantageous for a significant portion of the forecast window to utilise on-site power generation. Not only does this provide a price advantage to the end-user, from the perspective of the first electrical network having end-users who are able to generate on-site power will function to reduce peak and anomalous pricing events more generally as these are essentially removed from the consumption profile of that end-user.

Economic Analysis

A life-cycle analysis may be used in order to evaluate the economic performance of a power transfer or switching system as has been previously described. The life-cycle cost of a system comprises the initial cost in addition to the lifetime cost of maintenance and operation discounted to the present time. The life-cycle benefit is the total value of all the energy produced over the lifetime of the power transfer system similarly discounted to the present time. Costs and benefits for each operational year are projected and then discounted back to the year of installation to obtain the present value. The present value of the benefits may then be compared to the present value of the costs.

In order to carry out the economic calculation the following assumptions are made:
  i. r=interest rate
  ii. N=Lifetime of the system in years
  iii. g=savings escalator
  iv. CI=Initial Capital of investment
  v. OM & TI Operation, Maintenance & Insurance first year The economic viability of the system is thus determined by the comparison of the costs to the benefits. The net present value (NPV) is the difference between the present value of the power transfer system lifetime resulting benefits ($PV_B$) and the present value of the cost ($PV_C$) generated by acquiring and operating the system over its entire lifetime, such that $$NPV = PV_B - PV_C$$

Therefore, an economically viable power transfer system is one that generates benefits over the system lifetime that exceed the resulting total cost over the same period, necessarily requiring the NPV>0. For the case where the benefit equals the cost, then the system breaks even. Conversely, for the case wherein NPV<0, then the power transfer system is uneconomic as the benefits generated over the entire lifetime will not cover the invested cost. In the following, the Net Present Value of Lifetime System Cost $PV_C$ and the Net Present Value of Lifetime System Benefit $PV_B$ will be calculated and compared.

Net Present Value of Lifetime System Cost

System cost includes the initial investment capital (CI) needed to acquire and install the system plus the Insurance (TI) and Operation & Maintenance (OM) Costs. The present value of lifetime system cost, $PV_C$ is then given by:

$$PV_C = CI + \frac{(OM\ \&\ TI) \cdot CI}{CRF}$$

Where, OM & TI=Sum of the Maintenance, Property Tax & Insurance percentage multiplier for annual payments; and CRF=Capital Recovery Factor. The Capital Recovery Factor (CRF) is used to discount future payments to the present and tabulated as:

$$CRF = \frac{r(1+r)^N}{r(1+r)^N - 1}$$

where N is the year of service for the system.

Net Present Value of Lifetime System Benefit

Lifetime system benefits can be calculated by defining the First Year Benefits ($X_O$) which is the price of the energy produced by the system at its first year of operation. In order to calculate the present value of $X_O$, it must be calculated considering the electricity price escalation and the inflation. It is possible to obtain the present value of the lifetime benefits ($PV_B$) by simply multiplying the First Year Benefit $X_O$ by a single calculated parameter Mg, representing the benefits present value multiplier. That is, $$PV_B = M_B X_0$$

The Net First Year Energy Savings $X_O$ can thus be used to determine the lifetime benefit of the system.

$$X_O = \text{(First Year Energy Savings)} - \text{(Maintenance \& Insurance Cost)}$$

The net present value benefit multiplier $M_B$ is used to calculate the present value benefit $PV_B$. It can be accounted using the following expression:

$$M_B = \frac{1+g}{r-g}\left[1 - \left(\frac{1+g}{1+r}\right)^N\right]$$

Present Value Multiplier at different system lifetimes taking into account a fixed interest rate of (typically 7%) and an escalation rate for energy cost g=10%.

Figure 20:
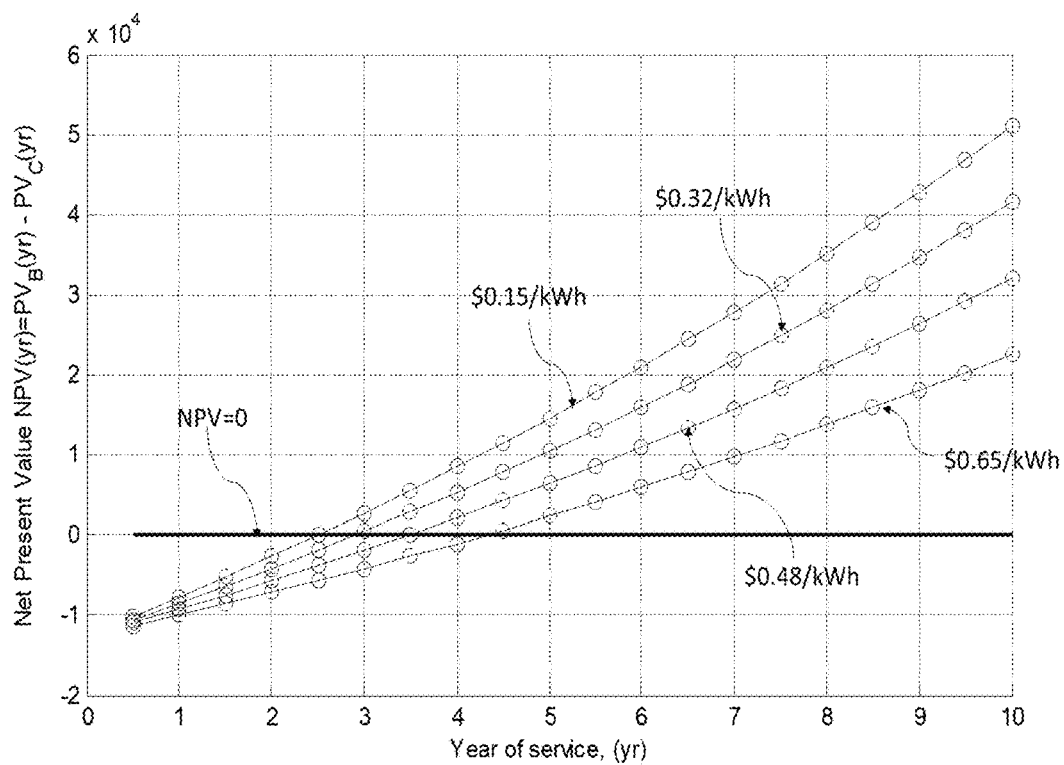
FIG. 20 is a graph of a NPV analysis as a function of years of service for an on-site gas-to-electricity converter.

Referring now to FIG. 20, there is shown an example NPV analysis of a small $P_{gen}$=5 $kW_e$.h generation plant with CI=(5 $kW_e$.h)*($3.0/$W_e$) and a grid off-take price of $0.48/kWh as a function of system lifetime. NPV analyses are also shown for grid off-take prices of $0.15/kWh, $0.32/kWh and $0.65/kWh in FIG. 20. Assuming the on-site generation can produce 50% of the total end-user daily demand of $P_{tot}$=25 $kW_e$.h, it is found that pay-back is possible between 2 and 5 years depending on the gas fuel costs for a generation efficiency of $\eta_{gen}$=35%.

On Site Gas-to Electricity Generators

There are a number of options available for an end-user for on-site electrical power generation based on combustible or hydrocarbon gas. As would be appreciated, there are several methods available for converting the potential chemical energy of a hydrocarbon fuel into electrical energy. For example, the stored chemical energy within the hydrocarbon fuel (eg methane) may be chemically converted into another species such as hydrogen gas. In this example, the hydrogen may be used for combustion or used directly as a component fuel for a hydrogen-oxygen fuel cell.

Reforming of methane into hydrogen is, however, a relatively complex process and can suffer from poor conversion efficiency. In fact, most hydrocarbon gas fuel cells typically require a reforming step prior to obtaining sufficient hydrogen gas for a $H_2/O_2$ fuel cell. While the $H_2/O_2$ fuel cell is extremely efficient in producing electrical energy, the prior reforming step is likely to be only of poor or moderate efficiency, with a large proportion of the $CH_4$ being burnt in the reforming process (eg solid oxide fuel cell reforming process).

Yet another method is the combustion of methane within a gas-fired turbine or micro-turbine. These high speed combustion turbines produce relatively high rotational speeds and are well suited to large scale power plants (eg open cycle gas-turbines and closed cycle gas-turbines) when the rotating shaft is coupled to an alternator. The gas-to-electrical conversion efficiencies of micro-turbines when coupled to electrical generation may be relatively high 35-40%, and can therefore offer an advantage in this respect. The large amount of heat rejected from micro-turbines of this type can also be recovered via heated water or secondary steam powered electrical generation, however, it is relatively challenging to improve the fundamental efficiency of the combustion turbine beyond 40% on current technologies.

In another example, the on-site generator may be a natural gas-fired internal combustion reciprocating engines (ICREs). It is noted that the capital cost of fuel cells are at present 5-10 times those of reciprocating engines, however, extremely low operating noise is possible. Present day micro-turbines have a considerably high capital cost and require a high level of maintenance making this technology better suited to larger applications of 100 kW or more. Furthermore, their output exhaust gas temperatures are significantly higher than an equivalent reciprocating engine and may include harmful emissions products as compared to ICREs.

Although, ultimately the choice of gas-to-electricity on-site generation will be dependent on the end-user requirements, the use of ICRE's for domestic requirements is presently indicated as it represents a mature technology having a number of advantages including:
  (i) low maintenance;
  (ii) low capital cost;
  (iii) high efficiency;
  (iv) high reliability and durability;
  (v) mature technology;
  (vi) small form factor,
  (vii) used in many parallel applications (e.g., automotive); and
  (viii) a well-defined technology roadmap for incremental improvements well beyond the next 20 years.

As referred to above there are constant and incremental improvements in materials and technology that provide ICRE's with improved efficiencies especially when coupled to electromotive generators with near ideal conversion efficiencies. For example, linear free-piston engines coupled to linear generators offer the potential of high gas-to-electricity conversion efficiency. Modifications to the standard 4-stroke Otto and Miller cycles include multi-stroke engines with gas expansion scavenging to also improve overall efficiency.

As would be appreciated, ICREs offer significant advantages for domestic applications. However, any technology which is capable of converting hydrocarbon fuel into electrical energy is contemplated to be within the scope of the present invention. A gas-to-electricity conversion efficiency of greater than or equal to 20% is preferable with further benefits if the efficiency is greater than or equal to 30% or even greater than 40%. Conversely, if the cost of gas feedstock is sufficiently low or provided to an end-user at sufficiently low cost or as a by-product or even waste, then the efficiency of the gas-to-electricity conversion module may be even less than 20% and still provide an economical benefit to the end-user.

Figure 21:
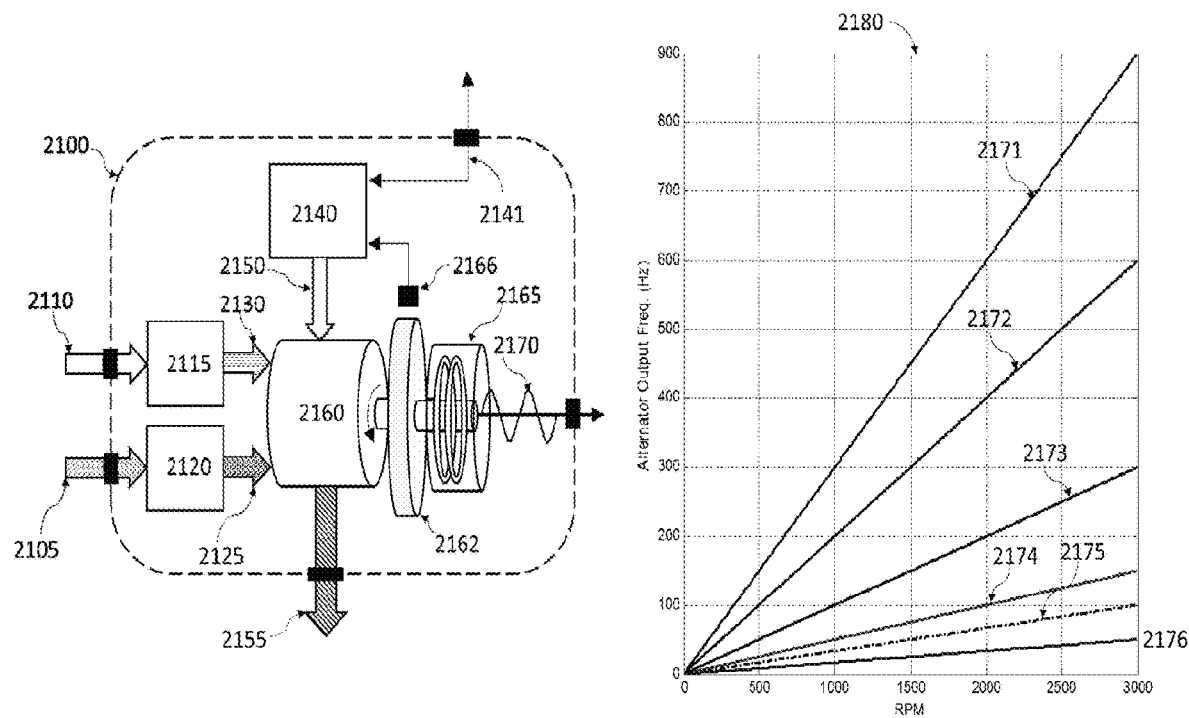
FIG. 21 depicts on the left hand side a detailed schematic representation of the gas-to-electricity converter illustrated in FIG. 6 in the form of an internal combustion reciprocating engine (ICRE) and alternator arrangement and on the right hand side a graph of the alternating current frequency as a function of shaft rotation produced by the alternator for varying numbers of pole pairs.

Referring now to FIG. 21, there is shown on the left hand side a detailed schematic representation of the gas-to-electricity converter 2100 illustrated in FIG. 6 (see item 560) in the form of an ICRE 1160 and an alternator 2165. In this illustrative embodiment, ICRE 1160 is a stationary engine 2160 supplied by oxidant 2110 and hydrocarbon fuel 2105. The air and fuel may be pre-treated in 2115 and 2120, respectively, for the purpose of improving the combustion efficiency within ICRE 1160. The optionally enhanced air 2130 and fuel 2125 are supplied as controlled feedstock for consumption by the ICRE 1160. Combustion by-products from the ICRE 1160 are ejected as exhaust gas 2155 which may be further used for energy recovery (eg thermoelectric energy scavenging and/or thermo-mechanical scavenging for turbo-charging).

An optional flywheel 2162 may be coupled to the rotating shaft of the ICRE 1160, with the rotating shaft further delivering rotational energy to an electrical alternator and/or generator 2165. The electrical output of the generator 2165 may be alternating current or substantially direct current. In this illustrative embodiment, the first rotational-to-electrical device is an alternator producing a substantially sinusoidal single or poly-phase alternating current output 2170. Sensor 2166 detects the shaft rotational speed which is used as a feedback signal to a control module 2140 to stabilise or lock to a specified rotational shaft speed the shaft rotational speed of ICRE 1160.

Control module 2140 is provided with a data communications link 2141 which can set and interrogate the operation of the plant 2100. The control module 2140 further functions to control via signals 2150 the firing sequence of the pistons, valves and internal timing of ICRE 1160. In preference, but not limited to, is the use of electromechanical cylinder valve actuation devices for the intake and exhaust sequences. These are electromechanical actuators for opening and closing the cylinder head intake/exhaust sequences and may be controlled electronically and without mechanical-to-mechanical linkages to further optimise the engine efficiencies across a wide range of operating conditions.

In one mode of operation, the output electrical frequency of gas-to-electricity converter 2100 matches the line frequency of the end-user second electrical network and the first electrical or supply network. This requires synchronisation of the shaft rotating speed and phase to the first electrical network. For direct coupling of the alternator to the shaft rotation, the specific rotational speed and the specific number of pole pairs within the alternator will determine the output frequency 2170.

Referring again to FIG. 21, on the right hand side there is shown a graph 2180 of the alternating current frequency as a function of shaft rotation produced by the alternator for varying numbers of pole pairs $N_p$. FIG. 21 shows the cases of 2176 ($N_p$=2), 2175 ($N_p$=4), 2174 ($N_p$=6), 2173 ($N_p$=12), 2172 ($N_p$=24) and 2171 ($N_p$=36). Therefore, depending on the range of ICRE rotation speed for acceptable load response and efficiency, an appropriate number of poles may be chosen to match to $f_0$=50 Hz or any desired output frequency.

In other illustrative embodiments, there is provided a tuneable supply to match the dynamic end-user demand. It is preferable then for the ICRE to produce electrical power decoupled from the line frequency of the end-user or second electrical network load. Embodiments of this type are discussed with reference to FIGS. 22 and 23a.

Figure 22:
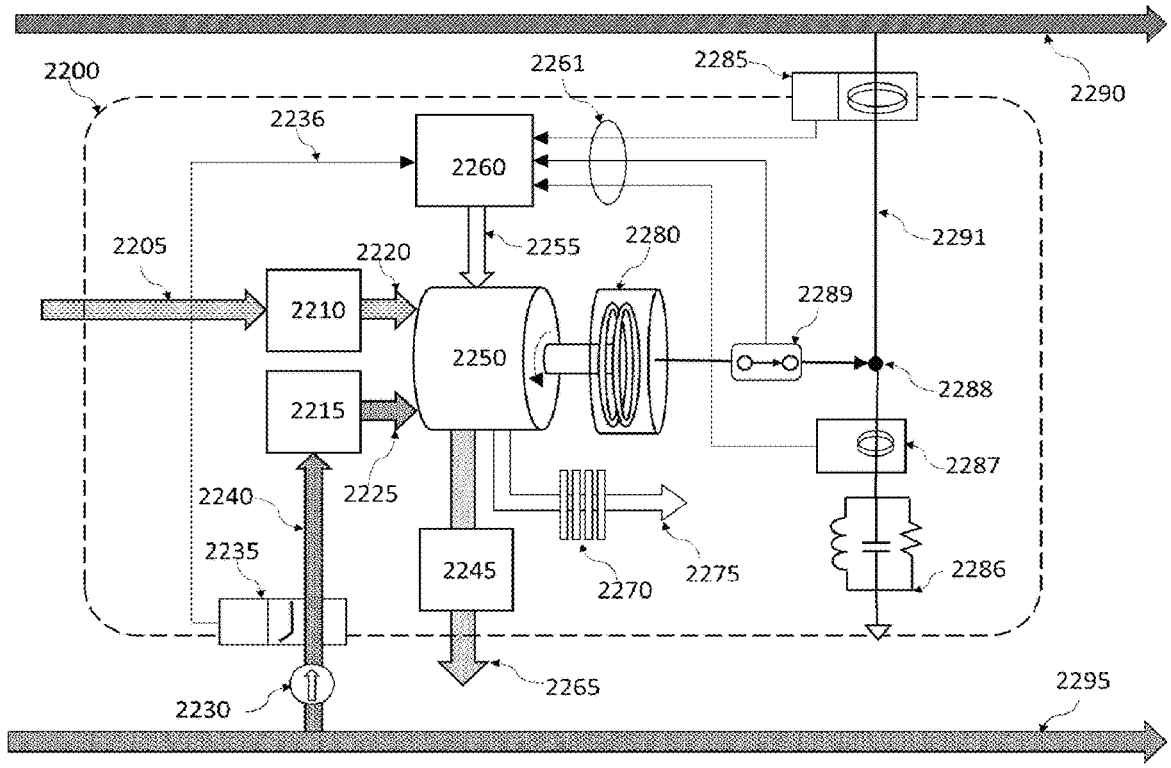
FIG. 22 is a schematic representation of system for transfer of electrical power between a first electrical network and a second electrical network further incorporating a gas supply network for use by an on-site gas-to-electricity converter in accordance with an illustrative embodiment.
Figure 23A:
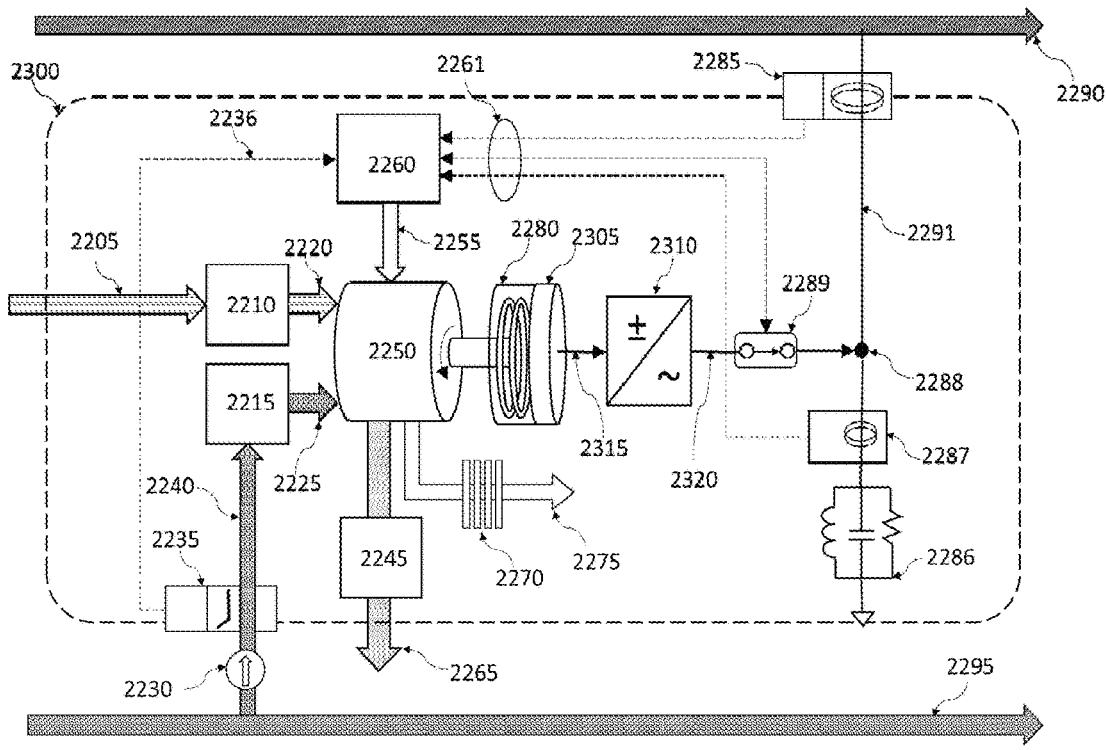
FIG. 23a is a schematic representation of a system for transfer of electrical power between a first electrical network and a second electrical network further incorporating a gas supply network for use by an on-site gas-to-electricity converter in accordance with another illustrative embodiment.

Referring now to FIGS. 22 and 23a, there are shown schematic representations of systems for transfer of electrical power between a first electrical network 2290 to a second electrical or end-user network 2200, 2300 further incorporating supply by a combustible gas supply grid 2295 for use by an on-site gas-to-electricity converter 2250. The first electrical network electricity consumed by the second or end-user electrical network is metered by time-of-use energy meter 2285 and the gas supply network consumption is metered by measuring device 2235. A gas pressure regulator 2230 supplies hydrocarbon fuel to the end-user gas-to-electricity converter 2250. As would be appreciated, gas sourced from gas supply network 2295 may also be consumed for other purposes within the end-user plant. The end-user electrical load 2286 is both resistive and reactive and is further metered in real-time by measuring device 2287. Control and telemetry signals are provided to the system components to and from the controller 2260 by wireless or wired connections 2255, 2261 and 2236. Catalytic conversion 2245 of exhaust products 2265 reduces at least one of the oxides of carbon, sulphur and nitrogen in the expelled gas stream. Thermal recovery 2270 provides heat energy 2275 for further utility by the end-user.

Referring again to FIG. 22. ICRE 2250 is fed with ambient air 2205, which may be processed further 2210 and injected 1220 into the ICRE 2250 intake manifold. Hydrocarbon fuel 2240 is provided to fuel processor 2215 and then injected 2225 into the ICRE 2250 intake manifold. The air-to-fuel ratio is controlled by the controller 2260 and modifiers 2210 and 2215. For example, modifiers may be programmed to alter the air to fuel mixture ratio depending upon the electrical load demanded of the generator 2280 which in turn mechanically loads the ICRE 2250 output shaft. Both the TOU pricing of electricity 2285 and gas unit pricing 2235 forms pricing information that is used by the controller 2260, as will be described in detail later, to further provides control signals within the end-user network in the form of a power transfer schedule to provide the required demand response.

A transfer switch 2289 is electrically connected to the end-user load 2286 and the first electrical network metered supply at point 2288. At advantageous price taking events, the end-user on-site generation plant or gas-to-electricity converter provides energy to the second electrical network load 2286, and optionally if the power generated is in excess of specific real-time demand of load 2286, the excess energy is capable of being delivered into the first electrical network via metering device 2285.

In this example, where electricity is being supplied by the end-user electrical network to the first electrical network, a feed-in TOU tariff may be applied to credit the end-user's account with the relevant first electrical network retailer for electricity supplied to the first electrical network. Therefore, unlike renewable energy sources such as solar where the amount of electricity generated is based on environmental considerations and not the price of electricity at that time, a power transfer system in accordance with the embodiments described above may participate advantageously for on-demand and high value TOU pricing events in the first electricity or supply network. This clearly provides an advantage to the end-user who is now able to dynamically interact with the first electricity network according to a strategy that minimises the end-user's costs.

Comparing FIGS. 22 and 23*a* it is apparent the end-user generators 2250 deliver a phase synchronised alternating current to the second network connection point 2288. Synchronisation may be performed by using the measured phase information provided by the measuring device 2287 and operation of controller 2260.

As would be appreciated, the power transfer schedule determining the switching between electrical power supply sources may result in extremely frequent switching that could even occur on an hourly rate or less. This may necessitate the rapid synchronisation of the on-site generation electrical alternating current phase to the first electrical network supply phase. FIG. 23*a* illustrates one way to achieve this capability should it be required. As shown in FIG. 23*a*, the alternator 2280 is further coupled to an AC-to-DC conversion device 2305 that produces direct current (DC) output 2315. This DC output then feeds an inverter module 2310 which produces line frequency output with a high conversion efficiency. The DC-to-AC inverter 2310 produces extremely high conversion efficiency between electrical modes and provides integrated synchronisation of the output AC 2320 to the first electrical network line frequency. In this manner, the original AC signal may be converted to an AC signal whose phase and timing matches that of the first electrical network.

Figure 23B:
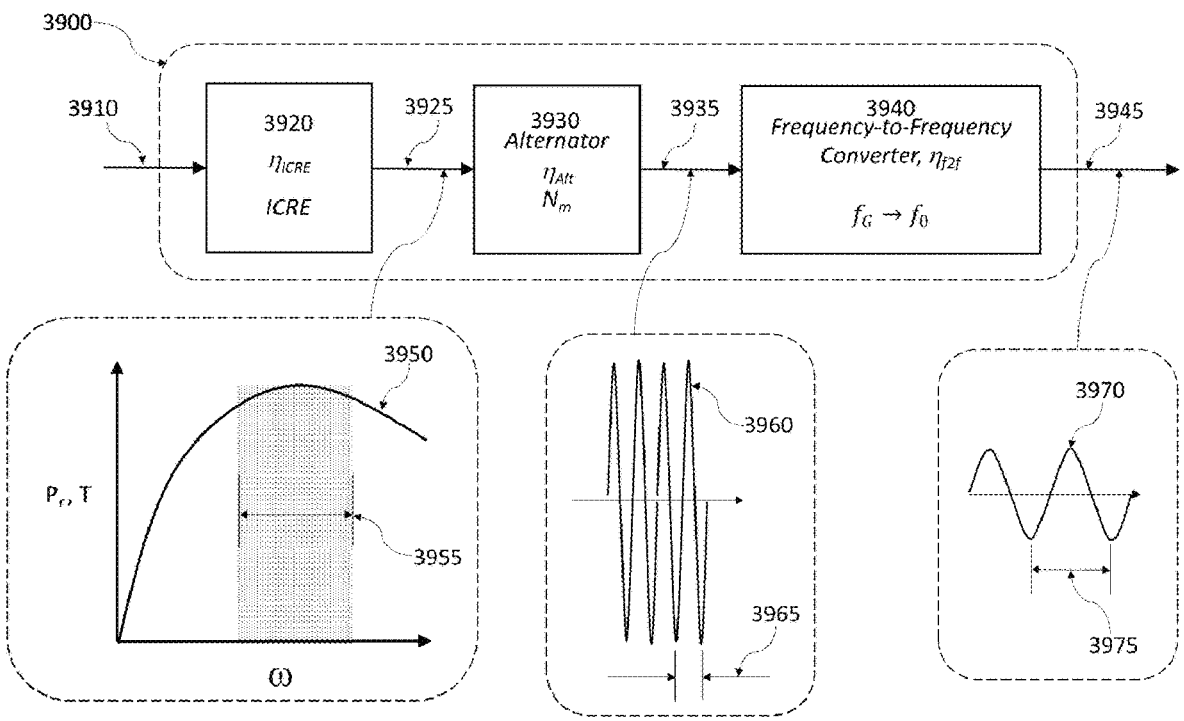
FIG. 23b is schematic representation of the functional components of a gas-to-electricity converter according to an illustrative embodiment.

Referring now to FIG. 23*b*, there is shown a schematic setting out the functional components of a gas-to-electricity converter 3900 along the lines described above. Hydrocarbon fuel or combustible gas 3910 is supplied to ICRE 3920 delivering rotational energy 3925 at an efficiency of $\eta_{ICRE}$. The power and torque curves 3950 for the ICRE are a function of shaft rotation speed, $\omega$. The ideal efficiency is typically obtained in the power band 3955. An alternator 3930 receives the rotational energy 3925 and converts this into electrical energy 3935, producing time varying voltage 3960 at frequency 3965 which depends on $\omega$ and the number of pole pairs $N_p$ within the alternator. The alternator operates with conversion efficiency $\eta_{Alt}$. The output electrical energy 3935 is then converted to the desired first electrical network frequency via frequency-to-frequency converter 3940. The ICRE can therefore track the electrical load at an optimal speed and or engine performance map (eg, lean burn operation at partial load), thereby tracking fuel consumption to the electrical load. The output electrical power 3945 is time varying voltage 3970 of constant frequency 3975 (eg. 50 or 60 Hz) and the output voltage range 3970 is governed by the frequency-to-frequency 3940. If the system 3900 provides an output frequency that matches advantageously the phase relative to the first electrical network and further provides an output voltage 3970 slightly greater than the voltage provided by the first electrical network 2290, then the transfer switch 2289 can be optional. The frequency-to-frequency converter 3940 operates with conversion efficiency $\eta_{F2F}$. The overall efficiency is therefore, $$\eta_{Gen} = \eta_{ICRE} \cdot \eta_{Alt} \cdot \eta_{F2F}$$

In another embodiment, a fast transition time transfer switch 2289 may be actuated by the controller 2260 that can connect the on-site generator output 2320 to the active connection point 2288 within the end-user network 2300.

Figure 23C:
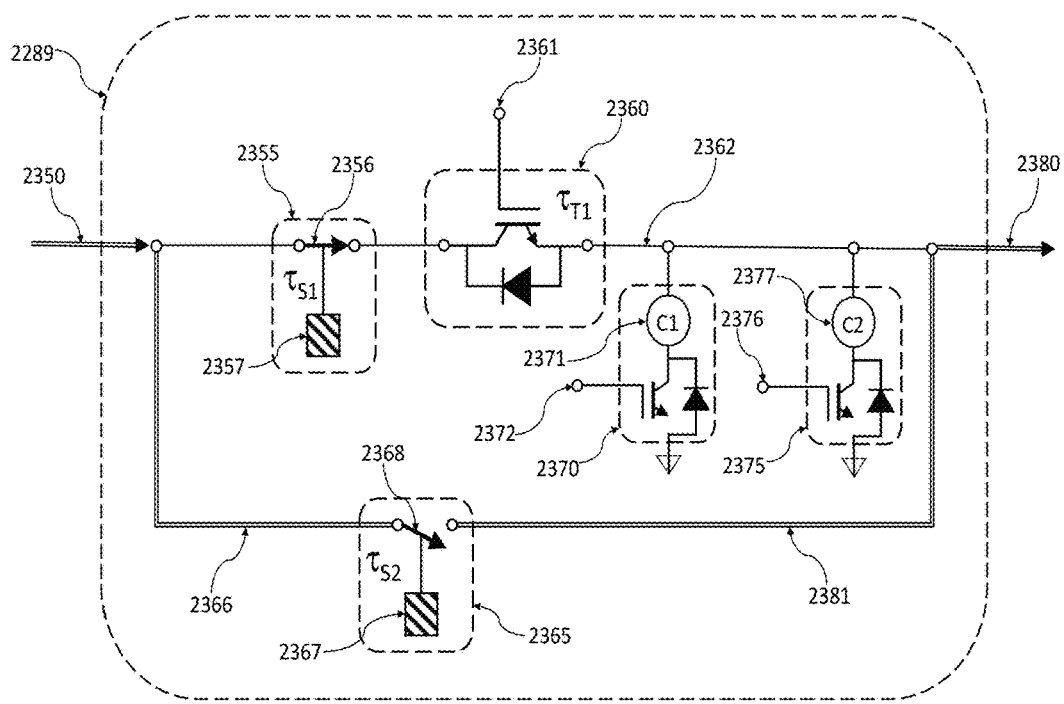

Referring now to FIG. 23*c*, there is shown schematic circuit diagram depicting the electrical functionality of a fast transition time transfer switch 2289 as illustrated in FIGS. 23*a* and 22. Transfer switch 2289 comprises two parallel circuit elements, namely, a (i) fast switch on time and medium impedance path; and a (ii) slower switching time on a very low impedance path.

Electro-mechanical contactors have relatively slow switching times but offer very low impedance connections across closed switch elements and very high isolation for open switch elements. To provide rapid switching so that alternating current may be synchronised in phase between the on-site power generator and the first electrical network supply, the fast response upper path comprising normally-closed contactor switch 2355 and semiconductor switch module 2360 is implemented. The lower electrical path comprises a slower but low impedance electromechanical normally-open switch module 2365. The electromechanical switches 2356 and 2368 are actuated by coils 2371 and 2377. Digital signal control of the coils is provided by solid-state switches 2372 and 2376. The main high current handling solid-state switch 2360 is controlled via control signal 2361. Mechanical switch actuators 2357 and 2367 are governed by energised relay coils 2370 and 2375.

Initially, consider the switch in high isolation configuration, such that, switch 2356 is closed, solid-state switch 2360 is high impedance and switch 2368 is in open state. A first electrical network phase detector (ie provided for example by energy measuring device 2287) provides information to the controller 2260. Assume the on-site generator is enabled and providing a valid operating point. A zero-crossing detector connected to the on-site generator may be used to initiate a closure of the transfer switch 2289 by comparing the phase to the first electrical network and then providing control signals to actuate the main solid-state switch 2360. Switch 2360 responds with sufficiently fast response time so that accurate phase synchronisation is possible.

The current initially flows through switches 2355 and 2360, whereas slow switch 2365 remains substantially in an open-state. Current flowing in the upper portion of the circuit 2362 enables the electromechanical coil 2377 to be energised and thus begins closure of 2368. Once switch 2368 is fully closed, it introduces a low impedance circuit for current to predominately flow between connections 2350, 2366, 2368, 2381 and 2380. The upper circuit may then be isolated by appropriate control signals. The low impedance path may be also put into a high impedance state by dc-energising the electromechanical actuating coil 2377 by switching off the solid-state switch 2376.

As would be appreciated, transfer switch design as described above and depicted in FIG. 23*c* provides one non-limiting example of a fast and non-disruptive power transfer between electrical supply sources. As would be further appreciated, the control and switching arrangements may be extended to multi-phase power network such as three phase 3ϕ power. For 3ϕ operation there would be in one embodiment individual sub-controllers for each separate load of the 3ϕ second electrical network operating in accordance with the principles described throughout the specification.

Referring once again to functional component diagram of FIG. 6, the gas-to-electricity conversion efficiency of the on-site power generation plant 560 is now discussed.

Figure 24:
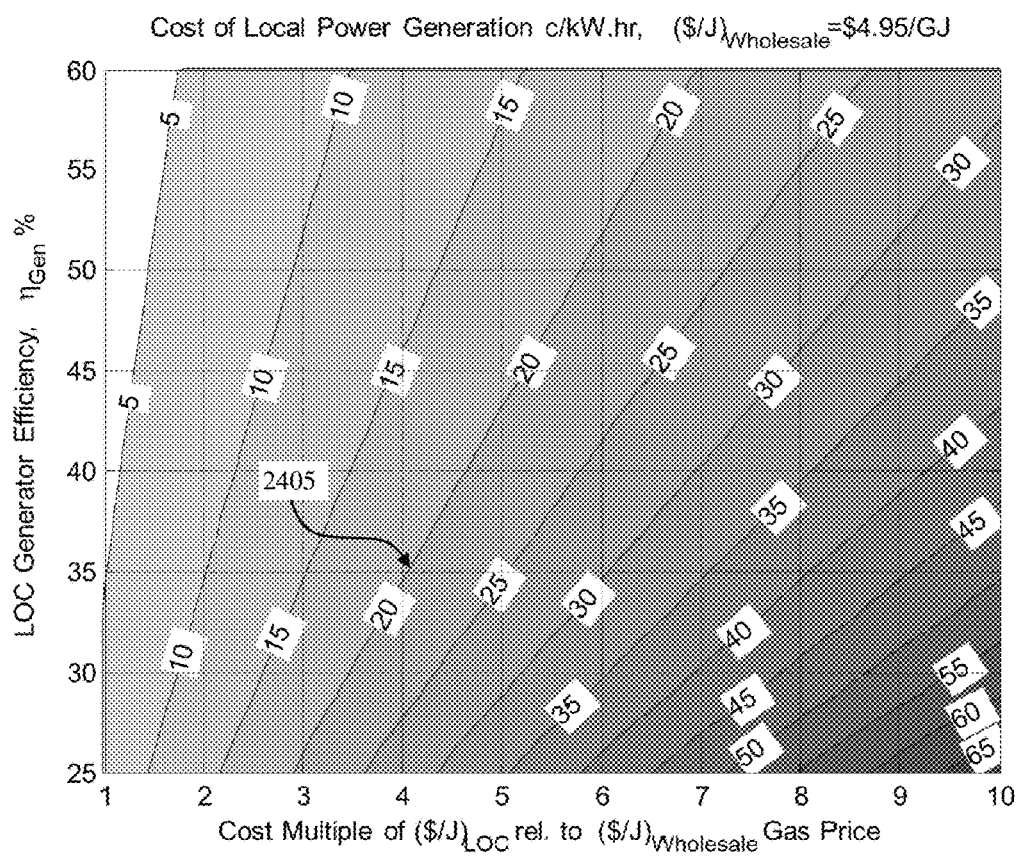
FIG. 24 is a contour plot of the on-site electricity generation cost as a function of the specific gas-to-electricity conversion efficiency range $25 \leq \eta_{Gen} \leq 60\%$ and methane fuel cost retail to wholesale cost multiple between 1 to 10.
Figure 25:
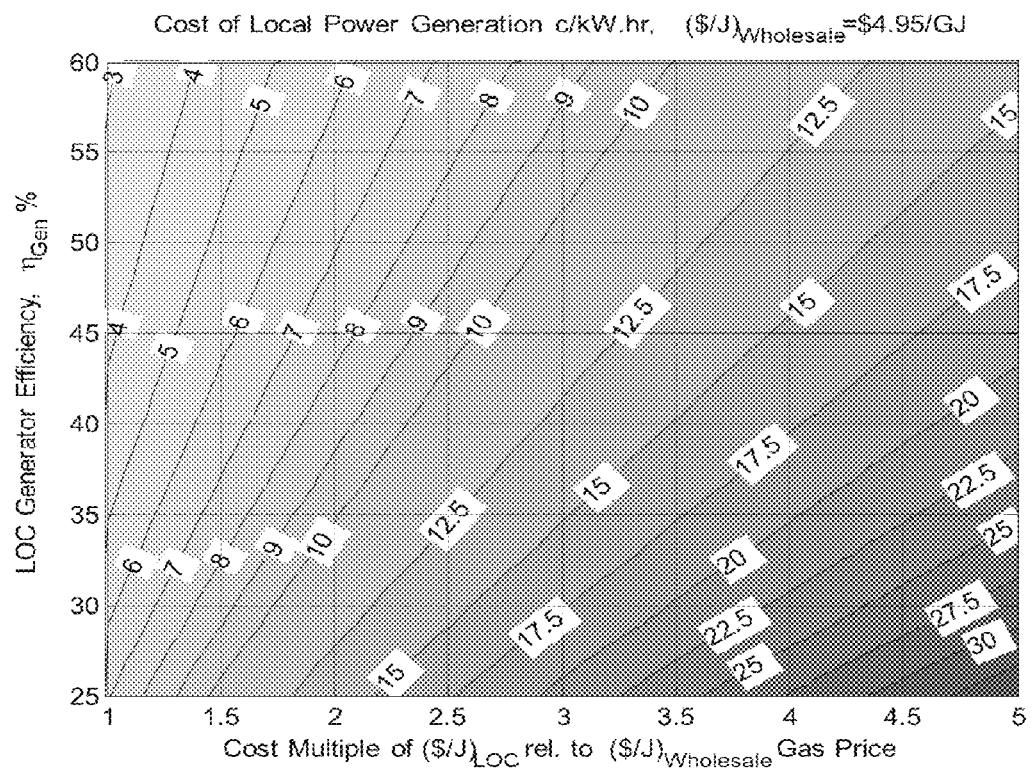
FIG. 25 is a contour plot of the on-site electricity generation cost as a function of the specific gas-to-electricity conversion efficiency range $25 \leq \eta_{Gen} \leq 60\%$ and methane fuel cost retail to wholesale cost multiple between 1 to 5.
Figure 26:
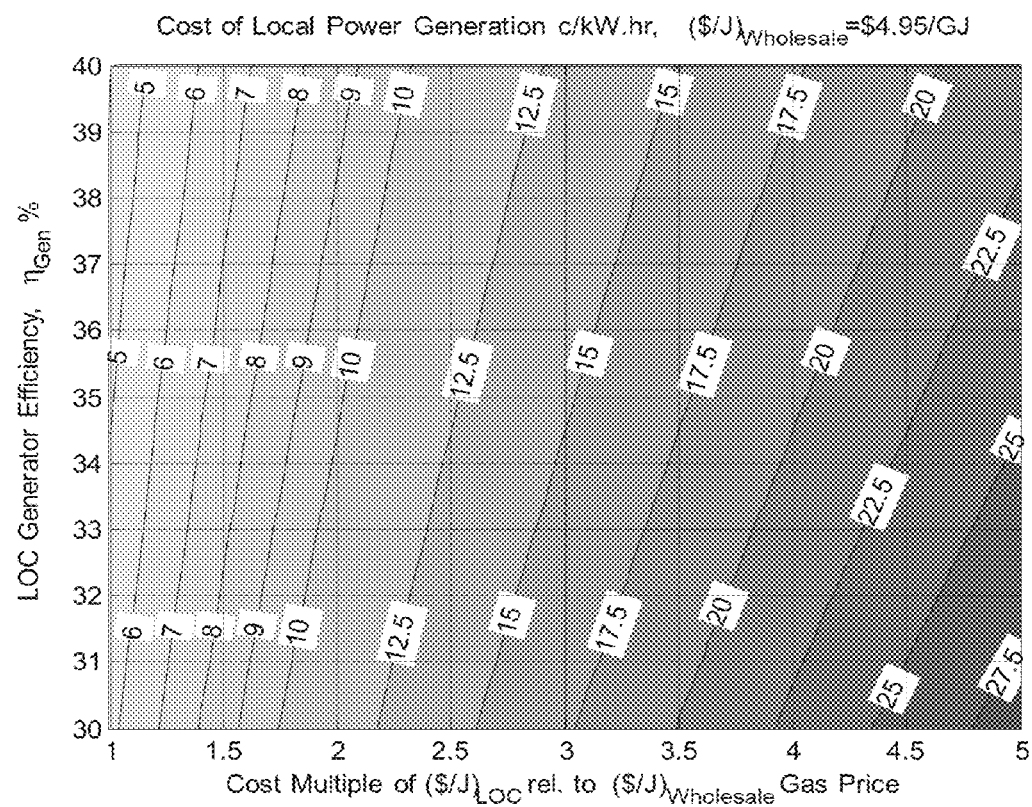
FIG. 26 is a contour plot of the on-site electricity generation cost as a function of the specific gas-to-electricity conversion efficiency range $30 \leq \eta_{Gen} \leq 40\%$ and methane fuel cost retail to wholesale cost multiple between 1 to 5.

Both the on-site power generation efficiency $\eta_{Gen}$ and cost of hydrocarbon fuel ($/Joule) determine the cost of producing on-site electricity. Referring now to FIGS. 24, 25 and 26 there are shown graphs of calculations of the available on-site electricity generation cost per kW·hr ($/kWh) as a function of the power generation efficiency $\eta_{Gen}$ and delivered cost of fuel at different scales. The fuel cost is provided as an end-user retail cost $[\$/\text{Joule}]_{LDC}$ delivered to the end-user site with multiplicative value above a wholesale cost of natural gas.

In these examples, the regional wholesale cost of natural gas is taken from data applicable to South Australia in March of 2013. Converting the available chemical energy of $CH_4$, into electricity generation cost in units of $/kW$_e$h is then plotted as the contours in FIG. 24. As discussed previously, present day technologies for gas-to-electricity conversion are expected to provide efficiencies in the range $30\% \leq \eta_{Gen} \leq 45\%$. Based on this, it can be seen that low cost on-site electricity generation can be provided for commercially accessible natural gas costs in the range of:

$$3 \leq \frac{[\$/\text{Joule}]_{LOC}}{[\$/\text{Joule}]_{WholeSale}} \leq 8$$

In view of the smart grid operation as discussed previously, the relevant comparison is between the retailer provided first electricity network cost (eg see FIG. 15) and the calculated on-site cost as plotted in FIGS. 24, 25 and 26. By way of example, an operating point 2405 shown in FIG. 24 provides sufficient economic advantage for on-site power generation that is directly competitive to off-peak first network TOU pricing (see FIG. 15 where off-peak retail to end-user spot price is approximately $0.18/kWh) for gas cost multiple of 4 over wholesale and $\eta_{Gen}$ of 35%.

As can be seen from above, on-site gas-to-electricity conversion provides an economical alternative to the generation of electrical power. When this is factored into a power transfer system that allows an end-user to schedule switching between a normal electrical supply network and an on-site source of electrical power this allows an end-user to configure an advantageous demand response in the context of pricing for the end-user. Furthermore, the end-user is enabled as a strategic price-taker from the first network TOU tariff pricing. An extreme, but equally valid case is the end-user as a first preference burning on-site fuel for exclusive electricity consumption, using the first electrical network as a back-up source of electricity if generator plant 560 becomes unavailable or end-user load demand power is in excess of the nominal capacity of the gas-to-electricity converter 560. Accordingly, the end-user is provided with a clear decision path for dynamic source switching based on cost of electricity generation comparison between a retail TOU first electrical network cost and an on-site generation cost.

Partial Load Generation Efficiency

Figure 27:
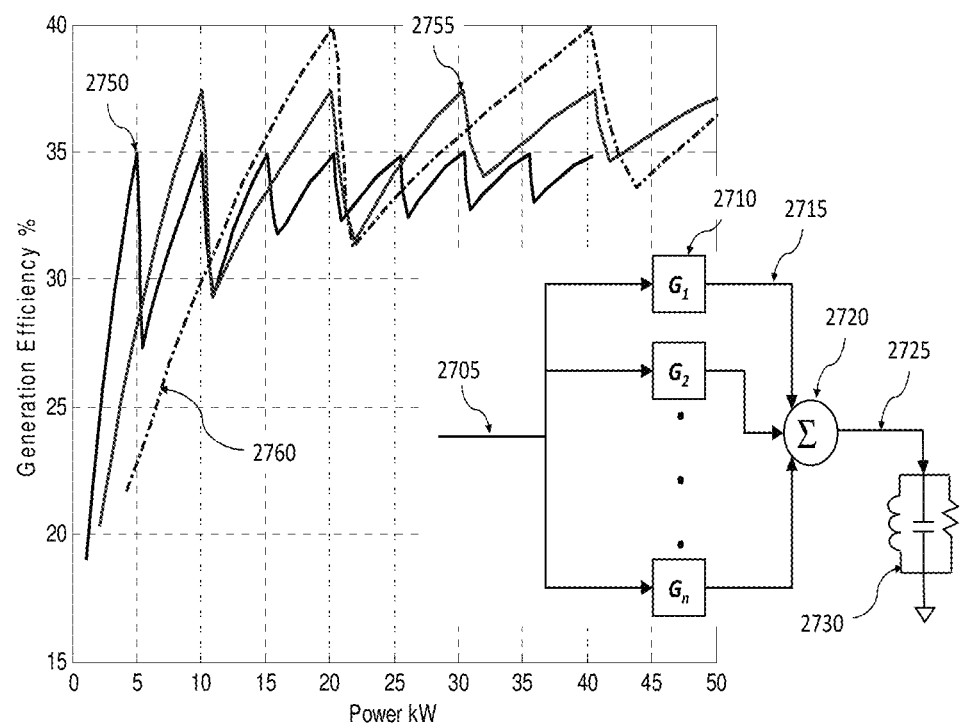
FIG. 27 is a graph of the generation efficiency of electricity as a function of electrical load for an ICRE based gas-to-electricity converter using methane fuel based on different generator configurations where the inset schematic demonstrates the effect of employing a parallel connected group of generators to provide improved partial load performance for a given electrical load.

Referring now to FIG. 27, there is shown a graph of the generation efficiencies a function of electrical load for an ICRE based gas-to-electricity converter using methane fuel as previously disclosed. FIG. 27 demonstrates the potential departure from the ideal cases of full-load efficiencies presented in FIGS. 24 to 26. As depicted in the inset schematic, these reductions in generation efficiencies may be accounted for by adopting a generator configuration incorporating multiple smaller capacity generators. Depending on the circumstances, a 10% de-rating of the nominated ICRE efficiency may be achieved for partial load conditions by adopting a multiple generator configuration.

FIG. 27 shows three representative curves for parallel electrical connected generators 2710, namely, $G_1, G_2 \ldots G_N$, supplying power to a generalised load 2730. Each generator current 2715 is summed at node 2720, providing power 2725 to load 2730. Curve 2750 is for N=8 parallel connected 5 kW$_e$ generators, showing the achievable system efficiency delivered to a load 2730 for a given power demand requested 2705.

For example, referring to curve 2750, a single 5 kW$_e$ generator achieving a full-load efficiency of $\eta_{Gen}$=35% produces a generation efficiency performance between $20\% \leq \eta_{Gen} \leq 35\%$ under partial load operation of 30% to 100%. Curves 2755 and 2760 show the performance for five parallel connected (N=5) $P_{Gen}$=10 kW$_e$ generators each with a full load efficiency of $\eta_{Gen}$=37.5% and N=3 $P_{Gen}$=20 kW$_e$ and full-load $\eta_{Gen}$=40% respectively. As is apparent, multiply connected smaller scale generators may provide improved efficiency under conditions ranging from partial load to full-load condition as the case may be for end-user power consumption.

Improved performance may additionally be achieved by running the one or more electricity generator at near to, or at full load, by supplying the excess electrical energy to the first electrical network for subsequent reimbursement by a retailer for feeding in of electricity as previously described. This is another strategy that enables the on-site power generator to operate at maximum efficiency under end-user partial load conditions.

Figure 28:
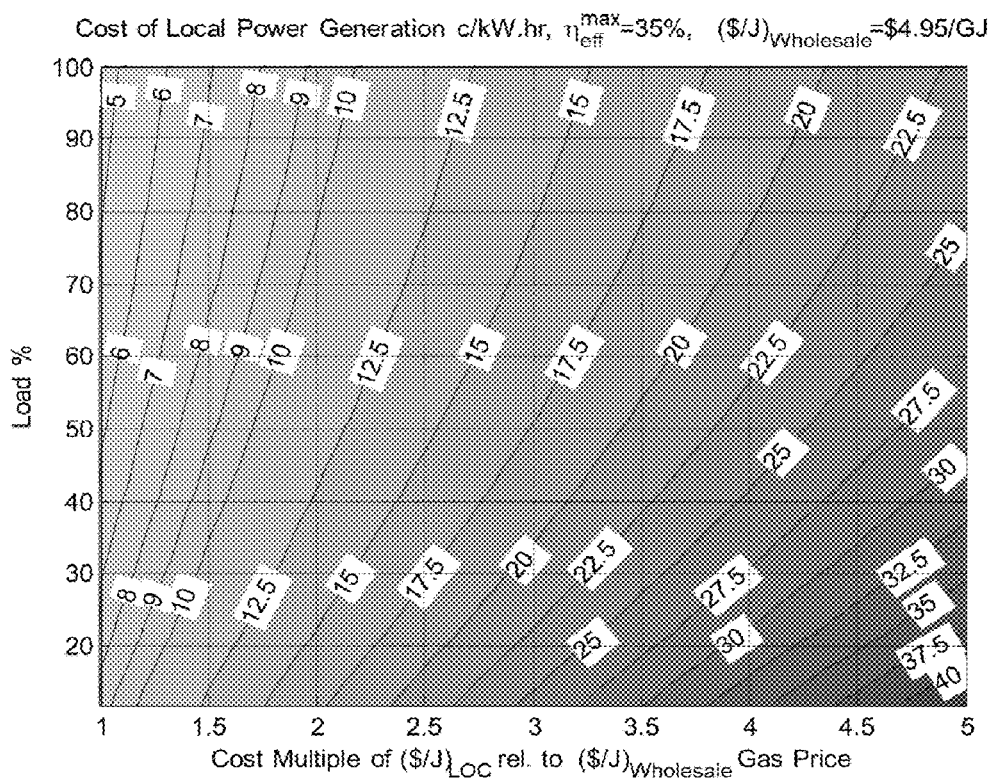
FIG. 28 is a contour plot of on-site electricity generation cost as a function of partial electrical load and methane fuel cost for a given gas-to-electricity full load conversion efficiency of $\eta_{Gen}=35\%$ for $P_{Gen}=10$ kW$_e$ where the methane fuel cost is given as an end-user retail cost multiple over the wholesale gas cost.

Referring now to FIG. 28, there is shown a contour plot of on-site electricity generation cost as a function of partial electrical load and methane fuel cost for a given gas-to-electricity full load conversion efficiency of $\eta_{Gen}$=35% for $P_{Gen}$=10 kW$_e$. The methane fuel cost is given as an end-user retail cost multiple over the wholesale gas cost.

Figure 29:
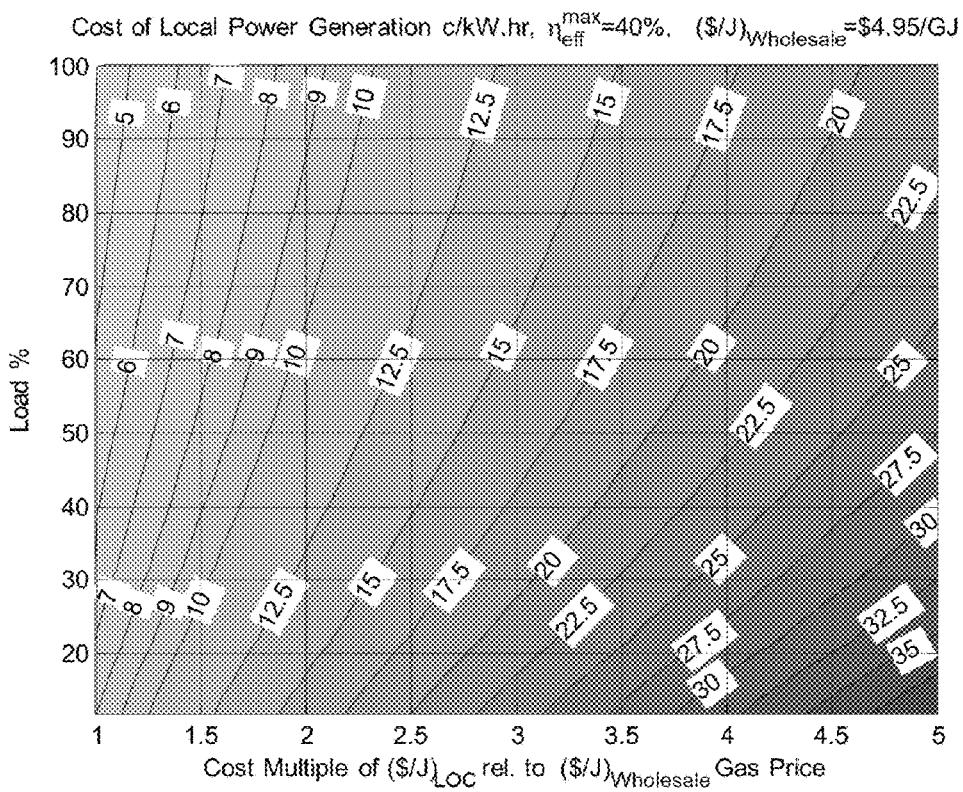
FIG. 29 is a contour plot of on-site electricity generation cost as a function of partial electrical load and methane fuel cost for a given gas-to-electricity full load conversion efficiency of $\eta_{Gen}=40\%$ for $P_{Gen}=10$ kW$_e$.
Figure 30:
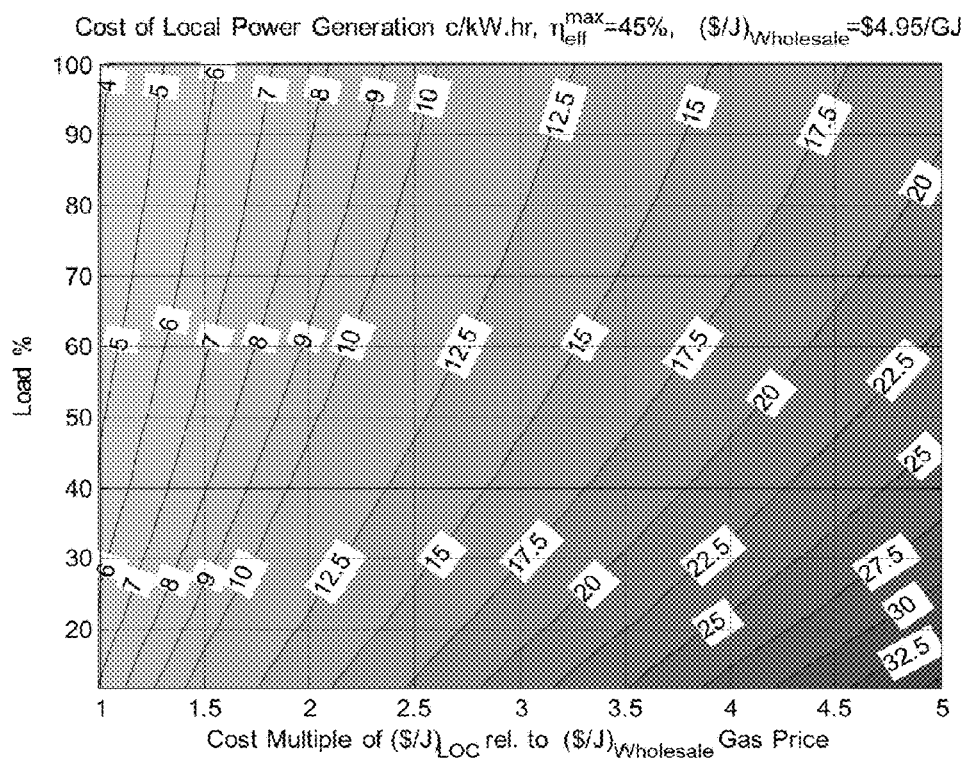
FIG. 30 is a contour plot of on-site electricity generation cost as a function of partial electrical load and methane fuel cost for a given gas-to-electricity full load conversion efficiency of $\eta_{Gen}=45\%$ for $P_{Gen}=10$ kW$_e$.

FIG. 29 is similar to FIG. 28 and is a contour plot of on-site electricity generation cost as a function of partial electrical load and methane fuel cost for a given gas-to-electricity full load but for a conversion efficiency of $\eta_{Gen}$=40%. The methane fuel cost is given as an end-user retail cost multiple over the wholesale gas cost. Similarly, FIG. 30 is a contour plot of on-site electricity generation cost as a function of partial electrical load and methane fuel cost for a given gas-to-electricity full load but for a conversion efficiency of $\eta_{Gen}$=45%. As can be readily seen, the on-site generation costs increase slightly but are still well within off-peak first network consumption costs.

Clearly, improvements in the on-site gas-to-electricity conversion efficiency will directly translate to reduced on-site generation costs which in this exemplary embodiment are well below the available off-peak tariff rates as of 2013 in South Australia. This offers a potential solution to large scale electric vehicle adoption which would otherwise place a massive increase in peak demand on smart grid or supply networks. At present, electric vehicle charging is viewed by electrical supply networks as a significant threat as it is expected to severely exacerbate peak first electrical network demand. The use of a gas-to-electricity converter that forms part of the end-user electrical network and which is controllable in accordance with pricing information associated with the first electrical network provides a comprehensive solution to on-demand electric vehicle charging at low cost that is substantially decoupled from the first electrical smart grid network.

Retailer Function for Advantageous End-User Price Taking

Figure 31:
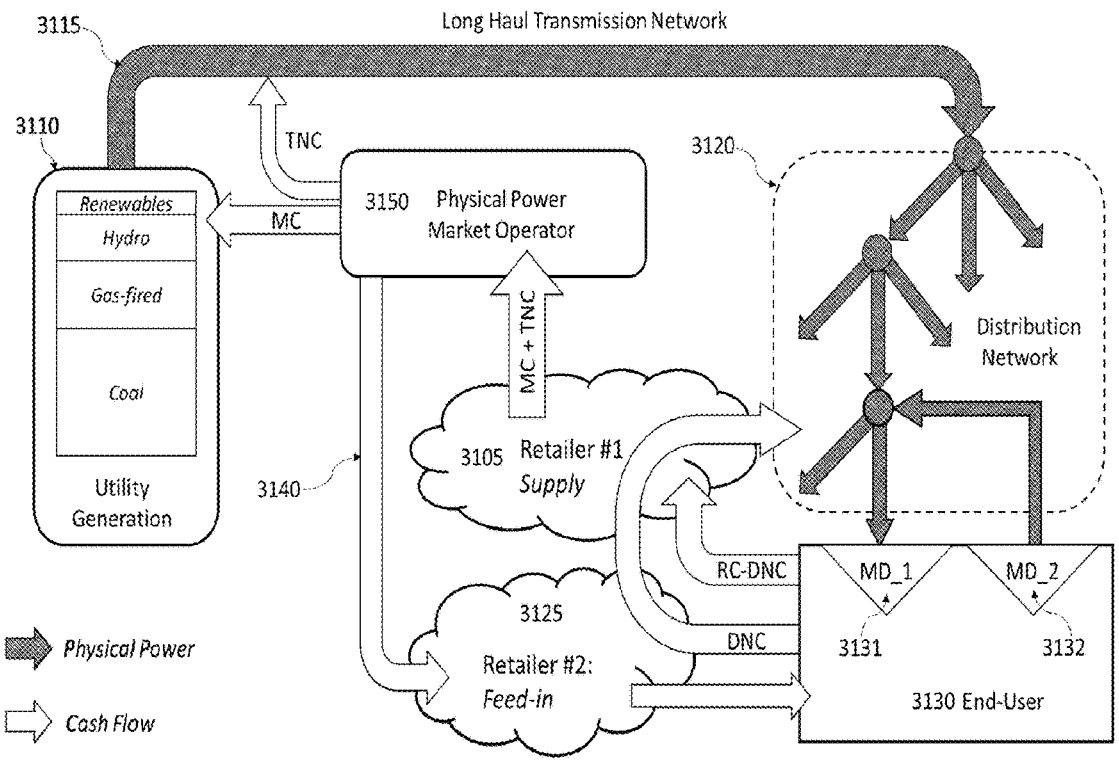
FIG. 31 is a schematic representation of a smart grid under the administration of a market operator similar to that illustrated in FIG. 1 but where an end-user is compensated by a retailer for providing electricity generated on-site and provided in one example to a "feed-in" retailer to stabilise regional peak demand.

Yet a further commercial benefit of the adoption of on-site gas-to-electricity power generation system is the ability for retailers to offer new products to end-users for providing distributed power generation to the first network. Referring now to FIG. 31, there is shown a schematic representation of a smart grid in accordance with an illustrative embodiment where an end-user or second-electrical network participates within the smart grid or first electrical network and receives reimbursement for stabilising regional peak demand.

In this exemplary embodiment, an end-user 3130 is reimbursed for providing electricity at strategic times to the first network by use of feed-in power measuring device (MD_2) 3132. Measuring devices 3131 and 3132 may be operated as a single TOU unit or may be distinct and operated by two separate retailers 3105, 3125. Retailers may specialise in supplying power to an end-user (eg retailer 3105) or alternatively, or in addition to, a retailer may offer a service or contract to an end-user that provides access to the smart grid market operator 3150 (eg retailer 3125). The first electrical network is provided electrical power by a plurality of scheduled generation types 3110, transmitted to a regional area by electrical network 3115 and distributed within a regional cluster by network 3120.

As the distribution network costs are charged as a package cost by the retailer 3105 providing the electricity, it may be possible to circumvent double costs for accessing the distribution network when feeding in electricity 3132. In one example, feed-in retailer 3125 would aggregate distributed generation sources as provided by a plurality of individual end-users 3130 and provide a collective capacity to market operator 3150 based on assessment of the collective generation capacity of the individual end-users. Transactions 3140 between the market operator 3150 and the feed-in retailer 3125 are then distributed to the end-users 3130.

As would be appreciated, the above described embodiments provide an end-user with the capability to provide on-demand electricity generation that is of high value to the first electrical network which may be utilised by the smart grid to address peak demand problems. In this manner, the end-user becomes an active participant of the first electrical market choosing to supply electricity to the smart grid in accordance with contractual arrangements with the feed-in retailer or at price points determined by the end-user. This clearly provides the smart grid with an unparalleled degree of flexibility in not only addressing expected peak demand events but also fluctuations in demand that are not forecasted.

It is expected that as the adoption of on-site gas-to-electricity conversion combined with access to pricing information increases then the variation in demand as seen by the smart grid will reduce. This reduction in variability allows the smart grid to better forecast and provision for the expected demand including utility costs and further to reduce the amount of hedging and futures contracts required. This is expected to then result in a net decrease to the retail cost of supply of electricity to individual end-users.

On-Site Power Generation System

Referring now to FIGS. 32, 33, 34 and 35, there is shown a number of illustrative embodiments of power transfer systems involving the supply of power by a first electrical network to a second electrical network where pricing information associated with the supply of electricity by the first electrical network is accessible by the second electrical network and further where the second electrical network includes on-site capability for electricity generation based on the supply of combustible gas.

Detailed operation of further illustrative embodiments is presented in FIGS. 32, 33, 34 and 35. Central to the operation of these embodiments is the strategic interconnection and operation of the on-site gas-to-electricity generation when compared to a smart grid first network electricity cost. That is, the end-user interacts with the smart grid as a strategic time-of-use price taker by coupling advantageously to an alternative energy source that is not subject to rapid time-of-use fuel costs.

Figure 32:
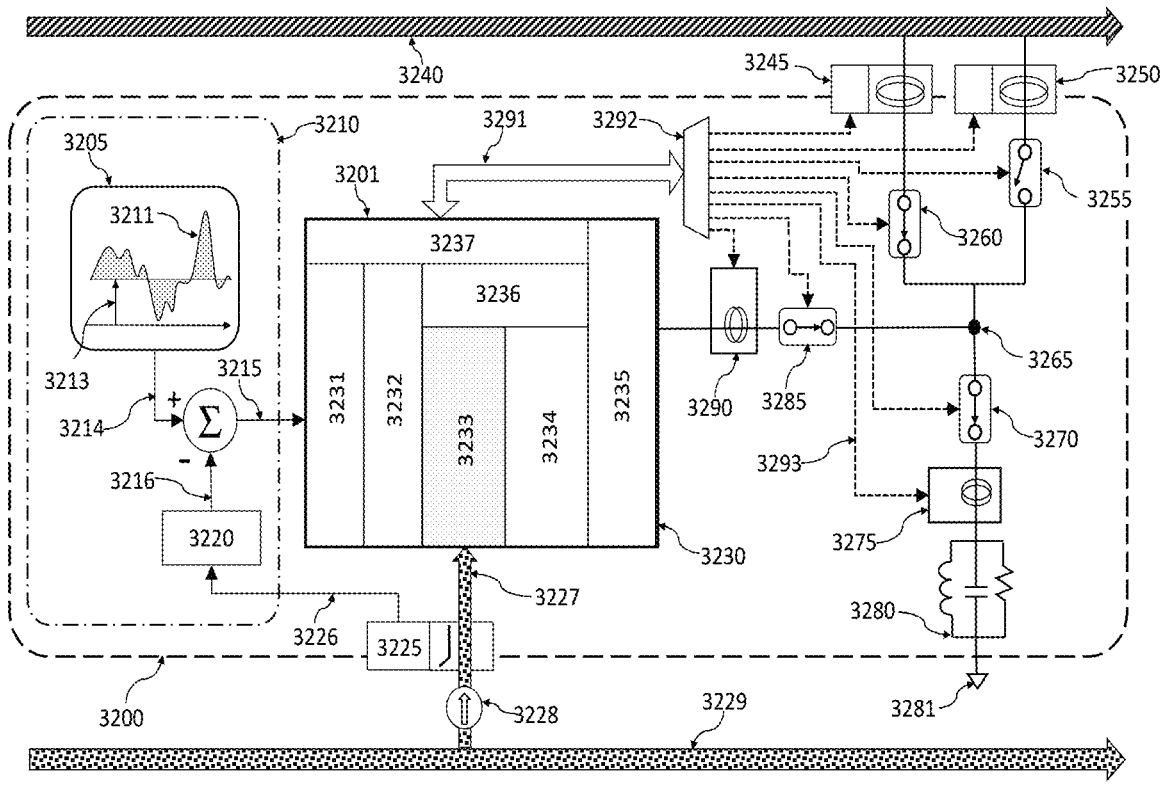
FIG. 32 is a functional block diagram of a power transfer system according to an illustrative embodiment incorporating a heat recovery module.

Referring now to FIG. 32, there is shown a functional block diagram of the operational components of a power transfer system 3200 according to an illustrative embodiment. Electricity from a smart grid first electrical network 3240 is supplied to the end-user via at least one power measuring devices. In one example, a TOU tariff may be supplied to an end-user via dual accumulation meters 3245, 3250 including a timed off-peak meter and a normal meter. Alternatively, one meter may be configured for take-off of electrical power from the grid and the other is configured for electrical power fed-into the grid from the end-user electrical network. In another example, meters 3245, 3250 may be configured as a single device. In yet another example, one or both meters 3245, 3250 may both be TOU equipped providing accurate instantaneous power flow and time logging. Measuring devices 3245 and 3250 may further be configured to communicate information with a retailer (eg via wireless broadcast) and provide data communication to controller 3201. Internal control and telemetry signals such as 3293 are interfaced to the controller 3201.

In accordance with this embodiment, pricing information in the form of a forecast of the first electrical network time-of-use pricing is acquired by the cost comparison device 3210. A gas consumption measuring device 3225 provides meter flow information of gas consumed 3226 by the end-user electrical network from the gas supplier 3229 via pressure regulator 3228. The gas meter 3225 may further be enabled as a smart-gas meter which communicates with a gas retailer. The meter 3225 may further provide updated gas tariff pricing information which may form input information to the procedure for determining a power transfer schedule as will be described below.

Functional block 3210 depicts the process for determining the power transfer schedule. The cost per Joule ($[\$/Joule]_{LOC}$) is calculated by 3220 (which also includes a forecast or TOU price tariff) and is used for direct comparison with the forecasted time-of use cost of electricity 3211 provided by the first electrical network 3240. A stored forecast estimate of TOU pricing is then used to generate a representative first electrical network time dependent price for consumption providing data 3214 which can then be directly compared to the on-site electrical generation cost 3216 that is based on the gas price and the gas-to-electricity efficiency. The on-site electricity cost 3216 and first electrical network consumption cost 3214 is used to determine the power transfer schedule or on-site demand response based on the price comparison 3215 carried out.

Controller 3201 generates demand response or power transfer schedule in this illustrative embodiment by a data processor 3231 and scheduler 3232. The power transfer schedule is dynamically updated in accordance with updates to pricing information from the first electrical network and/or pricing information provided by the gas supply network where this is available. Typically, this pricing information is in the form of a periodically updated forecast. The forecast 3205 may have minute range resolution and span hourly, daily or weekly look-ahead. The regional forecast 3205 is updated regularly and provided by the smart grid market operator and in this illustrative embodiment is updated in 15 mins periods as is the case for the Australian NEM. Internal end-user network instantaneous power measuring devices 3275 and 3290 may also provide optional telemetry to the controller 3201.

In this illustrative embodiment, communication between all components or modules within the end-user network 3200 is via interface module 3237 providing digital representation of signals to the data processor 3231 and scheduler 3232 as appropriate. The gas-to-electricity converter 3233 consumes metered fuel 3227 and generates rotational energy and heat energy. The rotational energy is coupled to the alternator 3234 at a shaft rotational frequency $f_{\omega}$ producing an alternating current of frequency $f_C$ depending upon the number of pole pairs $N_p$ as has been previously discussed. This AC waveform is then injected into the frequency-to-frequency (F2F) converter 3235.

The F2F comprises an AC-to-DC conversion plus filtering with the DC signal then fed into a DC-to-AC converter (also known as an inverter) 3235. The F2F converter enables the gas-to-electricity converter (comprising 3232, 3234 and 3235) to track the electrical load by matching the engine speed and fuel consumption. The output AC power measured by 3290 resulting from the final stage output 3230 therefore remains synchronised with the first electrical network regardless of the engine rotation speed. The output module 3235 further integrates synchronisation of the AC output with a desired reference phase and frequency measured at either measurement modules 3245, 3250 or 3290. The source switching is controlled by power transfer switches 3285, 3260, 3255 and 3270. As would be appreciated, all the transfer switches may not be necessary for a reduced system implementation (eg refer system 2300 of FIG. 23a) and can be used for protection.

FIG. 32 shows a highly flexible switch matrix that provides improved flexibility for isolating and interconnecting combinations of the end-user load 3280 (which is referenced to ground potential 3281), the on-site generator and/or first electrical network implemented using controllable transfer switches 3285, 3260, 3255 and 3270. The on-site generation power connects the end-user load 3280 and first network supply at a common feed point 3265. Electrical and communication links 3292 transfer control or telemetry signals 3291 to the controller 3201.

In this illustrative embodiment, power transfer system further includes heat recovery module 3236 operable to recover heat energy from gas-to-electricity converter 3233. In one embodiment, heat recovery module 3236 is a heat-to-electricity converter operable to convert recovered heat energy to electricity. The heat-to-electricity 3236 converter provides further scavenged electrical power that can be added to the electrical output stage 3235. This increases the overall conversion efficiency of the gas-to-electricity conversion process. In another embodiment, heat recovery module 3236 is operable to generate heated water for end-user consumption. In yet another embodiment, heat recovery module 3236 converts heat energy to mechanical work for use on-site by in one example generating steam for a turbine or Stirling engine or alternatively or additionally to be used in an expansion engine to aid in producing rotational energy.

Figure 33:
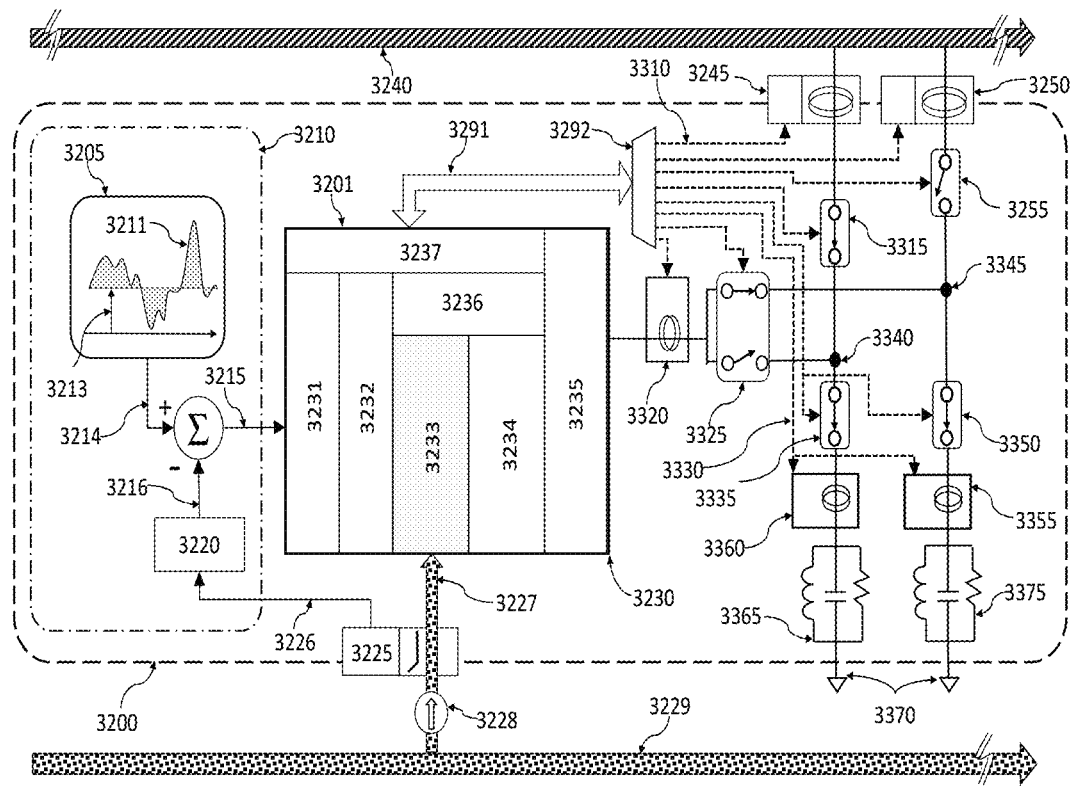
FIG. 33 is a functional block diagram of a power transfer system according to a further illustrative embodiment incorporating a normal time of use load and an off-peak load.

Referring now to FIG. 33, there is shown a functional block diagram of the operational components of a power transfer system 3200 according to an illustrative embodiment. In this embodiment, power transfer system 3200 includes two separate loads, namely, a separate off-peak load 3365 and an all time-of-use normal load 3375, with both loads referenced to a common potential 3370. Each load is optionally monitored by a power and phase measuring device 3360 and 3355, as well as a generator power monitor 3320. Data or control signals are transferred from individual components within the end-user system 3200 to the controller 3201 via wired or wireless links such as for example 3330. Transfer switches 3325, 3315, 3255, 3335 and 3350 offer one example configuration for enabling simultaneous cross connection of on-site power source and first network supplying either or both end-user loads or feeding power into the first electrical network 3240. The electrical current summing points 3340 and 3345 are explicitly for each of the respective load types.

Figure 34:
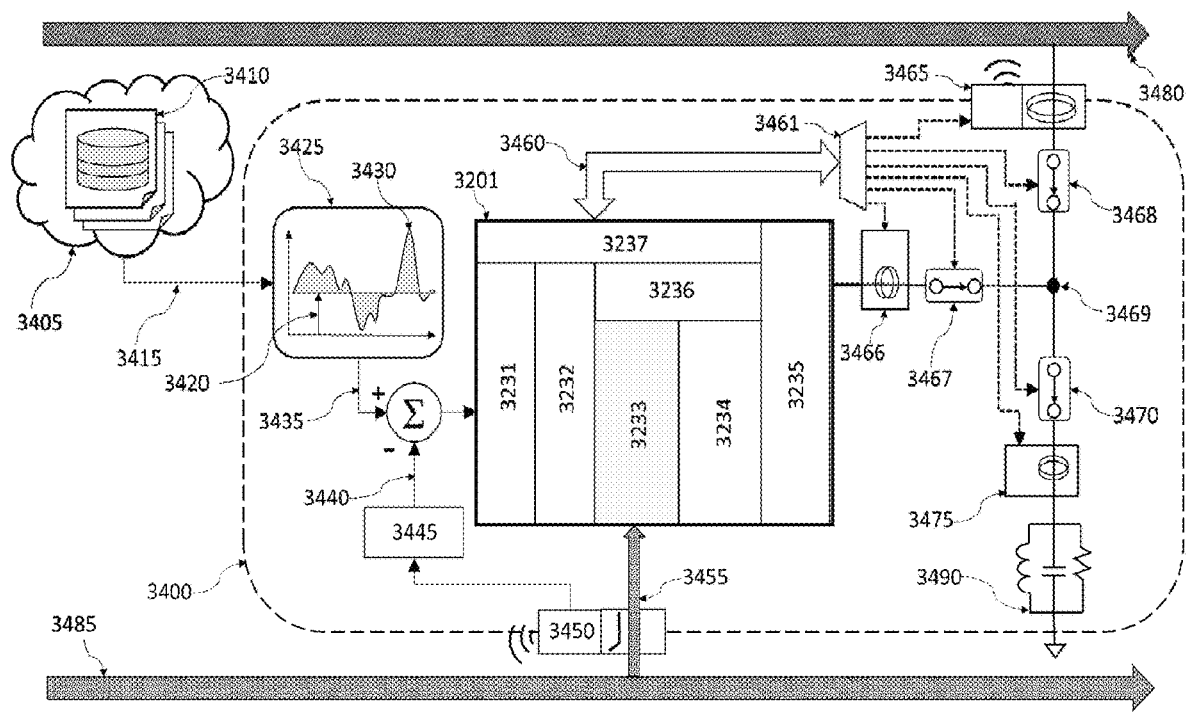
FIG. 34 is a functional block diagram of a power transfer system according to an illustrative embodiment incorporating a unitary power measuring and metering device capable of bi-directional power flow measurement and time logging.

Referring now to FIG. 34, there is shown a functional block diagram of the operation components of a power transfer system according to an illustrative embodiment. In this embodiment, power transfer system includes a single time-of-use power measuring and metering device 3465 capable of bi-directional power flow measurement and time logging that is connected between the first electrical network 3480 and the end-user electrical network 3400. Power measuring and metering device 3465 is further capable of remotely sending data in relation to compiled end-user time-of-use consumption time logs to a retailer or certified data aggregator for billing purposes. The first electrical network 3480 provides electrical power or optionally allows feed-in of on-site power generation from the end-user electrical network which is metered by device 3465. Similarly, the gas metering and measuring device 3450 can be enabled to remote gas consumption data to a gas or energy retailer and to the controller 3201 as appropriate. Metered combustible gas 3455 is delivered to the gas-to-electricity converter 3233 and provided by gas supplier or network 3485.

The power transfer system is provided with data access 3415 to an external database 3405. The data link 3415 can be wireless or via an internet protocol link as customarily provided by an information network provider. The database 3405 provides time dependent pricing information which is uploaded by the end-user to 3430 obtained directly from data source 3410 in the form of a first network forecast time-dependent price and demand look-ahead profile which accurately represent the market operation of a regional zone applicable to the end-user electrical network 3400.

In this illustrative embodiment, the database information is provided by a specific internet protocol (IP) address for periodic and frequent public access. The database information is also preferably provided by the market operator or the electricity retailer providing service to the end-user 3400. The regional forecast data 3410 is acquired and stored 3425 in the end-user site in digital form for processing by data processor 3231. While explicitly shown for clarity, it is understood that functional components 3415, 3425, 3435, 3440, 3445 may in practice part be integrated into controller 3201. Each time-dependent first electrical network TOU consumption cost forecast data 3430 is compared directly to the on-site gas-to-electricity generation cost 3440 calculated via algorithm 3445. Therefore, the end-user performs a strategic determination based on the price difference between the time dependent TOU forecast price from the first electrical network and the on-site gas-to-electricity on-site generation cost. The end-user system 3400 further comprises power measuring devices 3466 and 3475 along with optional transfer switches 3467, 3468 and 3470. Control and telemetry signals are aggregated 3461 and interfaced 3460 to the controller 3201. The explicit current summing node 3469 can be configured with on-site generator output 3225 having a slightly higher output voltage in phase with the first electrical network, so that power flow is explicitly directed from the on-site generation plant into at least one of the load 3480 or 3490.

The two signals 3435 and 3440 are fed into the comparator with the result forming the basis of a future time-dependent demand response or power transfer schedule and is input into the data processor 3231 and processed as described previously. Further detailed computational method information is described in PCT Application No PCT/AU2014/000605 titled "ELECTRICAL POWER CONTROL METHOD AND SYSTEM", filed on 12 Jun. 2014 and whose contents are hereby incorporated in their entirety.

The end-user network 3400 is enabled to perform a calculation via the computational methods described within the controller 3201 to provide a demand response schedule to automatically initiate time-dependent end-user system configuration. The operation of the system 3400 seeks to minimize TOU cost of electricity consumed by an end-user load 3480 or maximise feed-in payback for on-site on-demand power generated within the end-user network.

In another embodiment, pricing information relating to the supply of gas may be provided by the gas retailer or alternatively a combined market operator as has been described previously in relation to the supply of electricity. In one example, the end-user network can acquire, via IP or wireless access or other equivalent communication means, information relating to the time dependent gas cost tariff or wholesale price.

As would be appreciated, power transfer system 3400 enables an end-user to forecast and therefore estimate gross gas fuel consumption over extended periods, such as on a yearly basis. This allows an end-user to negotiate forward bulk gas fuel consumption contracts with a gas retailer providing service to the end-user. The end-user can further guarantee consumption of all gas purchased under the forward contract as any excess gas not consumed by the end-user electrical load can be scheduled via scheduler 3232 to burn on-site and feed in advantageously to the first electrical network as previously described. This allows the end-user to advantageously schedule on-site generation of electricity at a reduced cost to the end-user in the process also alleviating the peak demand of the first electricity network. Additionally, the end-user may feed in on-site generated electricity into the first electrical network at a price premium to the end-user in the process also beneficially providing additional capacity to the first electrical network.

In accordance with the embodiments described here, the end-user may participate in new market products which reward on-demand peak TOU power generation providing service that is not possible using renewable energy sources alone to the benefit of the market operator and to the energy supply system as a whole.

Figure 35:
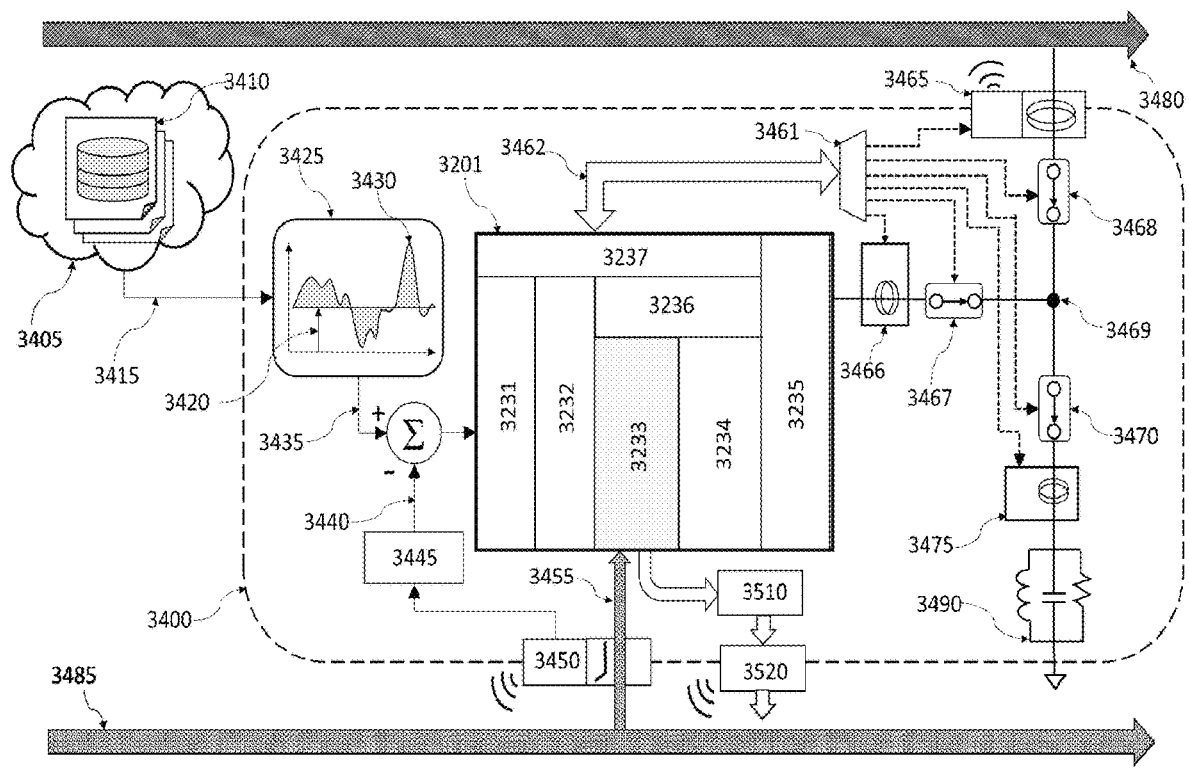
FIG. 35 is a functional block diagram of a power transfer system according to another illustrative embodiment including an emission reduction device for emissions from the gas-to-electricity converter.

Referring now to FIG. 35, there is shown a functional block diagram of the operation components of a power transfer system 3400 according to yet another illustrative embodiment. As would be appreciated, one of the benefits of end-user system 3400 consuming hydrocarbon gas-fuel for on-site electricity generation by an ICRE arrangement is that the exhaust by-product gas from direct combustion within the ICRE provides significantly lower green-house gas (GHG) emissions to the atmosphere, namely, carbon dioxide ($CO_2$), carbon monoxide (CO) and nitrogen oxides ($NO_x$). Sulphur oxides ($SO_x$) are negligible and offer a distinct advantage over coal and oil derived fuels used in traditional electricity generation. As on-demand on-site power generation offers a smaller carbon emission footprint compared to an equivalent power unit consumed from the smart grid, there exists in addition an opportunity for rewarding the end-user for reducing carbon-emissions.

In this illustrative embodiment, a further emission reduction device 3510 in the form of a catalytic converter and carbon emission measuring device 3520 may be optionally introduced. It is also possible for the emission monitoring device 3520 to be enabled for contestable logging and subsequent inclusion in end-user reward. If the $CO_2$ or emission can be monitored then a price for emitting or cost saving for emission reduction (ie $CO_2$ avoided) may be provided. The end-user would be expected to produce less $CO_2$ per kW generated than a large scale fossil fuelled plant due to the operation of the catalytic converter 3510.

Figure 36:
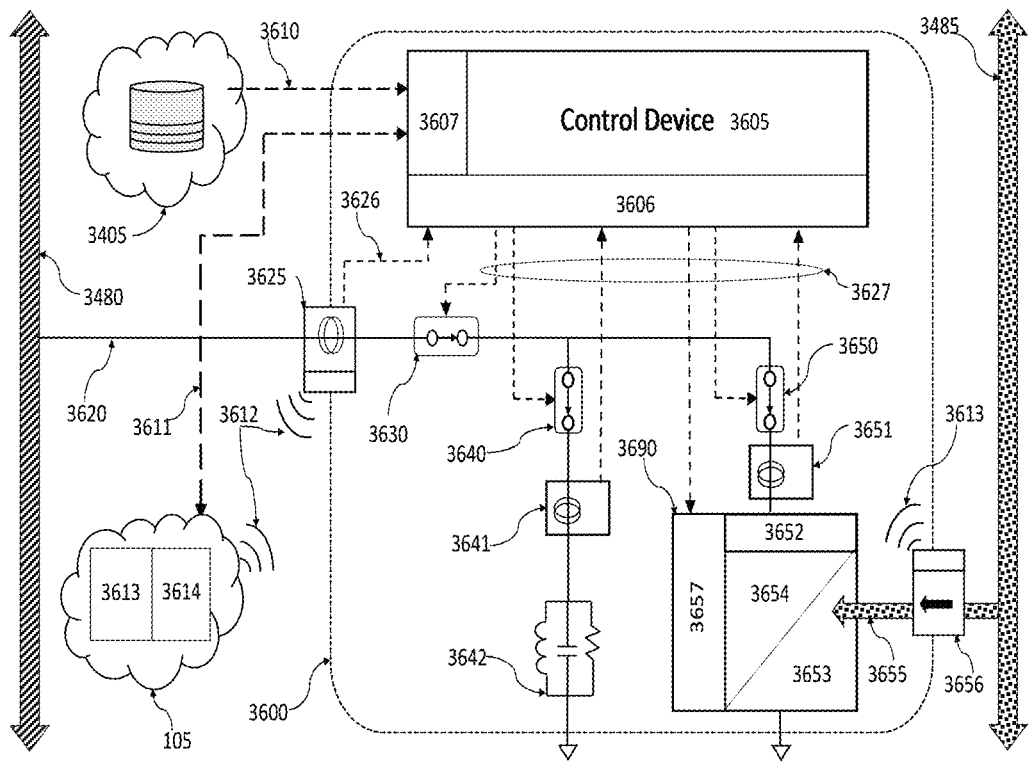
FIG. 36 is a functional block diagram of a power transfer system according to an illustrative embodiment where pricing information may be accessed from a publicly available database and/or by direct access to a retailer database.

Referring now to FIG. 36, there is shown a functional block diagram of the operational components of a power transfer system for an end-user network 3600 according to a further illustrative embodiment. In this embodiment, power transfer system is interfaced with two information databases 3405 and 105. The first electrical network forecast data is provided by public access of information database 3405 and accessed via IP or wireless or equivalent means whereas the retailer database 105 (gas and/or electricity) may be accessed directly via at least one of a communication method comprising IP, wireless, or digital broadcast. The retailer 3613 may utilise a third party data aggregator 3614. The metered TOU consumption data 3625 of the end-user 3600 is transmitted securely via unique identifier signal 3612 to the data aggregator 3614 uniquely representing the specific end-user 3600.

The retailer 3613 may also transmit via the data aggregator 3614 to all the end-users a broadcast signal that is loaded into the smart meter 3625 incorporating an updated TOU tariff structure and optionally a forecasted TOU price or a demand response event calendar. The controller 3605 is supported by communications interfaces 3606 and 3607 providing input/output operations to control paths 3627 and database links 3610, 3626 and 3611. The end-user may also upload information to the gas and electricity retailers relating to consumption and for the case of on-site electricity generation would provide time dependent power generation fed into the first electrical network. The bi-directional exchange of information between the end-user and the gas and electricity retailers enables synchronisation of assets and enables efficient and/or tailor made forecasts to be provided to the network users.

The input first electrical network 3480 with access line 3620 is metered into the power transfer system 3600 via smart meter 3625, which can be isolated from the second electrical network by transfer switch 3630. The end-user load 3642 can be supplied electricity by the first electrical network 3480 or by on-site power generation system 3690. Controllable power transfer switches 3640 and 3650 can connect to at least one of the first electrical network and on-site power plant 3690. In-situ monitoring devices measure power 3641 and 3651 and transmit the instantaneous power to the controller 3605 for closed-loop control. A smart gas meter 3656 provides consumption data for take-off gas flow 3655 from a gas provider 3485 with gas consumption data remotely sent to the controller 3605 and or the gas retailer 105. The operation as described herein for the control device calculation of on-site generation cost.

The gas-to-rotational energy conversion module 3653 (eg, an ICRE) provides rotational energy-to-electricity conversion device 3654 which in turn feeds a frequency-to-frequency converter 3652. The power management module 3657 provides synchronisation and control of the gas-to-electricity converter plant 3690. Controller 3605 executes control logic to calculate the threshold cost for determining an internal demand or power transfer schedule for the end-user network 3600 as previously described.

Figure 37:
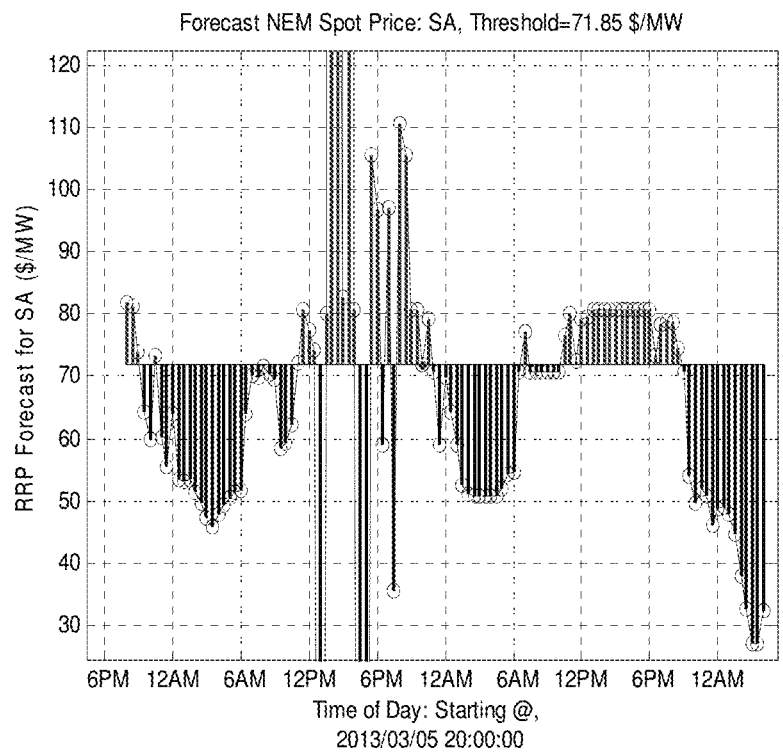
FIG. 37 is a graph of an example end-user or second electrical network time-of-use power transfer schedule in accordance with an illustrative embodiment calculated based on first electrical network time-of-use electrical forecast.

Referring now to FIG. 37, there is shown an example output of the controller comparator showing a threshold cost for on-site power generation. A first electrical network price forecast time-dependent look-ahead is acquired against which the comparator determines whether to off-take electricity from the grid or in preference to reduce cost by burning gas fuel via on-site gas-to-electricity converter. Regions below the threshold cost, in this case $71.85, indicate the smart grid provided electricity TOU costs less than on-site generation cost and in accordance with the power transfer scheduler the controller schedules the power transfer system at these specific times to off-take from the first electrical network smart grid. For first electrical network TOU pricing events exceeding the on-site generation cost, the power transfer schedule schedules the end-user network to provide gas-to-electricity generated power to the end-user load or supply electricity to the first electrical network.

Figure 38A:
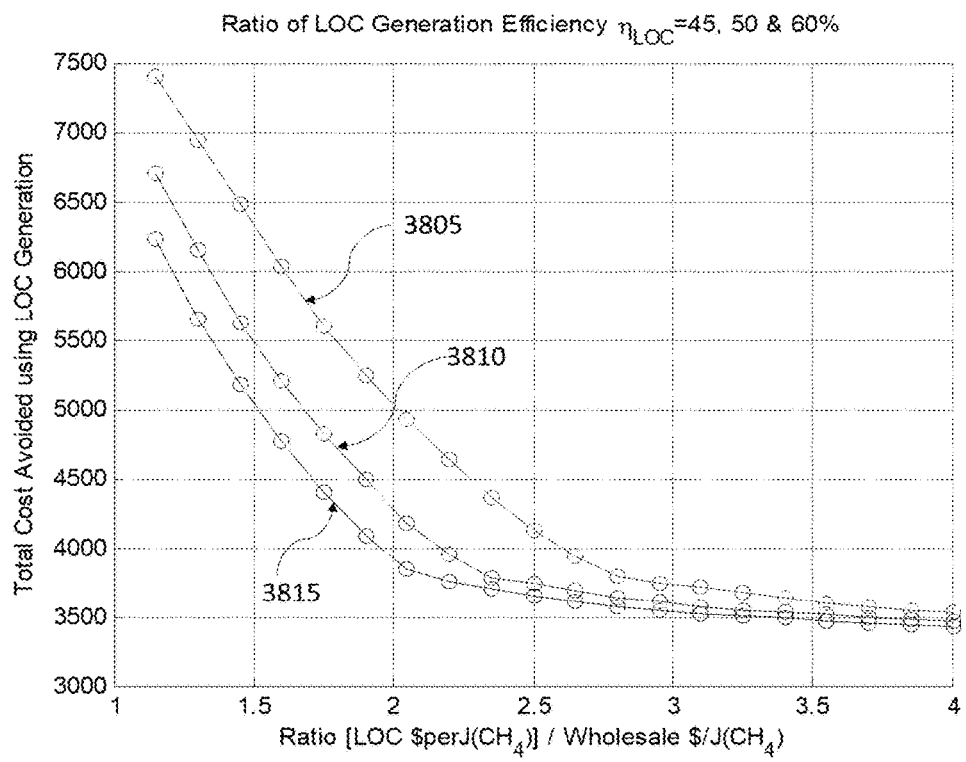
FIG. 38a is a graph of costs avoided by an end-user for the power transfer schedule based on the first electrical network forecast illustrated in FIG. 37 as a function of end-user gas-to-electricity conversion costs (curves are 3815 ($\eta_{Gen}=45\%$), 3810 ($\eta_{Gen}=50\%$) & 3805 ($\eta_{Gen}=60\%$))

Referring now to FIG. 38a, there is shown a graph of the cost avoided over the forecast time window (ie a 24-hour look-ahead for this example). The total cost avoided is defined as the integrated cost above the on-site threshold cost of FIG. 37. FIG. 38a shows the cumulative cost avoided by the end-user network for specific choice of gas fuel cost and on-site gas-to-electricity generation efficiency. Curves 3815, 3810 (and 3805 are for the cases of $\eta_{Gen}$=45, 50 and 60% calculated against the time forecast window provided in FIG. 37 (where $\eta_{LOC}$=$\eta_{Gen}$ at the location). Clearly, even for nominal operation of the smart grid (i.e., without anomalous pricing events), there are substantial cost savings to gained by an end-user adopting embodiments of power transfer system as described above.

Figure 38B:
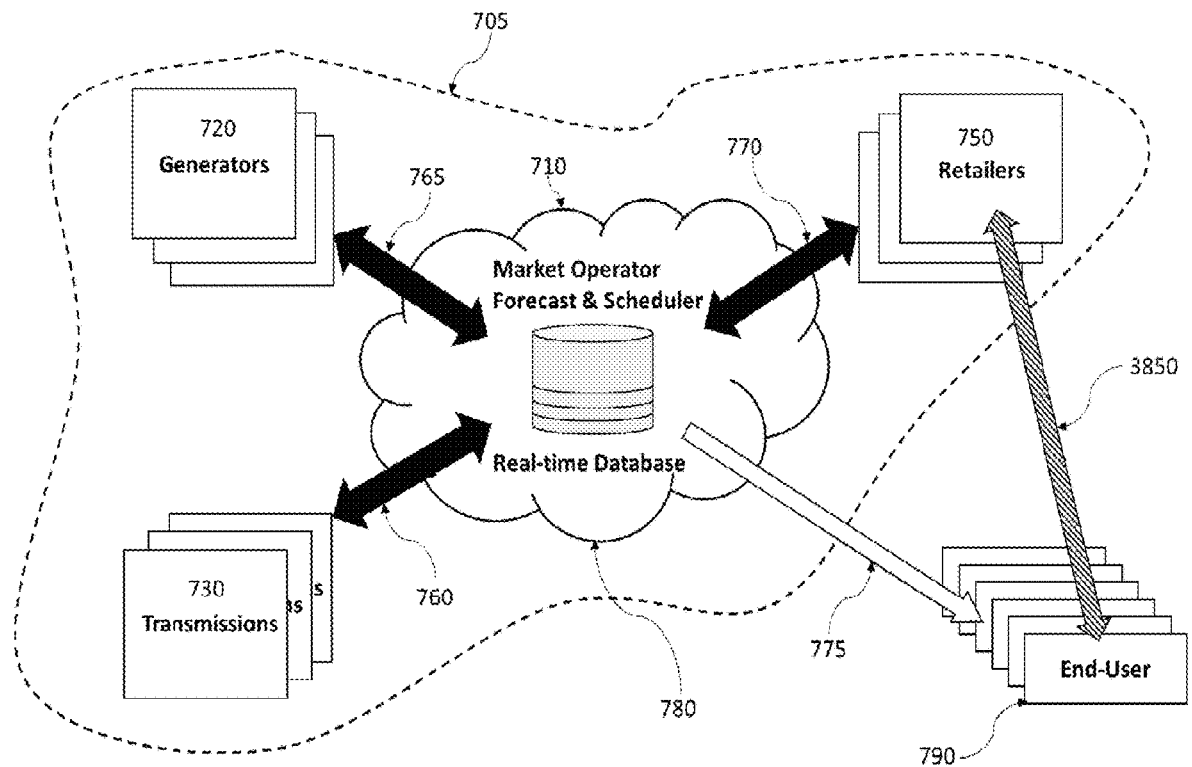
FIG. 38b is a schematic representation of a smart grid incorporating an ensemble of end-users each operating in accordance with an illustrative embodiment depicting the information flow between the end-users and the first electrical network.

Referring now to FIG. 38b, there is shown a schematic representation of a smart grid 705 or first electrical network including an ensemble of N participating end-users 790 with each end-user participating with tailored demand response as has been previously described that produces a substantially real-time information feedback path 3850 to retailers 750. This provides an opportunity for the end-users to match their first network electricity demand to the available supply. As would be appreciated, a smart grid electrical network operating in accordance with these principles is in contradistinction to the present less efficient methods where the smart grid attempts to in real-time match first electrical network supply to the collective but estimated end-user demand of each second electrical network coupled to the smart grid.

A brief review of the above embodiments indicates the systems and methods described above indicates that they enable an end-user to access an additional source of on-site electricity and to further choose between generation sources substantially on the basis of time-of-use cost and the cost of on-site generation, thereby allowing the end-user to reduce their costs and further in some embodiments to provide electricity to the supply electrical network.

On-site generation of electricity is based on a supply of low-cost stored energy in the form of combustible gas which is able to provide a high efficiency conversion between the stored energy in the gas to electricity as required. Accordingly, the supply of combustible hydrocarbon gas supplied via a gas distribution network whether it be direct or through storage means provides an end-user site with on-demand access to stored energy for the specific purpose of conversion into electricity at a time of choosing of the end-user. This enables an end-user to strategically switch between electrical grid supplied and on-site electricity generation sources for the primary purpose of reducing instantaneous or time-of-use electricity cost.

Accordingly, the above described embodiments relate to coupling or decoupling of two time-dependent energy systems or sources to an end-user. The first energy source is characterised by it being provisioned to meet an instantaneous demand on the part of a collection of end-users and as such its capacity varies dynamically to provide substantially instantaneous electrical power as required. The first energy source is the first electrical network or smart grid (FN). The second energy source is characterised by it being a stored energy source in that the amount of energy is predetermined and there is no disadvantage to not using the energy at a given time as the energy may remain stored. In this case, the stored energy source is combustible gas (SN) which may be provided directly to an end-user by storage means in the form of gas supply pipeline network or containcrised gas. In another embodiment, the stored energy source is a fossil fuel such as petrol, diesel, kerosene or other standard liquid hydrocarbon. A first time dependent network FN represents the smart grid electricity price, which is made available to the end-user or second electrical network. In accordance with the previously described embodiments, the end-user time dependent network (EUN) interacts with both the FN & SN with a price taking response by the power transfer system and method described.

The EUN network represents the end-user system and inherent end-user demand. In addition to the EUN, there is a coupling of yet a further time dependent electrical power source representing on-site power generation. The on-site power generator of the EUN has access to the stored energy source provided by the SN and is available for on-demand for conversion into useful product (ie, electricity). The on-site generated electricity may be consumed by the end-user load or in some embodiments provided as electrical energy to the first electrical network. The decision for the end-user network (EUN) to consume a specific time dependent cost of electricity from either the first electrical network or via on-site generation may be based on lowest cost provision to the EUN.

Conversely, the EUN can also maximise the time dependent price to supply surplus power generated within the EUN to the FN (ie, supply on-site generated electricity to the first electrical network). The EUN thus requires timely electricity source switching to reduce the transaction costs for the EUN. In accordance with the above embodiments, the EUN is able to advantageously improve both price taking from the first electrical network and/or provide a deficit or surplus of energy by accessing an on-site generation source fuelled by the SN stored energy supply. As such, the EUN is able to advantageously partially or fully decouple itself from the first electrical network's time dependence by use of on-site generation plant based on the stored energy source (SN). As the on-site generation plant has access to stored energy in the form of fuel which is provided at a specific cost to produce a given unit of electricity upon conversion, the decoupling may be implemented in accordance with a power transfer schedule to provide a competitive cost as compared to the standard time-of-use cost provided by the FN.

As would be appreciated, the time dependence of the fuel cost of the combustible gas varies on a time scale that is substantially longer than the cost variation time scale of the electricity cost provided by the first network. Accordingly, the SN stored energy is provided substantially at fixed cost over an extended time period whereas the FN time-of-use pricing is volatile over much shorter time constants. As such, access to the SN stored energy by an end-user and the capability of converting this stored energy to electricity on-site functions to dampen or smooth the volatility of the FN which also provides advantages to the electricity supply market as a whole as it reduces the risk of retailer exposure to spot price volatility which would be expected in turn to reduce the general end-user time-of-use tariff.

Those of skill in the art would further appreciate that the various illustrative logical blocks, modules, circuits, and method steps described in connection with the embodiments disclosed above may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Accordingly, embodiments may be implemented to achieve the described functionality in varying ways for each particular application.

For a hardware implementation, processing may be implemented within one or more devices or systems, including but not limited to, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or any combination as appropriate. Software modules, also known as computer programs, computer codes, or instructions, may contain a number a number of source code or object code segments or instructions, and may reside in any computer readable medium such as a RAM memory, flash memory, ROM memory. EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Figure 39:
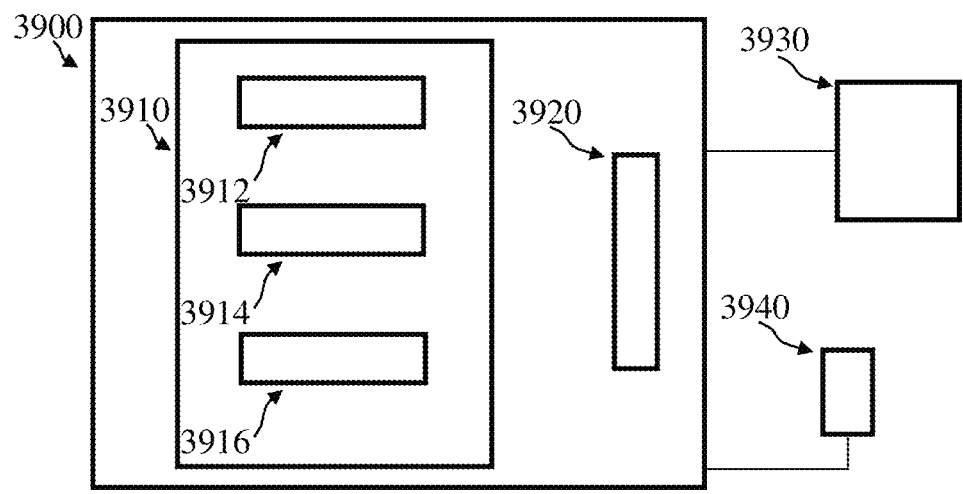
FIG. 39 is a functional block diagram of an example computer system that may be adopted to implement illustrative embodiments described below.

Various aspects of the method and system described above may be computer implemented. An example computer system is illustrated in FIG. 39 and comprises a display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. As illustrated in FIG. 39, one embodiment of a computing device 3900 comprises a central processing unit (CPU) 3910, a memory 3920, a display apparatus 3930, and may include an input device 3940 such as keyboard, mouse, etc. The CPU 3910 comprises an Input/Output Interface 3912, an Arithmetic and Logic Unit (ALU) 3914 and a Control Unit and Program Counter element 3916 which is in communication with input and output devices (eg input device 3940 and display apparatus 3930) through the Input/Output Interface. The Input/Output Interface may comprise a network interface and/or communications module for communicating with an equivalent communications module in another device using a predefined communications protocol (eg Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core). The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules that can be loaded and executed by the processor(s).

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for controlling the time dependent transfer of electrical power between a first electrical network and a second electrical network, the first electrical network comprising an electrically interconnected utility-scale grid under the control of a market operator which includes at least one power generation source and a transmission and/or distribution interconnection network operable to provide instantaneous electrical power to the second electrical network located at a location, the second electrical network including electrical generating capacity at the location comprising gas-to-electricity conversion by a gas-to-electricity converter based on stored energy in a form of combustible gas accessible at the location, the method comprising:

receiving at the second electrical network pricing information from the first electrical network, the pricing information associated with the future supply of electrical power by the first electrical network to the second electrical network, wherein the pricing information is updated in real time;

determining a power transfer schedule for the second electrical network over a forecast period controlling whether electricity is to be sourced from the first electricity network or from the gas-to-electricity converter based on the pricing information and electricity demand characteristics of the location; and modifying in real time the transfer of electrical power between the first and second electrical networks over the forecast period by selectively switching power from the first electrical network or the gas-to-electricity converter to the second electrical network in accordance with the power transfer schedule, wherein synchronization of alternating current phase and frequency of power supplied to the second electrical network with that of the first electricity network is maintained during bidirectional switching of load power consumption between the first electrical network and the gas-to-electricity converter by a transfer switch arrangement comprising first and second parallel circuit elements, the first parallel circuit element comprising: a normally-closed contactor switch and a semiconductor switch module provided in series for matching of alternating current phase between the first electrical network and the gas-to-electricity converter for initial transfer of electrical power and the second parallel circuit element comprising: a normally-open switch module having a slower switching time than the semiconductor switch module and which closes for ongoing transfer of electrical power following matching of alternating current phase.

2. The method for controlling the time dependent transfer of electrical power as claimed in claim 1, wherein the power transfer schedule includes controlling the second electrical network generating electricity on-site to satisfy the electricity demand characteristics of the second electrical network where a cost of generating electricity on-site is less than or equal to a cost of electricity supplied by the first electrical network.

3. The method for controlling the time dependent transfer of electrical power as claimed in claim 1, wherein the power transfer schedule includes controlling the second electrical network supplying at least a portion of the on-site generated electricity to the first electrical network at a reimbursement price greater than or equal to a cost of generating electricity on-site.

4. The method for controlling the time dependent transfer of electrical power as claimed in claim 1, wherein the power transfer schedule includes controlling of storing by the second electrical network electricity supplied by the first electrical network or generated by the second electrical network to be either employed by the second electrical network or supplied back to the first electrical network at a later time.

5. The method for controlling the time dependent transfer of electrical power as claimed in claim 1, wherein the combustible gas is stored at the location and is comprised of any one of:
   compressed natural gas (CNG);
   liquefied propane gas (LPG);
   liquefied natural gas (LNG); or
   any combination of the above.

6. The method for controlling the time dependent transfer of electrical power as claimed in claim 1, wherein the combustible gas is supplied by a gas supply network.

7. The method for controlling the time dependent transfer of electrical power as claimed in claim 6, wherein determining the power transfer schedule includes receiving pricing information from the gas supply network and including this information in present and future calculation of generating electricity on-site.

8. The method for controlling the time dependent transfer of electrical power as claimed in claim 6, further including supplying a forecast of gas fuel consumption by the second electrical network to the gas supply network.

9. The method of claim 6, wherein the gas supply network is a regional supply network based on pipeline infrastructure operable to provide combustible gas to a plurality of end users within the region.

10. The method for controlling the time dependent transfer of electrical power as claimed in claim 1, wherein the on-site gas-to-electricity converter comprises a gas-to-rotational energy converter and a rotational energy-to-electricity converter.

11. The method for controlling the time dependent transfer of electrical power as claimed in claim 10, wherein the gas-to-rotational energy converter is an internal combustion reciprocating engine (ICRE).

12. The method of claim 1, wherein the pricing information associated with the future supply of electricity to the second electrical network includes a time dependent time of use (TOU) consumption cost forecast for the future supply of electricity by the first electrical network to the second electrical network over the forecast period.

13. The method of claim 1, wherein the method includes providing a forecast electricity consumption of the second electrical network to the first electrical network.

14. The method of claim 1, wherein the method includes receiving updated forecast gas pricing information for determining the power transfer schedule for the second electrical network.

15. The method of claim 1, wherein the method includes updating the power transfer schedule in real time.

16. An electrical power control system comprising:
a first electrical network, the first electrical network comprising an electrically interconnected utility-scale grid under the control of a market operator which includes at least one power generation source and a transmission and/or distribution interconnection network configured to supply instantaneous electrical power to a second electrical network located at a location, wherein the first electrical network further provides pricing information associated with the future supply of electricity to the second electrical network, wherein the pricing information is updated in real time;
a power measuring device for measuring the demand characteristics of the second electrical network;
an on-site stored energy to electricity converter for converting stored energy at the location to electricity, the on-site stored energy to electricity converter is a gas-to-electricity converter based on combustible gas;
a controller for receiving the demand characteristics of the second electrical network and the pricing information from the first electrical network and determining a power transfer schedule for the second electrical network over a forecast period controlling whether electricity is to be sourced from the first electricity network or from the gas-to-electricity converter; and
an on-site power transfer switch operable to in real time selectively switch power from the first electrical network or the gas-to-electricity converter to the second electrical network in accordance with the power transfer schedule, the on-site power transfer switch operable to maintain synchronization of alternating current phase and frequency of power supplied to the second electrical network with that of the first electricity network during bidirectional switching of load power consumption between the first electrical network and the gas-to-electricity converter, wherein the on-site power transfer switch comprises a transfer switch arrangement comprising first and second parallel circuit elements, the first parallel circuit element comprising: a normally-closed contactor switch and a semiconductor switch module provided in series for matching of alternating current phase between the first electrical network and the gas-to-electricity converter for initial transfer of electrical power and the second parallel circuit element comprising: a normally-open switch module having a slower switching time than the semiconductor switch module and which closes for ongoing transfer of electrical power following matching of alternating current phase.

17. The electrical power control system of claim 16, wherein the power transfer schedule further controls whether electricity from the first electrical network is to be stored on-site by the second electrical network.

18. The electrical power control system of claim 16, wherein the power transfer schedule further controls whether electricity from the on-site energy to electricity converter is supplied to the first electrical network.

19. The electrical power control system of claim 16, wherein the combustible gas is supplied by a gas supply network.

20. The electrical power control system of claim 19, wherein the controller is operable to supply a forecast of gas fuel consumption by the second electrical network to the gas supply network.

21. The electrical power system of claim 19, wherein the gas supply network is a regional supply network based on pipeline infrastructure operable to provide combustible gas to a plurality of end users within the region.

22. The electrical power control system of claim 16, wherein the combustible gas is stored at the location and is comprised of any one of:
compressed natural gas (CNG);
liquefied propane gas (LPG);
liquefied natural gas (LNG); or
any combination of the above.

23. The electrical power control system of claim 16, wherein the on-site gas-to-electricity converter comprises a gas-to-rotational energy converter and a rotational energy-to-electricity converter.

24. The electrical power control system of claim 23, wherein the gas-to-rotational energy converter is an internal combustion reciprocating engine (ICRE).

25. The electrical power control system of claim 16, wherein the pricing information associated with the future supply of electricity to the second electrical network includes a time dependent time of use (TOU) consumption cost forecast for the future supply of electricity by the first electrical network to the second electrical network over the forecast period.

26. The electrical power control system of claim 16, wherein the controller is operable to provide a forecast electricity consumption of the second electrical network to the first electrical network.

27. The electrical power control system of claim 16, wherein the controller is operable to receive updated forecast gas pricing information for determining the power transfer schedule for the second electrical network.

28. The electrical power control system of claim 16, wherein the controller is operable to update the power transfer schedule in real time.

* * * * *